United States Patent [19]

Vouzelaud et al.

[11] Patent Number: 5,432,704
[45] Date of Patent: Jul. 11, 1995

[54] ADAPTIVE LAMINA GENERATION FOR SHAPE DEPENDENT PROCESS CONTROL AND/OR OBJECT DECOMPOSITION

[75] Inventors: Franck A. Vouzelaud, Paris, France; Amit Bagchi, Seneca, S.C.

[73] Assignee: Clemson University, Clemson, S.C.

[21] Appl. No.: 156,321

[22] Filed: Nov. 23, 1993

[51] Int. Cl.⁶ .................. G06F 15/46; G06F 15/72
[52] U.S. Cl. ............... 364/474.24; 364/468; 395/120; 395/161
[58] Field of Search ............. 364/468, 474.05, 474.24, 364/476, 474.29; 264/22, 308, 40.1, 241, 255; 425/174, 174.4; 427/43.1, 54.1; 156/58, 59, 273.3, 273.5, 275.5, 272.2, 378, 329.6, 379.8, 379.9; 395/119, 120, 123, 155, 161

[56] References Cited

U.S. PATENT DOCUMENTS

| | | |
|---|---|---|
| 4,031,368 | 6/1977 | Colding et al. . |
| 4,618,924 | 10/1986 | Hinds . |
| 4,752,352 | 6/1988 | Feygin . |
| 4,789,931 | 12/1988 | Kuragano et al. . |
| 4,798,504 | 1/1989 | Erwin et al. . |
| 4,833,617 | 5/1989 | Wang . |
| 4,837,703 | 6/1989 | Kakazu et al. . |
| 4,842,457 | 6/1989 | Badagnani . |
| 4,862,381 | 8/1989 | Shibata . |
| 4,863,538 | 9/1989 | Deckard . |
| 4,866,631 | 9/1989 | Kuragano et al. . |
| 4,876,931 | 10/1989 | Bertini . |
| 4,885,530 | 12/1989 | Mayer et al. . |
| 4,907,164 | 3/1990 | Guyder . |
| 4,916,990 | 4/1990 | Dolansky et al. . |
| 4,923,343 | 5/1990 | Silk . |
| 4,926,309 | 5/1990 | Wu et al. . |
| 4,938,816 | 7/1990 | Beaman et al. . |
| 4,944,817 | 7/1990 | Bourell et al. . |
| 4,949,270 | 8/1990 | Shima et al. . |
| 4,949,456 | 8/1990 | Kovach et al. . |
| 4,961,041 | 10/1990 | Seki et al. . |
| 4,976,025 | 12/1990 | Aldridge, Jr. et al. . |
| 4,989,152 | 1/1991 | Cheng . |
| 4,996,010 | 2/1991 | Modrek . |
| 5,005,135 | 4/1991 | Morser et al. . |
| 5,017,753 | 5/1991 | Deckard . |
| 5,044,842 | 9/1991 | Miyata et al. . |
| 5,053,090 | 10/1991 | Beaman et al. . |
| 5,059,359 | 10/1991 | Hull et al. . |
| 5,088,054 | 2/1992 | Paris, II ..................... 395/121 |
| 5,209,878 | 5/1993 | Smalley et al. ............. 395/119 X |
| 5,263,130 | 11/1993 | Pomerantz et al. ......... 364/468 X |

OTHER PUBLICATIONS

Chalasani et al, "Computers in Engineering" 1991 Abstract, pp. 209–215.
Vouzelaud et al, "Solid Freeform Fabrication Proceedings", Dec. 1992 pp. 291–300.

Primary Examiner—Joseph Ruggiero
Attorney, Agent, or Firm—Dority & Manning

[57] ABSTRACT

A method of automatically operating a machine with respect to an object having a desired profile, wherein the machine's operation is controlled based on a model of the object's profile. The method includes generating at least a portion of the model in the form of a plurality of successive layers wherein the cross-section of each layer is defined by the intersection of a pair of parallel planes and a model profile connecting the parallel planes. Each layer's thickness is selected such that the geometrical error between the object's desired profile and the model profile of the layer remains no greater than a preselected geometrical error. More than one layer thickness is selected during the step of generating this portion of the object. The machine can be operated in successive steps with each step based on a separate one of the layers.

10 Claims, 12 Drawing Sheets

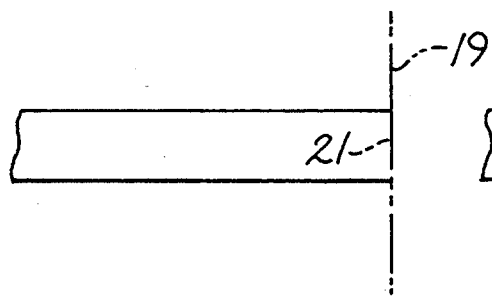
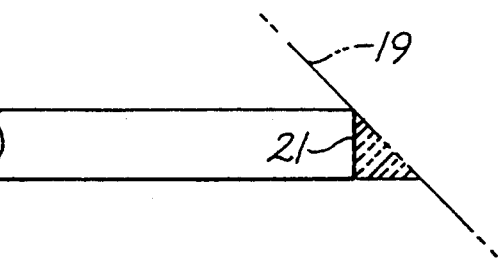
Fig. 1A   Fig. 1B
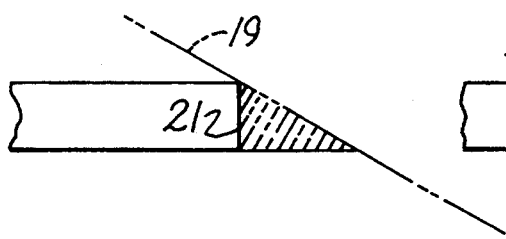
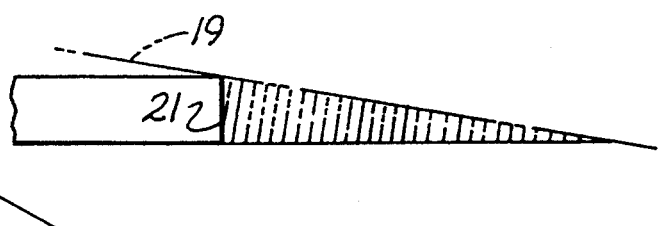
Fig. 1C   Fig. 1D
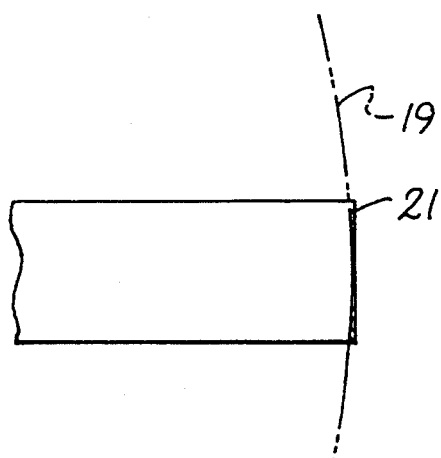
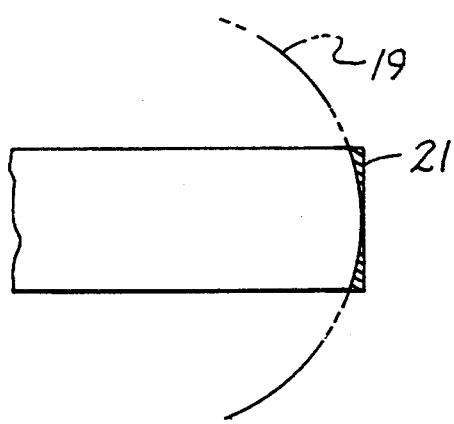
Fig. 1E   Fig. 1F
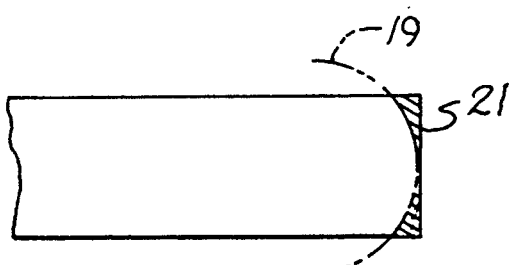
Fig. 1G

ADAPTIVE LAMINA GENERATION FOR SHAPE DEPENDENT PROCESS CONTROL AND/OR OBJECT DECOMPOSITION

BACKGROUND OF THE INVENTION

The present invention relates to a method of modeling a solid three-dimensional object and relates more particularly to a method of preparing a model that consists of a plurality of layers stacked atop one another wherein the boundary edge of each layer may vary from the boundary edge of its adjacent layer (above or below) or layers (above and below) to conform to contours in the shape of the object.

After an object is designed, as by freehand drawings or computer aided design (CAD) for example, there are different ways to represent this object in a computer. A solid geometric modeling system is a computer graphic system which is used to represent solid objects. If the computer system constructs and stores all the geometric information of the boundary surfaces of the object, then it is called a solid modeling system with boundary representation. The stored boundary information is called the boundary file of the solid.

The most commonly used method of modeling a solid object is to combine so-called primitive objects together to form a more complicated object, such as disclosed in U.S. Pat. No. 4,618,924. The Boolean set operations, such as union, intersection, and difference, are used to produce the combination. To calculate the boundary of the object that results from combining two objects A and B, one must calculate the intersections of the boundary surfaces of A and B.

Once an object is modeled, the boundary file stored in the computer's database can be used for a number of purposes. For example, the boundary file can be used to compute the cutter paths of a numerical control (NC) machine tool. If the machine tool makes the desired object by removing (or adding) one layer of constant thickness at a time, the machine tool employs constant-layer-thickness machine control, as disclosed in U.S. Pat. Nos. 4,907,164; 4,996,010; 5,053,090 for example. If the desired object is to be fabricated by machining it from a solid workpiece by removing unwanted material from the workpiece as disclosed in U.S. Pat. No. 4,618,924 for example, the fabrication tool is constrained to trace a path around the workpiece that corresponds to the edge of each layer of the model. As the fabrication tool (such as a mill) completes each successive path, a layer of the desired object is completed. Each layer has the same thickness and can be thought of as having a flat top surface parallel to a flat bottom surface. Each layer has an edge, the so-called boundary surface, that extends between the top and bottom surfaces and is shaped according to the characteristics of the fabrication tool. If the edge of the model layer is normal to the top and bottom surfaces, as would be produced by a flat end mill, and were to be projected onto a plane parallel to either the top or bottom surface of the layer, the shape of the projection would approximate the shape of the intersection of a parallel plane with the outer surface of the object being modeled. The interface plane that exists between successive layers is often described as being produced by slicing the object, with the locus of the plane defining the slice. Thus, a constant-layer-thickness model is said to have a uniform interval between adjacent slices.

In a typical manufacturing process based on a constant-layer-thickness model of the object to be produced, the fabrication tool, such as a cutting tool, would start at one end of the workpiece and remove material from the workpiece until the tool was able to trace out a path that corresponded to the edge of the end-most layer of the model, without removing any further material from the workpiece. Then the tool would be repositioned one layer away from the end-most layer on the workpiece and similarly remove material from the workpiece until the tool was able to trace out a path that corresponded to the edge of the next layer of the model, without removing any further material from the workpiece. This would be repeated until the tool reached the opposite end-most layer of the workpiece corresponding to the opposite end layer of the model.

The quality of the surfaces of the parts obtained by such constant-layer-thickness manufacturing depends on two factors. The first factor is the stair-stepping effect on the surface of the part that results from using stacked layers to approximate the geometry of the part being manufactured. As shown in FIGS. 1A–1G, the so-called stair-step effect occurs when the edge of one layer misaligns with the profile of the desired object. The second factor is the manufacturing process that is used to create the part from the model consisting of the stacked layers.

A vertical cylinder can be represented exactly by two planar intersections, each one corresponding to a slice, one at the bottom and another at the top. Whereas a similarly exact geometrical representation of a cylinder lying on its curved side, or any other object with a free form surface, would require an infinite number of slices. Because of the stair-stepping that characterizes this type of layered modeling of an object, a curved portion of an object described by successive layers, is a less exact representation than a solid CAD model (which is less exact than the original freehand drawn design). Therefore, a lot of information on the geometry of the object is lost in slicing, because of the transformation from a three dimensional (3D) representation to a two dimensional (2D) laminar representation. If the number of slices is increased, corresponding to a decrease in the thickness of the individual layers, less information is lost, and accordingly the fit becomes more precise. However, increasing the number of slices (or layers) increases the file size and the time needed for both computation and performing the process.

In conventional 3-axis machining for example, the stair step error manifests itself in the surface texture. Layer thickness is defined in a conventional process by an experienced user at the beginning of the modeling procedure. However, because the material is removed (or added in some free form fabrication processes) layer after layer during a layer-based process for manufacturing the object, the machine direction and the machine patterns cannot be altered once they have been set. If the software that controls the machine using the model permits, the machine operator can partition the model of the object into several intervals, each interval corresponding to a standard geometrical shape that is definable by a single edge shape for several successive layers. The operator provides the control software with a constant layer thickness for each interval, wherein each layer thickness is chosen to the operator's best ability to improve quality and reduce process time for that particular interval of the object.

The effect of having the machine produce successive layers of constant thickness on the surface texture of the object being manufactured, can best be appreciated in the FIG. 2 chart showing the surface roughness of the top portion of a sphere that has been machined using a flat end mill in a manner that produces the object in successive layers of constant thickness. As shown in FIG. 2, the roughness varies significantly over this portion of the sphere's surface. The increasing peak-to-valley dimension results from the object's spherical geometry, which is a geometrical parameter. As the local slope of the sphere's surface decreases, the impreciseness attributable to the stair-stepping effect, increases. Therefore, while a geometrical error on the order of 107 $\mu$m (measured in the 0 mm to 1 mm interval at the beginning of the profile in FIG. 2) produced by the stair-stepping effect, may be within the tolerance, a geometrical error on the order of 192 $\mu$m (measured in the 5 mm to 6 mm interval at the end of the profile in FIG. 2) is not necessarily within the tolerance. In this particular case, if a constant layer thickness $\Delta Z$ is used to control the manufacturing process, the magnitude of the constant layer thickness $\Delta Z$ must be selected for the roughness parameter's worst case scenario, which occurs at the top of the sphere where the local slope is the smallest. However, if the layer thickness $\Delta Z$ for the entire object is reduced in order to ensure that the roughness of a particular portion of the surface of the object meets the desired tolerance, the resulting increase in machining time significantly increases the expense of machining in this fashion. This illustrates that while surface texture can be acceptable for many surfaces, some limitations of constant thickness slicing cannot be overcome. Moreover, the problems identified above in connection with a manufacturing process, are encountered in any process employing a profile or cross-section that is decomposed by incremental parallel planes of intersection. Such problems might occur for example in controlling machines used in processes such as: three-dimensional cartography; three-dimensional reconstructive holography; three-dimensional printing systems; electron microscopy; sonar imaging; ultrasound imaging; magnetic resonance imaging; computerized tomography; X-ray imaging; laser scanning; surface inspection; welding; soldering; any process based employing the adhesive bonding of layers; CNC manufacturing or other manufacturing with machine tools; fused deposition modeling; ballistic particle manufacturing; stereolithography manufacturing processes; and any process relying on profile scanning.

OBJECTS AND SUMMARY OF THE INVENTION

It is a principal aim of the present invention to provide a method of modeling an object from a plurality of layers stacked atop one another wherein the thickness of the layers is uniform except in portions of the model where the thickness of each layer is adapted by being increased or decreased by an amount that depends on the knowledge of the local geometry and the constraint of keeping a constant geometrical error between the desired object and the model.

It is another principal aim of the present invention to provide a method of modeling an object from a plurality of layers stacked atop one another wherein the thickness of the layers is uniform except in portions of the model where the thickness of each layer is adapted by being increased or decreased by an amount that depends on the knowledge of the local geometry and the constraint of keeping the geometrical error between the object and the model from exceeding a predetermined value.

It is a further principal aim of the present invention to provide a method of modeling an object from a plurality of layers stacked atop one another wherein the thickness of the layers is uniform except in portions of the model where the thickness of each layer is adapted by being increased or decreased by an amount that depends on the knowledge of the local geometry and the constraint of keeping the geometrical error between the object and the model from exceeding a predetermined value, which may be chosen to be a different predetermined value for each of more than one different interval of the model.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the adaptive lamina generation method of the present invention permits the geometrical error between the profile of the desired object and the profile of the model of such object, to be held within predetermined tolerances. A measurable geometrical error criterion is defined by the user as an upper tolerance for the profile of the model. Then, given a process, such as a manufacturing process, and its technical characteristics, the model of the object is generated in the form of a succession of layers. The thickness of each layer is chosen so that during the process phase, the geometrical error criterion is satisfied. This supposes that the tolerance is compatible with both the process in use and the representation of the object, such as a CAD representation. Thus, the adaptive lamina generation method of the present invention can be used to construct a 2D or 3D geometric model out of layers, wherein the thickness of each layer of the model is selected so as to maintain at a desired value the geometrical error between the model's profile and the profile of the object being modeled. The method of selecting the thickness of the next layer can be achieved by either a closed loop method or an open loop method. One or the other will be indicated by considerations of the local geometry and characteristics of the process being used. The closed loop method employs an iterative routine, while the open loop method uses a single calculation based on an interpolation of the local slope of the desired profile.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIGS. 1A, 1B, 1C, and 1D illustrate the way that the geometrical error between a rectangular layer model profile and a straight line desired profile (indicated by the chain dashed straight line) increases as the slope of the desired profile flattens;

FIGS. 1E, 1F, and 1G illustrate the way that the geometrical error between a rectangular layer model profile and a curved line desired profile (indicated by the chain dashed line) increases as the radius of curvature of the desired profile decreases;

DETAILED DESCRIPTION OF THE PREFERRED EMBODIMENTS

Figure 2:
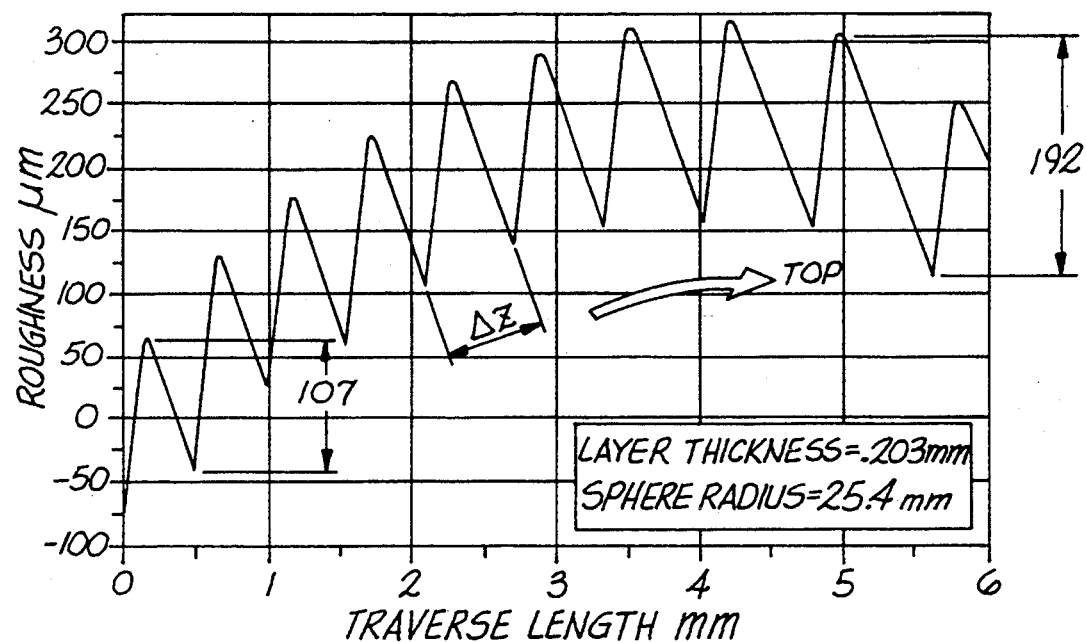
FIG. 2 is a chart that illustrates how a constant thickness layer results in an increased roughness near the top of a sphere and progressively increases as the top is approached.

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

The present invention pertains to any process involving operation of a machine with respect to a desired object. Such processes may require the position of the object to be provided to the machine so that the machine operates only within the boundary of the desired object. This is true for example in the case of a machine that applies radiation only or primarily to a specific region of the patient's anatomy without exposing any other portions of the anatomy to such levels of radiation. Other processes require the position of the object to be provided to the machine so that the machine does not violate the boundary of the desired object. This is true for example in the case of a machine that applies radiation to a portion of the patient's anatomy that is near an organ that cannot be exposed to such levels of radiation. Still other processes require the machine to add material until the object is formed. This is true for example in the case of a ballistic particle manufacturing machine. Yet other processes require the machine to remove material until the object is exposed. This is true for example in the case of a milling machine.

Because information related to both geometrical considerations and process characteristics is necessary to model an object, it is difficult to separate these two elements. However, in the course of modeling an object in layers, some geometrical parameters are more important than others because of their ability to influence the magnitude of the geometrical errors that may be introduced by a layer-based representation of an object.

In general, one important geometrical parameter of the stacked layer model is the local slope of the object's profile. FIGS. 1A, 1B, 1C and 1D present several examples in vertical cross-sectional views of the free edges of the layers that form the model of the object. The chain dashed straight line 19 represents the local profile of the object to be modeled by the stacked layer, which is depicted in solid line in the form of a rectangle. Each horizontal solid line represents a slice of the model such that adjacent slices form the upper and lower boundaries of a layer of the model. The solid vertical line 21 between the horizontal lines represents the edge or profile of the layer of the model. The illustrations successively moving from FIG. 1A (no error) to FIG. 1D (largest error) show that the effect of the object's local slope on the geometrical error, which is represented by the area shown shaded, increases as the slope decreases. In FIGS. 1A, 1B, 1C and 1D, the edge 21 of the layer is bounded by the desired profile 19 of the object, but a similar error relationship would prevail if the desired profile 19 were to be bounded by the edge 21 of the layer.

A second important geometrical parameter of the stacked layer model is the local curvature. FIGS. 1E, 1F, and 1G are similar to FIGS. 1A, 1B, 1C and 1D except that the chain dashed line 19 in FIGS. 1E, 1F, and 1G, which represents the local profile of the object to be modeled, has an easily discernible curvature. Moving from FIG. 1E (smallest error) to FIG. 1G (largest error) shows that the geometrical error, which again is represented by the area shown shaded, tends to increase as the local radius of curvature of the profile 19 of the desired object decreases. In FIGS. 1E, 1F and 1G, the desired profile is bounded by the edge 21 of the layer, but a similar error relationship would prevail if the edge 21 of the layer were to be bounded by the desired profile 19 of the object.

Most of the time, both geometrical parameters, slope and curvature, are combined in the desired profile, and it is difficult to predict the magnitude of the geometrical error unless the geometry of the object is very simple. Predicting the geometrical error that arises between a stacked layer model and its object, is analogous to the comparison between a 2D unknown function which is reconstructed from points on its curve, and the actual curve from which the points are extracted. If the interval between points on the curve is constant, the interpolation is improved when the first and second derivatives are known at each point. If the length of the interval between the points on the curve is increased or decreased depending upon the degree of curvature in such interval, then the straight lines which connect adjacent ones of these points on the curve will be a better approximation of the actual curve.

Figure 9A:
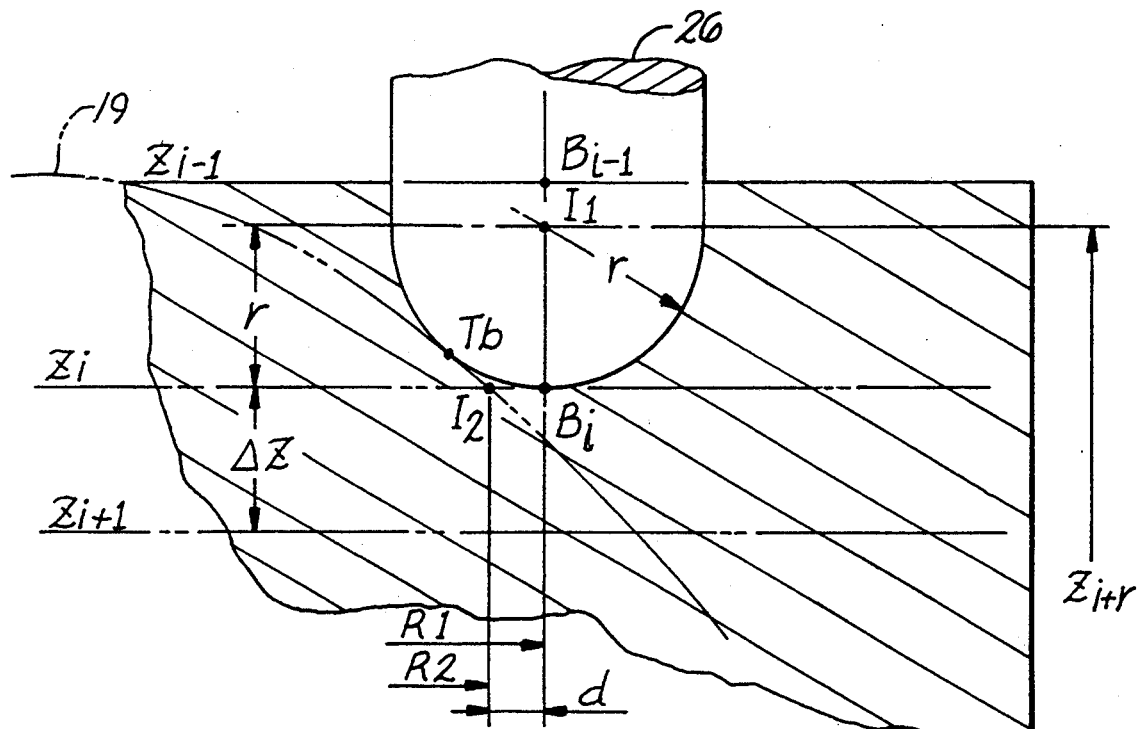
FIGS. 9A and 9B illustrate the process of determining the thickness of the next layer, which corresponds to determining the next positioning of a spherical end mill to produce the object's desired profile (indicated by the chain dashed curved line)
Figure 9B:
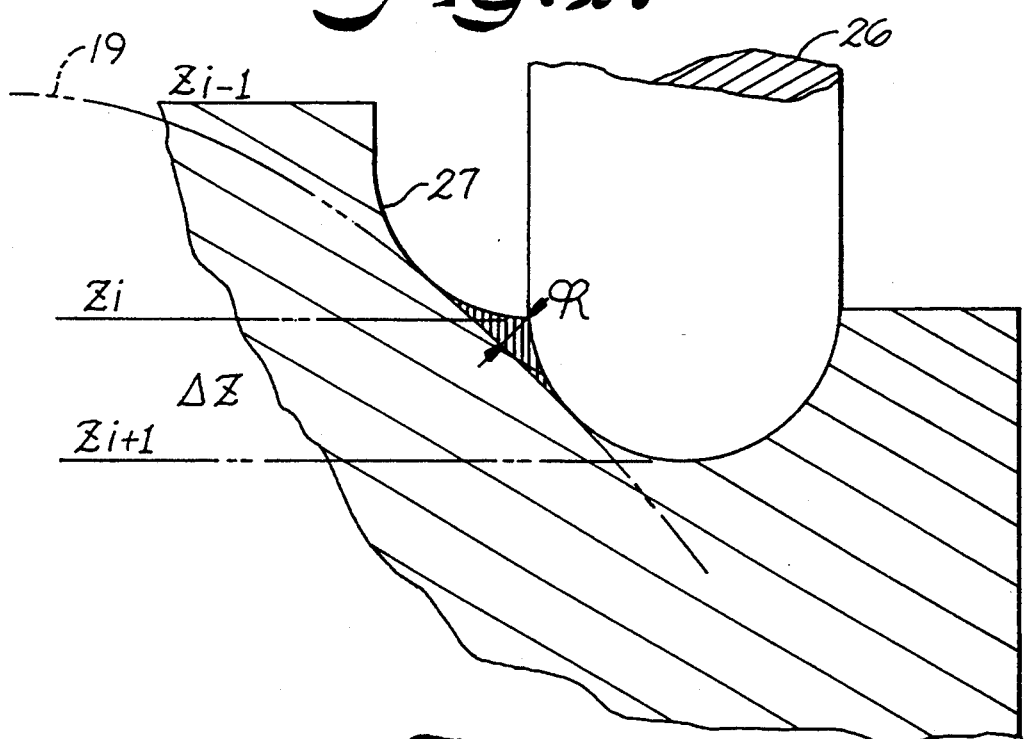

The present invention applies to any process that has at least a portion of a model of a desired object, generated in a form including a plurality of layers wherein the cross-section of each layer in a plane of view is defined by the intersection with said plane of view, of a pair of parallel planes and an edge (a.k.a. profile of the layer of the model) connecting said parallel planes, and wherein for each layer the distance separating its pair of parallel planes defines the thickness of said layer. While the present invention is applicable to any process that decomposes an object into a model that can be represented by stacked layers, various manufacturing processes have been used in the present application for purposes of illustrating the invention. As shown in FIG. 9B for example, a layered model of a desired profile 19 has one layer defined between the plane $Z_{i-1}$ and the parallel plane $Z_i$ with an edge or profile 27. The mill 26 is considered to have produced the edge or profile 27 of the layer. Similarly, the adjacent layer of the model has a thickness $\Delta Z$ defined between the parallel planes $Z_i$ and $Z_{i+1}$.

In accordance with the present invention, in generating at least a portion of the model of the desired object by a plurality of layers, each layer thickness is selected such that the geometrical error between the desired profile of this portion of the object and the profile of the model composed of layers with such layer thicknesses, remains less than a preselected geometrical error. In terms of the example shown in FIG. 9B, the geometrical error $\Re$ between the profile 19 of the desired object on the one hand and the model profile formed by the successive edges 27 of the successive layers of the model on the other hand, must be kept below a preselected value $\Re_{CTRL}$ by appropriate selection of the thickness $\Delta Z$ of each layer of the model. As shown in FIG. 9B for example, the geometrical error $\Re$ is the largest perpendicular distance between the desired local profile 19 of the object and the corresponding local profile 27 of the model.

Figure 4:
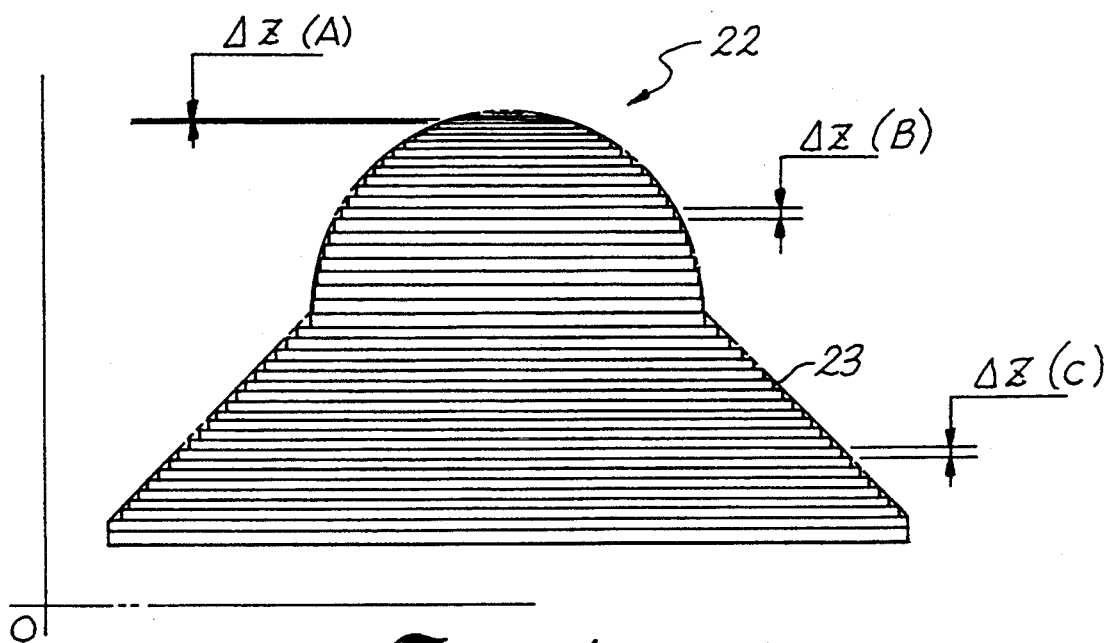
FIG. 4 is a cross-sectional view of a model in accordance with the adaptive lamina generation method of the present invention taken along the lines pointing toward the numerals 4—4 in FIG. 3.
Figure 3:
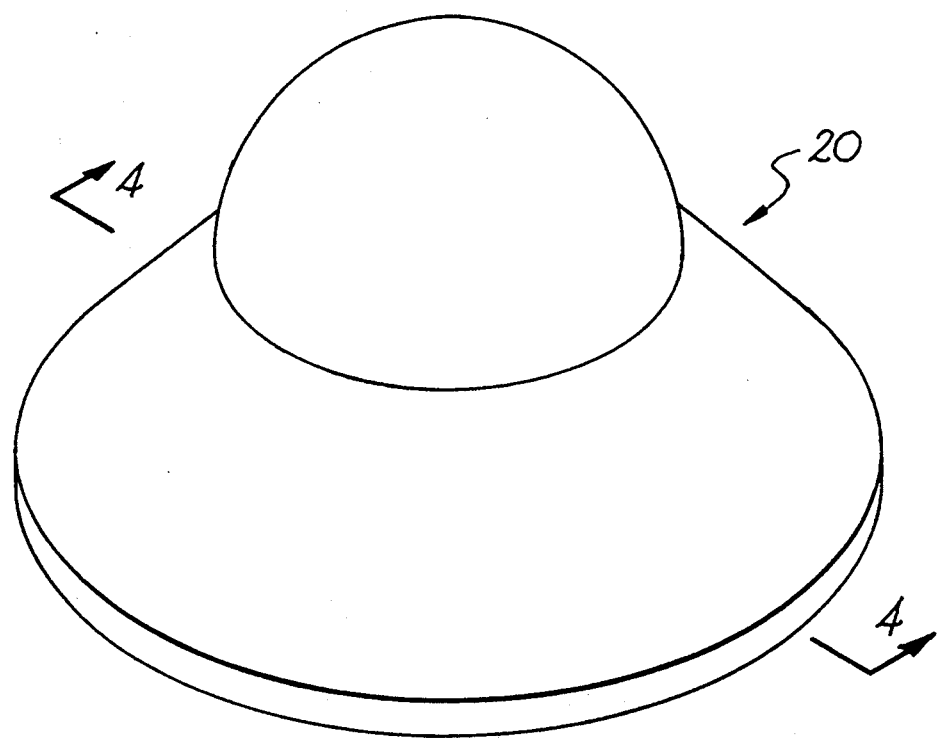
FIG. 3 is an elevated perspective view of an object to be modelled.
Figure 5:
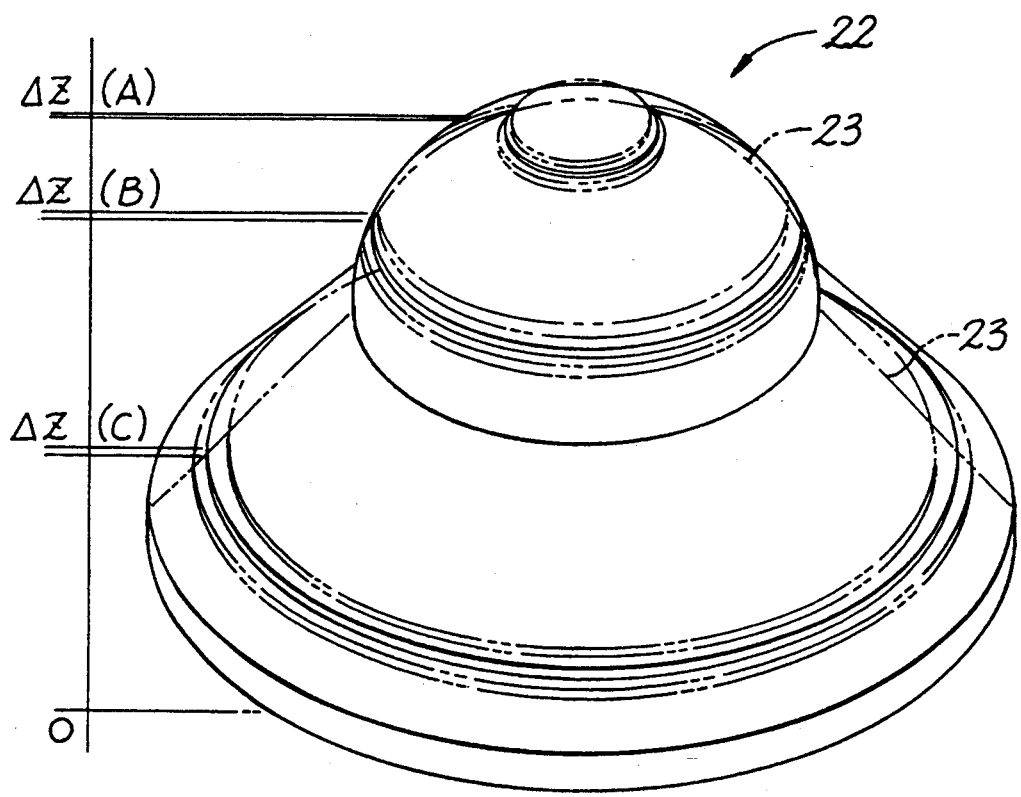
FIG. 5 is an elevated perspective view of the embodiment shown in FIG. 4 with the layers A, B and C shown in detail.

An example of an object with respect to which a machine is to be operated, is shown in FIG. 3 and is represented generally by the numeral 20. A model of the object 20 decomposed into layers in accordance with the adaptive lamina generation method of the present invention, is indicated generally by the designating numeral 22 and shown in a vertical cross-sectional view in FIG. 4. While the view shown in FIG. 4 is taken of the model 22 rather than of the object 20 itself shown in FIG. 3, the FIG. 4 view is taken in the same direction as the lines pointing toward the numerals 4—4 in FIG. 3. The model 22 is also shown in a perspective view in FIG. 5, but only the three layers singled out in FIG. 4 as A, B, and C are shown in FIG. 5 in some detail to illustrate the decreasing thicknesses $\Delta Z$ as one proceeds from layer C, to layer B, to layer A.

Figure 8A:
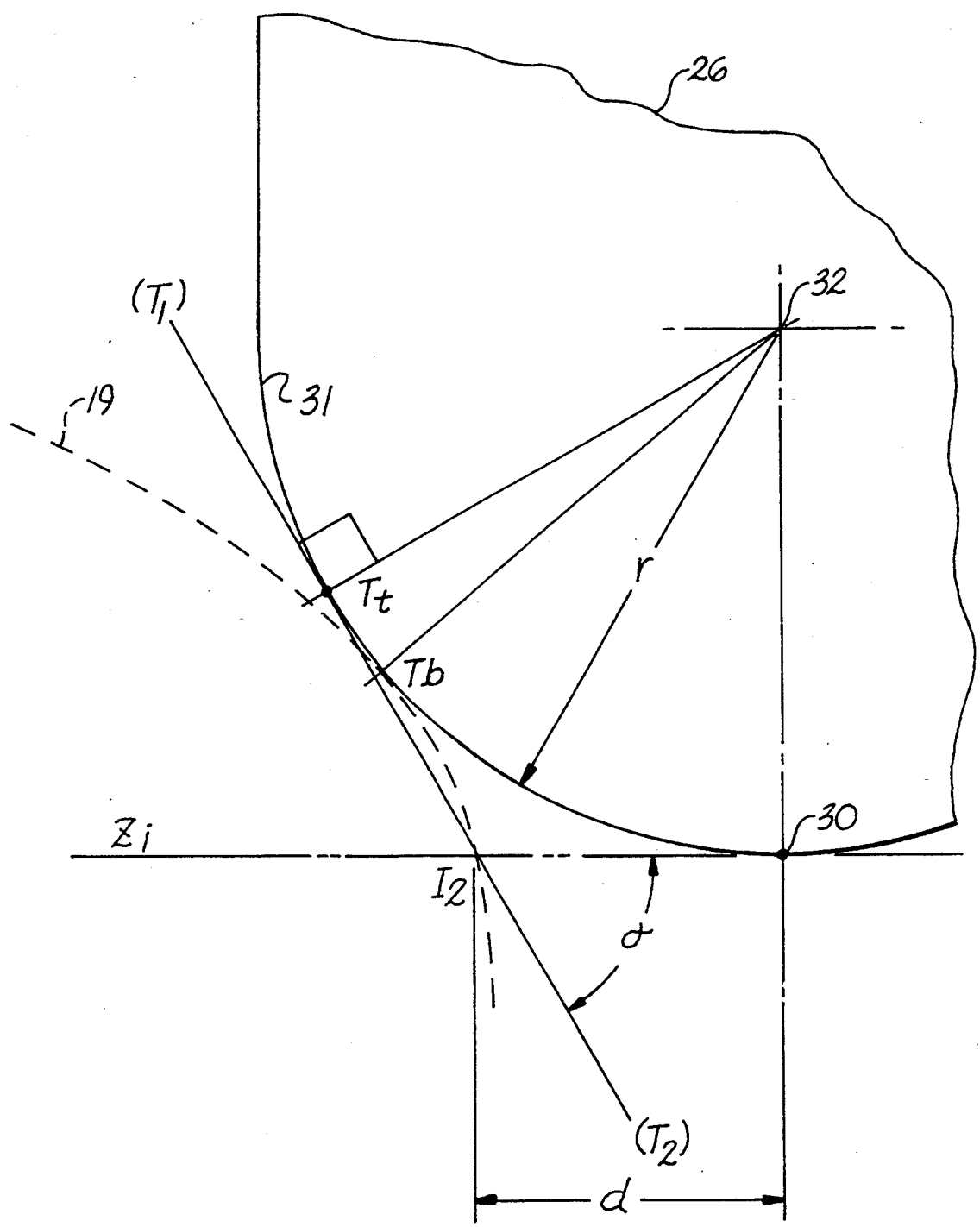
FIG. 8A illustrates a cross-sectional view of the method of relating the error between the desired profile (dashed line) and the thickness of the next layer, represented by the portion of the tool (solid line) to be indexed by the-amount of the thickness of the next layer.

In accordance with the present invention, the procedure whereby the model of the object is divided into layers, must incorporate a mathematical relationship that expresses the geometrical error (a.k.a. step error) between the profile of the layer of the model and the desired profile of the object. This relationship must express the thickness of the layer of the model as a function of the geometrical error. The specific relationship between the thickness of the layer of the model and the geometrical error will vary depending on the local geometry of the object's profile. For example, one portion 23 of the profile (chain dashed line) of the object shown in FIGS. 4 and 5 is an inclined straight line. Similarly, as shown in FIGS. 8A and 9B for example, the profile 19 (dashed line) of the desired object can be a curved line.

Figure 11:
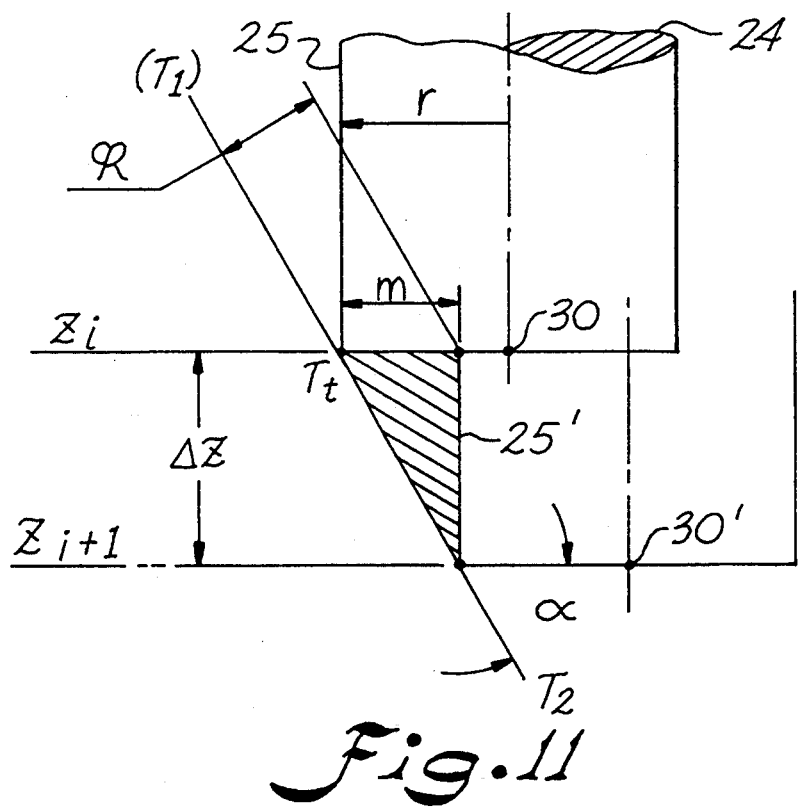
FIG. 11 illustrates the relationship between the thickness of the next layer and the geometrical error for a flat end mill.

The specific relationship between the thickness of the layer of the model and the geometrical error also will vary depending on the characteristics of the process involved. Such process characteristics pertain to the manner in which the process interacts with the desired object. These process characteristics can usually be related to the geometry of the profile of the layer of the model. For example, as shown in FIG. 11, a layer profile 25 that is chosen to represent the way that a flat end mill 24 interacts with a workpiece, is a vertical line. Similarly, as shown in FIG. 9B for example, a layer profile 27 that is chosen to represent the way a spherical end mill 26 interacts with a workpiece, is a curved line. Moreover, in the above examples, certain other assumptions have been made, which will be appreciated by the person of ordinary skill. For example, it is assumed that the machine tool is infinitely rigid, does not vibrate, and has no positioning errors or inaccuracies during the manufacturing process.

Since quality is merely the inverse of the geometrical error, one can also speak in terms of the quality of the profile of the model relative to the profile of the desired object. A parameter is chosen to quantify the local geometrical error or quality of the model. This parameter must be measurable, so that an inspection can be applied to the object. In addition, one must be able to calculate a quantitative measure of this parameter, so that the geometrical error or quality can be estimated from the geometrical relationships. Roughness $\Re$ satisfies both criteria, and to further simplify quantification of the incremental effect, the measure $\Re$ has been selected among roughness criteria. As schematically shown in FIG. 9B for example, the parameter $\Re$ is the maximum peak to valley height of the profile in the assessment length, and this parameter $\Re$ can be calculated for a given $\Delta Z$ based on the known geometry of profiles 19 and 27 and the mill 26. Note that in this particular instance, the relevant parameter $\Re$ is a linear quantity. Its measure is taken in a vertical cross section, to be perpendicular to the slicing planes $Z_{i-1}$, $Z_i$, and $Z_{i+1}$. The same criterion (scallop height) is used by Loney and Ozsoy to calculate the step over for parametric bicubic patches and therefore has a constant surface attribute. For a 3D object, even if the layer thickness is constant the step effect is not homogeneous along the different faces of the solid. Several measurements are therefore necessary to quantify the global quality of the object in one slice. However in this particular case the quality index imposes its limit on the worst case, which occurs for the most inclined surface. The number of evaluations is therefore reduced to one value for each layer. In a manufacturing context, the chosen quality index cannot completely quantify the surface, because even for the same roughness the texture is different depending upon whether the object is machined with a spherical end mill or a flat end mill.

The next question that must be answered in accordance with the present invention is, what is the magnitude of the thickness of the next layer of the model such that the constraint on the geometrical error is not exceeded. In the present invention, the thickness of each successive layer of the model may change. Whether the thickness of the next layer changes, depends upon what magnitude of geometrical error is to be tolerated between the model and the desired object. Thus, the selection of the thickness of the next layer is a function of the geometrical error that is to be tolerated during the process in question. As explained above, the calculation of the geometrical error depends upon both the local geometry of the profile of the desired object and the operating parameters associated with whatever process is being controlled by the layer method.

In further accordance with the present invention, the thickness of the next layer in the model must be chosen such that the geometrical error remains within predetermined limits. The selection of the thickness of the next layer can be performed in general by any of a number of methods.

In accordance with the present invention, two of the different methods that can be used to select the model's layer thickness while holding the geometrical error (a.k.a. the step effect) that is caused by a layer of this thickness, within the predetermined tolerances, are now explained in detail. The first method is a closed loop selection process, which is an iterative process, an example of which being schematically presented in flow chart form in FIG. 6. As an iterative process, the closed loop method has a provision for receiving feed back. The second selection method is a single calculation method, which sometimes is referred to as an open loop process, an example of which being schematically presented in flow chart form in FIG. 7. The open loop method is similar to derivative control theory.

Figure 6:
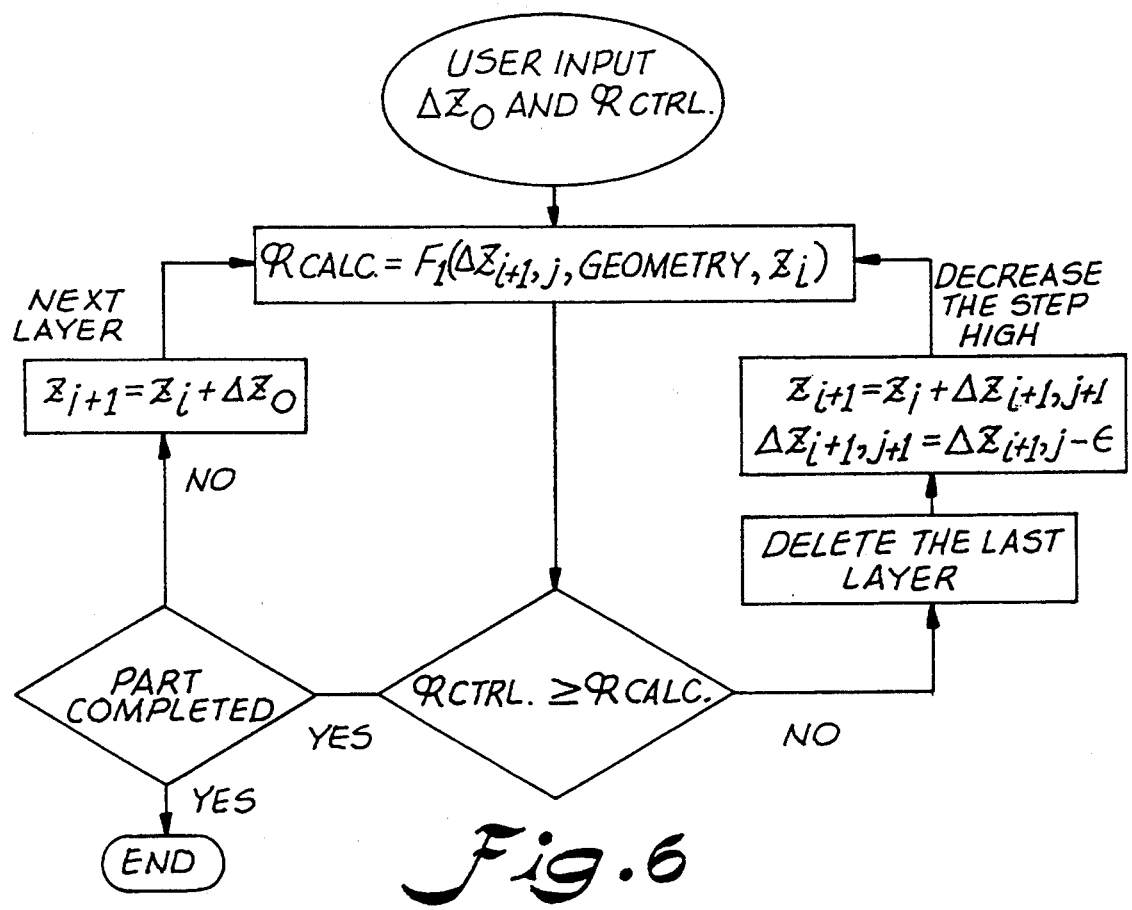
FIG. 6 is a flow diagram that schematically illustrates the closed loop method of determining the thickness of the next layer in a model according to the present invention.

As schematically shown in FIG. 6, the closed loop method of selecting the next layer thickness $\Delta Z_{i+1}$, which also corresponds to selecting the position of the next slice $Z_{i+1}$ because $Z_{i+1} = Z_i + \Delta Z_{i+1}$, begins with the operator's selection of an initial layer thickness $\Delta Z_0$ and a control value for the geometrical error $\Re_{CTRL}$. Incidentally, one can regard the parameter $\Delta Z_{i+1}$ as the step size, implying that it is the step taken in the process to arrive at the next slice $Z_{i+1}$ from the current slice $Z_i$. A slice ($Z_i$ or $Z_{i+1}$ for example) can also be considered to be the intersection of the layer-based model of the desired object with a plane parallel to the previous slice $Z_{i-1}$ used.

Figure 12:
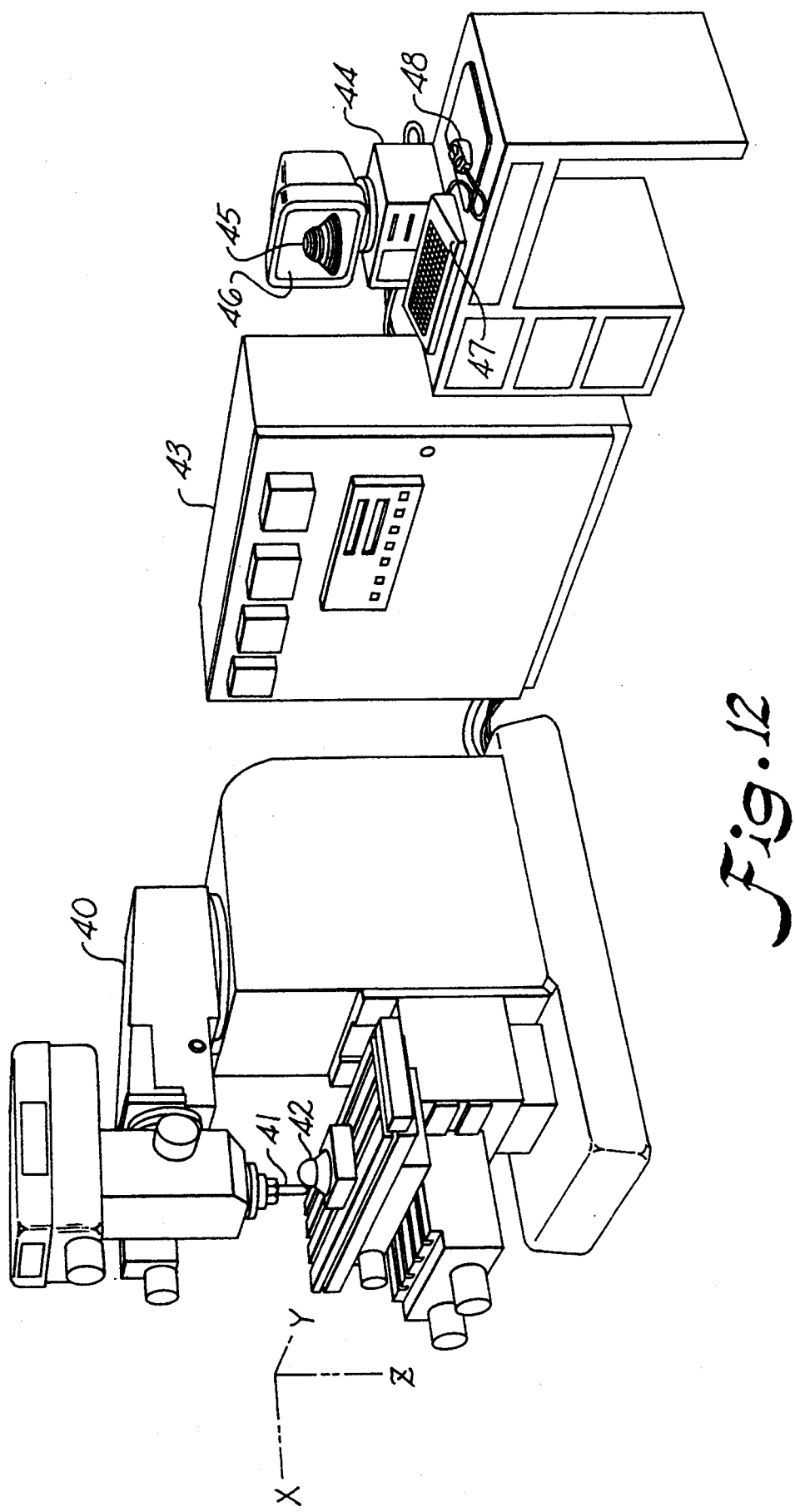
FIG. 12 schematically represents the adaptive lamina generation method of the present invention in a manufacturing context.

In accordance with the present invention, the operator typically selects the initial layer thickness $\Delta Z_0$ to be the maximum layer thickness that the process will allow. If for example, a milling machine will remove a maximum depth of about 3 millimeters of material from a workpiece at a single pass, then the initial layer thickness $\Delta Z_0$ selected by the operator for such a process, should not exceed this maximum process amount. Similarly, in a stereolithography machine, the maximum layer thickness is on the order of 625 $\mu$m, and this would be an upper limit on the initial layer thickness $\Delta Z_0$ selected by the operator as one of the initial inputs to be used in the closed loop method of determining the thickness $\Delta Z_{i+1}$ of the next layer. As schematically shown in FIG. 12 for example, depending upon the operating characteristics of a milling machine 40 and the desired object that milling machine 40 is to produce from a workpiece 42, including the geometrical considerations of the desired object and the operating parameters of the milling machine 40, the operator inputs $\Delta Z_0$ via a keyboard 47 or another input device such as a mouse 48, into a work station 44 that is preprogrammed with and running an embodiment of an adaptive lamina generation program through the machine controller 43 in accordance with the present invention.

An embodiment of a computer program configured in accordance with the adaptive lamina generation method of the present invention is presented in the Appendix. Inputs describing the boundary file of the desired object are received by the program in data interchange format (DXF) from Autocad Release 11 ® for example. The program also receives operator-supplied inputs on milling process parameters such as the type of tool, flat end mill or spherical end mill, speed, feed rate, etcetera. The program is configured in the open loop method such as shown schematically in FIG. 7 and uses operator-supplied inputs of maximum layer thickness, minimum layer thickness, and geometrical error $\Re_{CTRL}$ to generate the layers of the adaptive lamina model of the desired object to be machined. The program identifies all horizontal sections, abrupt changes in surfaces, such as edges as in FIG. 8B, and transition points/sections between CAD entities such as hemispheres, cones, and rectangular blocks. The program uses these identified horizontal sections in model feature recognition and incorporates all such features in adaptive lamina generation, machining process plan generation, and/or other relevant subroutines for representing and machining the desired object. For purposes of comparison with a model obtained using the adaptive lamina generation method of the present invention, the program generates layers for rough machining and finish machining using constant layer thickness. The program displays the sliced model such as shown in FIGS. 4 and 5 from any perspective desired by the operator. The program determines how to divide the pockets for a multiple pocket milling process and organizes the pockets. The program uses the adaptive lamina model of the present invention to generate the numerical control code for a milling machine such as a 3-axis (all-axis contouring) TMC 1000 ® milling machine from Light Machining Corporation of Massachusetts. The program displays slices of the milling tool paths on a CRT for verification by the operator using Autocad Release 11 ®.

Referring again to FIG. 6, as to the selection of the input corresponding to a desired (or acceptable) geometrical error $\Re_{CTRL}$, the control geometrical error, the operator typically selects the maximum error permissible for the process. The operator's selection is based on experience and/or other design requirements. The operator inputs the value for $\Re_{CTRL}$, the control geometrical error, into an embodiment of the present invention's adaptive lamina generation program running on a workstation 44 or 54 schematically shown respectively in FIGS. 12 and 13.

In one embodiment of the present invention's adaptive lamina generation program running on the workstation, the operator can select whether to employ the closed or open loop method for determining the thickness of the layers in the model. In another embodiment of the present invention's adaptive lamina generation program running on the workstation, the program can determine from the initial inputs $\Delta Z_0$ and $\Re_{CTRL}$ whether to employ the closed loop method or the open loop method. The choice takes into account the various assumptions mentioned above in arriving at the mathematical relationship between the layer thickness $\Delta Z$ and the geometrical error.

Figure 10A:
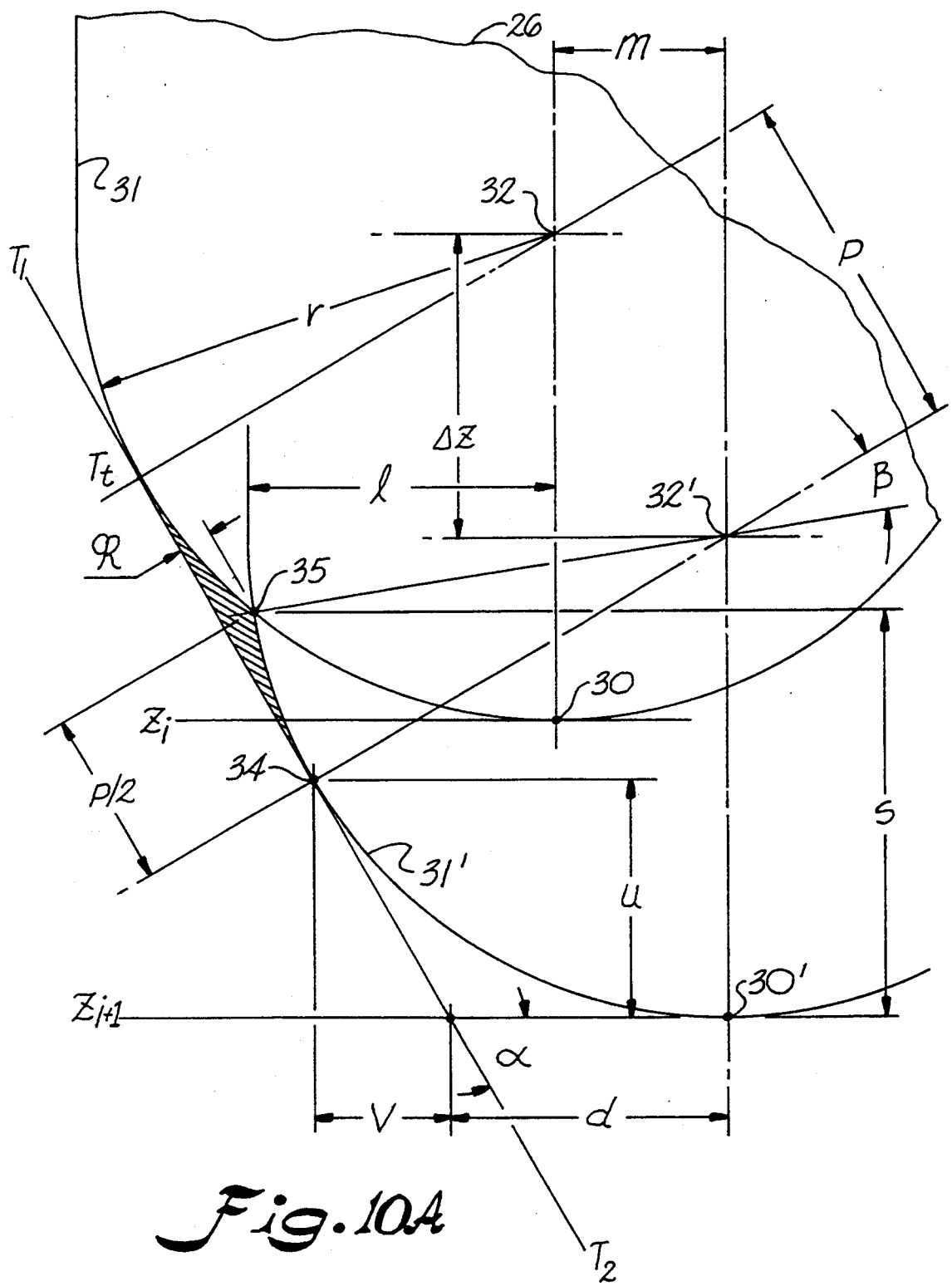
FIG. 10A illustrates the relationship between the thickness of the next layer and the geometrical error for a spherical end mill where the spherical portions of the tool intersect based on the prior position of the tool and the subsequent position of the tool indexed by the thickness of the next layer of the model.
Figure 10B:
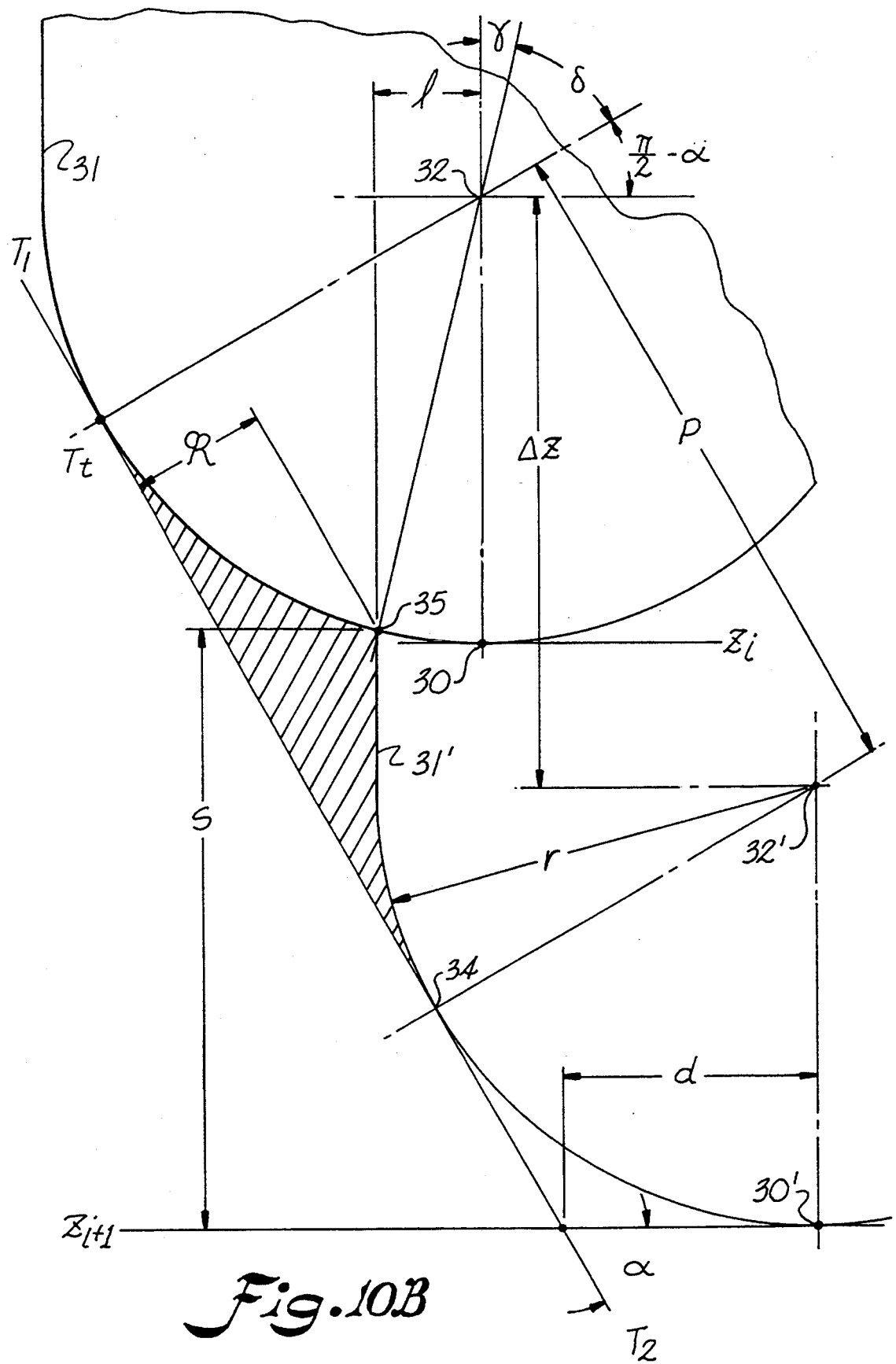
FIG. 10B illustrates the relationship between the thickness of the next layer and the geometrical error for a spherical end mill where the spherical portion of the tool in the prior orientation intersects with the cylindrical portion of the tool in the subsequent orientation of the tool indexed by the thickness of the layer of the model.
Figure 13:
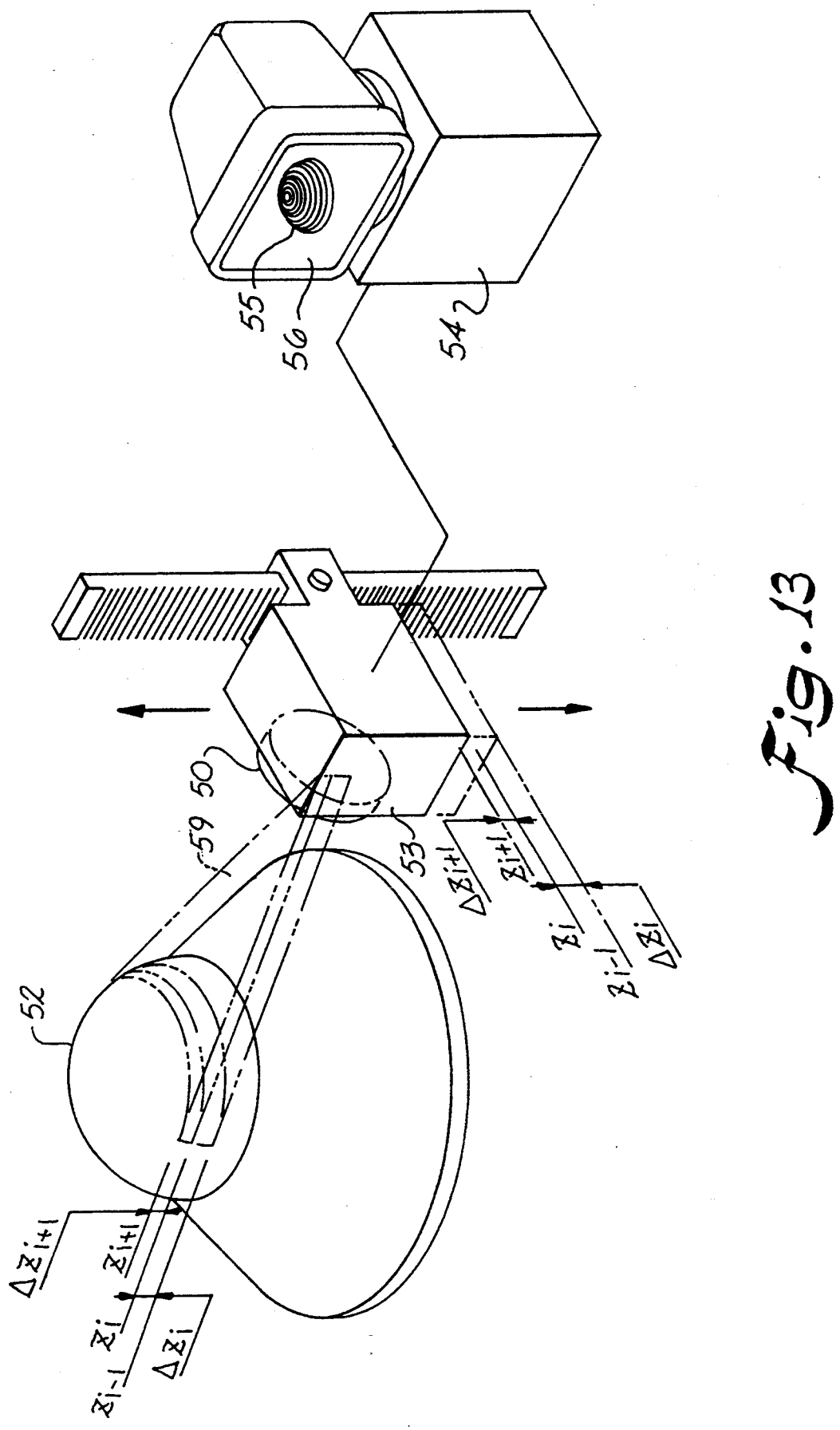
FIG. 13 schematically represents the adaptive lamina generation method of the present invention in a scanning profile context.

As schematically shown in FIG. 6, in performing the closed loop method the adaptive lamina generation program of the present invention substitutes the initial layer thickness $\Delta Z_0$ into the appropriate mathematical relationship that will yield a calculation of the geometrical error $\Re_{CALC}$ that is expected between the desired profile of the object and the profile that results from the use of a layer of the initial layer thickness $\Delta Z_0$. The appropriate mathematical relationship is schematically expressed in FIG. 6 in the form $F_1(\Delta Z_{i+1,j},$ GEOMETRY, $Z_i)$ where $\Delta Z_{i+1,j}$ is the $j_{th}$ iteration for the $(i+1)_{th}$ slice of the model. Thus, initially, $\Delta Z_{i+1,0}=\Delta Z_0$. The GEOMETRY term refers to the local geometry of the profile of the desired object between slices $Z_i$ and $Z_{i+1}$ and the nature of the operating parameters of the process that is being used in conjunction with the desired object. For example, if the process is a milling process with a particular type of cutting tool, the geometry of the tool would play a part in defining the mathematical relationship between the geometrical error and the layer thickness. If for example, the process is a scanning process as schematically shown in FIG. 13 with a particular type of scanning beam 59, the geometry of the footprint of the beam 59 and its specific interaction with the object (such as irradiation depth and shape of the irradiated region, or fusion depth and shape of the fused region), would play a part in defining the mathematical relationship between the geometrical error and the layer thickness. The appropriate mathematical relationship $F_1(\Delta Z_{i+1,j},$ GEOMETRY, $Z_i)$ schematically shown in FIG. 6 could be a relationship such as Equation (3), (4), (5a) or (5b) below, if one assumes that the profile of the desired object is coincident with the tangent $T_1 T_2$ as shown in FIGS. 11, 10A, and 10B.

As schematically shown in the flow chart in FIG. 6, the program compares the calculated geometrical error $\Re_{CALC}$ to the control geometrical error $\Re_{CTRL}$. If $\Re_{CTRL} \geq \Re_{CALC}$, the intersection of the slice $Z_{i+1,0}$ with the model is canceled, and the layer thickness $\Delta Z_{i+1,0}$ is adjusted by a correction factor $\epsilon$. In more general terms for subsequent layers, the intersection of the slice $Z_{i+1}$ with the model is canceled, and the layer thickness $\Delta Z_{i+1,j}$ is adjusted by a correction factor $\epsilon$.

As schematically shown in FIG. 6, the correction factor $\epsilon$ represents the selection of a new value of the thickness of the next layer. This new value is to be used in the mathematical relationship $F_1(\Delta Z_{i+1,j},$ GEOMETRY, $Z_i)$ to calculate a new geometrical error $\Re_{CALC}$. This selection of a new value of the thickness of the next layer, is made depending upon any relationship that will converge toward an acceptable, and therefore final, value of the thickness $\Delta Z_{i+1}$ of the next layer. For example, the new value of the thickness of the next layer can be the unacceptable value $\Delta Z_{i+1,j}$ of the thickness of the next layer, divided by two. In such a case, $\epsilon$ would be $\Delta Z_{i+1,j}/2$. The $\epsilon$ term presented in FIG. 6 schematically represents a way of modifying the unacceptable layer thickness (a.k.a. step size) in a way that is designed to converge toward the acceptable layer thickness based on the criterion of geometrical error $\Re_{CTRL}$. Numerical analysis techniques for estimating step size in a manner that converges toward the desired value, can be found in standard reference books such as Mathematical Handbook by Korn and Korn. Thus, a converging relationship other than $\epsilon = \Delta Z_{i+1,j}/2$ also can be used to select the new value of the layer thickness for the recalculation of the geometrical error with the new value of the layer thickness.

As schematically shown in FIG. 6, the position of the intersecting plane $Z_{i+1}$ relative to the prior plane $Z_i$ defining the other surface of the next layer of thickness $\Delta Z_{i+1,j}$, continues to be recomputed until the calculated geometrical error $\Re_{CALC}$ is less than or equal to the control geometrical error $\Re_{CTRL}$, which means that the final layer thickness $\Delta Z_{i+1}$ has been determined. When this condition has been attained, the next layer of the calculated thickness is added to the model 45 or 55 as respectively shown in schematic fashion in FIGS. 12 and 13. Unless the generation of the whole model is complete as shown in FIG. 3 for example, computation of the next layer thickness $\Delta Z_{i+2}$ will be initiated using $\Delta Z_0$ as the initial layer thickness for testing the calculated geometrical error $\Re_{CALC}$ against the control geometrical error $\Re_{CTRL}$.

Figures 8B, 8C:
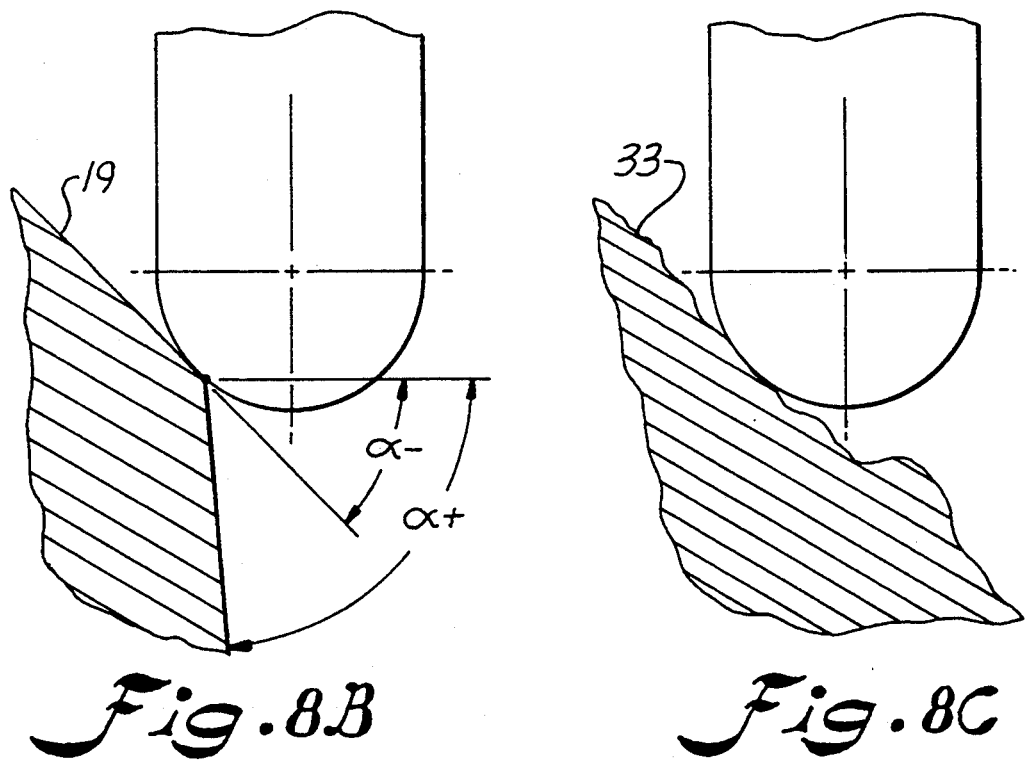
FIG. 8B schematically illustrates one of the constraints imposed upon the use of the open loop method of determining the thickness of the next layer.
FIG. 8C illustrates another of the constraints imposed upon the open loop method of determining the thickness of the next layer.

The closed loop method can give satisfactory results, even when discontinuities in the desired profile 19 are encountered, such as shown in FIG. 8B for example. The main disadvantage of the closed loop method with feedback is the number of trials that must be computed just to evaluate the geometrical error $\Re_{CALC}$. Only one of the computations of the trial $\Delta Z_{i+1,j}$'s is used to guide operation of the machine, such as generating tool paths in the case illustrated in FIG. 12 for example. The intersection routine is time consuming, especially for complex object shapes. Having to calculate the theoretical layer thickness $\Delta Z_{i+1,j}$ at each iteration, at each slice $Z_i$ exacts a high penalty in the time taken to follow this procedure.

Figure 7:
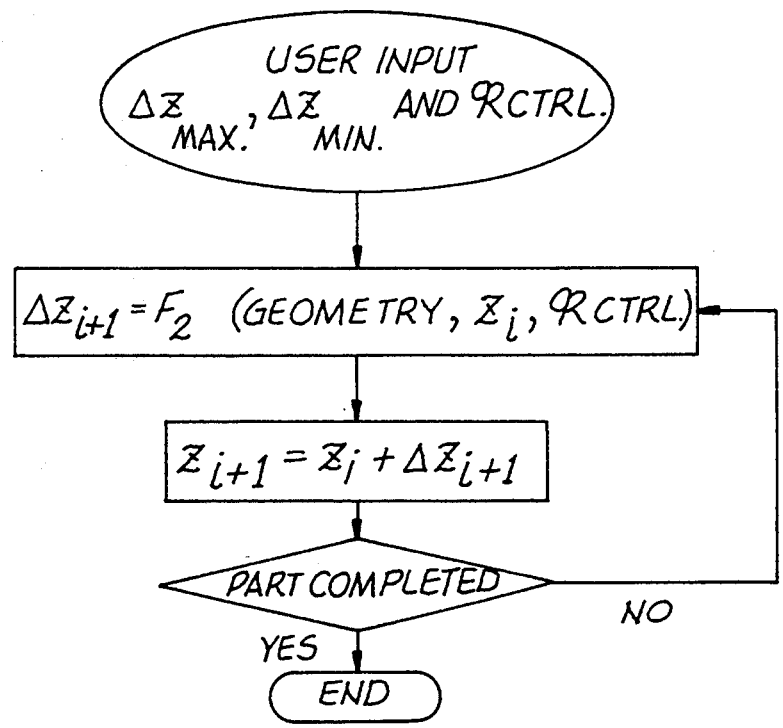
FIG. 7 is a flow diagram that schematically illustrates the open loop method of determining the thickness of the next layer in a model according to the present invention.

The open loop method provides an alternative method of selecting the thickness of the next layer. The open loop method provides a compromise between the time constraints imposed by the iterative nature of the closed loop and the exactness of the closed loop's calculation of the geometrical error. In the open loop method, the calculation of the thickness of the next layer requires only a single calculation for each layer, as opposed to the potentially large number of calculations that the closed loop might require to arrive at each thickness of the next layer. However, this calculation used in the open loop, is based on the assumption that a particular approximation is a good one. Expressed in geometrical terms, this assumption of the open loop calculation is that the line $T_1 T_2$ shown in FIG. 8A, is a good approximation of the slope of the profile 19 of the desired object at the $Z_i$ slice, the slope being related to the angle $\alpha$. As will become apparent from the discussion below, this assumption pertains to the lines $T_1T_2$ in FIGS. 10A, 10B, and 11. The flow chart for the open loop method is shown in FIG. 7, where the feed back loop in FIG. 6 is replaced by a new evaluation function.

In accordance with the open loop method of the present invention, the thickness $\Delta Z_{i+1}$ of the next layer is determined by an extrapolation of the control geometrical error $\mathfrak{R}_{CTRL}$ at the current slice $Z_i$, assuming that the thickness $\Delta Z_{i+1}$ of the next layer is bounded by a maximum value $\Delta Z_{MAX}$ provided by the user and a minimum value $\Delta Z_{MIN}$ imposed by the manufacturing process. The current slice $Z_i$ is the common boundary of the previous layer and the next layer. The difficulty associated with the open loop method lies in finding an appropriate evaluation function which is not significantly affected by curvature discontinuities.

The open loop approach is only effective as long as the following two assumptions prevail. First, the choice of the layer thickness that is permitted by the process in question, must be such that the radius of curvature of the profile over the maximum value of the thickness $\Delta Z_{MAX}$ of the next layer, is not severe. In other words, unlike the case shown in FIG. 8C for example, the local radius of curvature of the profile of the desired object, must be large relative to the radius of curvature that characterizes the way that the machine in question interacts with the desired object. Second, the value of the thickness $\Delta Z_{i+1}$ of the next layer must be small relative to the radius of curvature of the profile over the interval that is encountered by the next layer. In other words, unlike the case shown in FIG. 8B for example, the profile of the object being modeled, does not have sudden shape variations. Typically, the open loop method can be applied in any situation that can be modeled with spherical shapes.

To summarize, referring to FIGS. 8A, 10A, 10B and 11, the layer thickness $\Delta Z_{i+1}$ for the next slice can be mathematically obtained from the current slice $Z_i$ by the following function that relates: (1) the geometry of the desired profile of the object, (2) characteristic features of the process that uses the layered modeling technique for the object, and (3) the error parameter $\mathfrak{R}$ (or its approximation) between the profile of the layer of the model and the profile of the desired object. This is expressed qualitatively in equation form as:

$$\Delta Z_{i+1} = F(\mathfrak{R}_{CTRL}, \text{Process Features}, \text{Slope}_{min}) \quad (1)$$

where:

The $\mathfrak{R}_{CTRL}$ variable refers to the error parameter that is defined between the profile of the layer of the model and the profile of the desired object. In the case of a manufacturing process for milling an object, this error parameter $\mathfrak{R}_{CTRL}$ can be considered to be the roughness of the surface of the object produced by the milling process.

The Process Features variable refers to particular features of the process that impose certain geometrical relationships upon the edge profile of the model. For example, in a process of manufacturing a part with a mill, Process Features would correspond to the particular geometry associated with a spherical end mill (FIG. 8A) or a flat end mill (FIG. 11).

The Slope$_{min}$ variable refers to the minimum slope that is encountered in slice $Z_i$, which is the slice just before the slice $Z_{i+1}$ that defines the thickness $\Delta Z_{i+1}$ of the next layer.

Referring to FIG. 8A, the radius of curvature of the spherical end mill is r, and the point 30 of spherical end mill 26 is tangent to the slice $Z_i$. The profile 19 of the desired object intersects with the slice $Z_i$ at the point $I_2$. The line $T_1T_2$ intersects with the point $I_2$ and is tangent with the edge 31 of the spherical end mill 26 at point $T_t$, at an angle $\alpha$ to the slice $Z_i$. The profile 19 of the desired object is tangent to the edge 31 of the spherical end mill 26 at point $T_b$. The distance between point 30 and $I_2$ is d, which is the lateral offset of the mill 26 that relates to the geometry and the angle $\alpha$. At this point all the parameters are known except the minimum slope, which must be determined.

Referring to FIG. 8A for a spherical end mill, if one adopts the assumption that the minimum slope at the point $I_2$ can be approximated by the line $T_1T_2$, then the minimum slope is approximated from d or d', where d' represents the non-dimensional offset used to compensate contours for a spherical end mill. In other words $$d' = \frac{d}{r} \text{ and } 0 \leq \alpha \leq \frac{\pi}{2}$$

and FIG. 8A shows the assumption that the actual tangent (not shown) to the profile 19 through $I_2$ is in fact represented by the tangent $T_1T_2$ to the tool at $T_t$ which intersects $I_2$.

In each of the cases shown in FIGS. 8A, 10A, 10B, and 11, the equation for the angle $\alpha$ (the minimum slope) is therefore given by the following expression:

$$\sin \alpha = \frac{2dr}{r^2 + d^2} = \frac{2d'}{1 + d'^2} \quad (2)$$

However, the expression presented in equation (2) is an adequate approximation of the actual minimum slope of the profile 19 in FIG. 8A in all cases except the following two cases:

i. When there is a discontinuity of the tangent, for example at an edge as shown in FIG. 8B, and the angle $\alpha$ is any value between the value before, $\alpha-$, and the value after, $\alpha+$, and the tool is in contact with the discontinuity in the profile 19.

ii. When the profile of the desired object is described by distances that are small compared to the distances that characterize the way that the machine interacts with the profile. In the case where the machine is a machine tool, the way that the machine interacts with the profile of the desired object is with a cutting tool for example. As shown in FIG. 8C, this condition that defines the second exception, can be mathematically described as a condition in which the local radius of curvature of the profile 33 of the desired object is smaller than the radius of curvature of the cutting tool that is operating on the workpiece to produce the desired object. This exceptional condition is one in which the machine is not capable of properly interacting with the desired profile of the object.

However, for most well designed objects of manufacture, the design is adapted to the manufacturing process, and therefore the edges are filleted, and the surfaces are smooth. Thus, the above exceptions typically do not affect the process of modeling an object to be made with a computer-controlled milling machine for example.

Now that the minimum slope has been obtained, the layer thickness $\Delta Z$ can be directly related to the geometrical error parameter $\Re$ depending on the geometrical considerations that characterize the particular process. For example, for a machining process with a flat end mill, the relationship between $\Delta Z$ and $\Re$ can be expressed as:

$$\Delta Z = \frac{\Re(1 + d'^2)}{1 - d'^2} \quad (3)$$

where the variables are defined in FIG. 11 as follows. The region of the geometrical error in the vertical plane shown in FIG. 11 is indicated by the triangular-shaped region of cross-hatching. The parameter $\Re$ that has been chosen to quantify the local geometrical error or quality associated with the layer-based model, is the maximum peak to valley height of the profile in the assessment length. The bottom of mill 24 intersects with the centerline of mill 24 at the point 30 when the bottom of the mill is at the level of slice $Z_i$. The bottom of mill 24 intersects with the centerline of mill 24 at the point 30' when the bottom of the mill is at the level of slice $Z_{i+1}$. The line $T_1T_2$ is tangent at point $T_t$, which is the point of intersection between the cylindrical edge 25 of the flat end mill 24 and the bottom of flat end mill 24 at slice level $Z_i$. The distance m is the lateral distance that the mill must move as the cylindrical edge 25 relocates to the edge 25' as the bottom of the mill 24 respectively moves vertically a distance $\Delta Z$ from the level of slice $Z_i$ to the level of slice $Z_{i+1}$.

In yet another example of a machining process, but this time with a spherical end mill, the relationship between $\Delta Z$ and $\Re$ can be expressed by one of two equations (4) and (5) below, depending on the intersection between two consecutive positions of the tool (also corresponding to the edges or profiles of the layers) where the bottom of the tool is successively tangent to slices $Z_i$ and $Z_{i+1}$. FIG. 10A shows the case where the intersection occurs between spherical portions of the tool (also corresponding to the edges or profiles of the layers).

The region of the geometrical error in the vertical plane shown in FIG. 10A is indicated by the cross-hatched region. The parameter $\Re$ that has been chosen to quantify the local geometrical error or quality associated with the layer-based model, is the maximum peak to valley height of the profile in the assessment length. The point 30 of spherical end mill 26 is tangent to the slice $Z_i$. The point 30' of spherical end mill 26 is tangent to the slice $Z_{i+1}$. The center of curvature of the spherical end of the mill is 32 for the $Z_i$ position of the mill and is 32' for the $Z_{i+1}$ position of the mill. The profile of the mill for the $Z_i$ position of the mill is 31, and the profile of the mill for the $Z_{i+1}$ position of the mill is 31'. The vertical distance $\Delta Z$ is the distance between the level of slice $Z_i$ and the level of slice $Z_{i+1}$. The straight line $T_1T_2$ defines the approximated slope of the profile of the desired object and is tangent at point $T_t$ to the profile 31 of the mill located at its $Z_i$ position. The distance between point 30' and the point where the line $T_1T_2$ intersects the slice $Z_{i+1}$ is the offset d. The distance m is the horizontal distance that the mill must move as the tip 30 of the mill 26 moves vertically from the level of slice $Z_i$ to the level of slice $Z_{i+1}$. The radius of curvature of the spherical end of the mill is r, which equals the sum of l and m. The distance between the successive positions 32 and 32' of the center of curvatures of the mill is p. The base of the geometrical error region is bounded by the points $T_t$ and endpoint 34, which is where line $T_1T_2$ is tangent to the profile 31' of the mill disposed at the level of slice $Z_{i+1}$. The base of the geometrical error region measures p/2. The apex 35 of the geometrical error region is the point where the profile 31 of the mill disposed at the $Z_i$ slice level intersects the profile 31' of the mill disposed at the $Z_{i+1}$ slice level. The vertical distance between the apex 35 of the geometrical error region and the $Z_{i+1}$ slice level is defined by S. The vertical distance between the endpoint 34 of the geometrical error region and the $Z_{i+1}$ slice level is defined by u, and the distance v is u/tan $\alpha$. The relationship between $\Delta Z$ and $\Re$ can be expressed as:

$$\Delta Z = \frac{4d'\sqrt{2r\Re(1 - \Re)}}{1 + d'^2} = 2\sin\alpha \sqrt{2r\Re(1 - \Re)} \quad (4)$$

provided that $S \leq r$; $p \leq 2r$; and $1 \leq r$.

FIG. 10B shows the case where the intersection is defined between the spherical portion of the tool (also corresponding to the edges or profiles of the layers) and the cylindrical portion of the tool (also corresponding to the edges or profiles of the layers). The region of the geometrical error in the vertical plane shown in FIG. 10B is indicated by the cross-hatched region. The parameter that has been chosen to quantify the local geometrical error or quality associated with the layer-based model, is the maximum peak to valley height of the profile in the assessment length. The radius of curvature of the spherical end of the mill is r. The point 30 of spherical end mill 26 is tangent to the horizontal slice $Z_i$. The point 30' of spherical end mill 26 is tangent to the horizontal slice $Z_{i+1}$. The center of curvature of the spherical end of the mill is 32 for the $Z_i$ position of the mill and is 32' for the $Z_{i+1}$ position of the mill. The profile of the mill for the $Z_i$ position of the mill is 31, and the profile of the mill for the $Z_{i+1}$ position of the mill is 31'. The straight line $T_1T_2$ defines the approximated slope of the profile of the desired object and is tangent at point $T_t$ to the profile 31 of the mill located at its $Z_i$ position. The horizontal distance between point 30' and the point where the line $T_1T_2$ intersects the slice $Z_{i+1}$ is the offset d. The vertical distance $\Delta Z$ is the distance between the level of slice $Z_i$ and the level of slice $Z_{i+1}$. The distance between the successive positions 32 and 32' of the center of curvatures of the mill is p. The base of the geometrical error region is bounded by the points $T_t$ and endpoint 34, which is where line $T_1T_2$ is tangent to the profile 31' of the mill disposed at the level of slice $Z_{i+1}$. The apex 35 of the geometrical error region is the point where the circular portion of the profile 31 of the mill disposed at the $Z_i$ slice level intersects the straight line portion of the profile 31' of the mill disposed at the $Z_{i+1}$ slice level. The distance l is the horizontal distance between the apex point 35 and the centerline of the mill disposed at the level of slice $Z_i$. The vertical distance between the apex 35 of the geometrical error region and the $Z_{i+1}$ slice level is defined by S. The relationship between $\Delta Z$ and $\Re$ is given by: (5a)

$$\Delta Z = \frac{2d'[r(1 + d'^2) - 2d'(r - \Re) + (1 - d'^2)\sqrt{2r\Re(1 - \Re)}\,]}{1 - d'^4}$$

or the relationship is given by:

$$\Delta Z = \tan\alpha[r - (r - \Re)\sin\alpha + \cos\alpha \sqrt{2r\Re(1 - \Re)}\ ] \quad (5b)$$

provided that $$\alpha = \arcsin \frac{2d'}{1 + d'^2}$$

and $1 \leq r$ and either $S > r$ or $p > 2r$. Both equations 5a and 5b assume that $r >> \Re$. Moreover, $S \leq r$ can be written in term of $\alpha$ and $\beta$ as follows: $(\pi/2) - \alpha - \beta \leq 0$.

To relate the layer thickness $\Delta Z$ to the geometrical error for a spherical end mill, if the conditions $S \leq r$ and $p \leq 2r$ prevail, use equation (4). Otherwise, use equation (5a) or (5b).

As schematically shown in FIG. 7, the constraints on the thickness of the next layer, $\Delta Z_{MAX}$ and $Z_{MIN}$ are provided by the user as inputs. In accordance with the present invention, the operator typically selects the maximum layer thickness $\Delta Z_{MAX}$ to be the maximum layer thickness that the process will allow. As noted above, the minimum layer thickness $\Delta Z_{MIN}$ is the minimum incremental degree of control that the process can provide to the user.

Referring again to FIG. 7, as to the selection of the input corresponding to a desired (or acceptable) geometrical error $\Re_{CTRL}$, the control geometrical error, the operator typically selects the maximum error permissible for the process. The operator's selection is based on experience and/or other design and/or process requirements. The operator inputs the value for $\Re_{CTRL}$, the control geometrical error, into an embodiment of the present invention's adaptive lamina generation program running on a workstation 44 or 54 schematically shown respectively in FIGS. 12 and 13 for example.

As schematically shown in FIG. 7 for example, the thickness $\Delta Z_{i+1}$ is a function $F_2$ of the GEOMETRY, the location of the current slice $Z_i$, and the control geometrical error $\Re_{CTRL}$. The GEOMETRY portion of the function $F_2$ is obtained from a calculation of the minimum local slope of the profile of the desired object at the level of the current slice $Z_i$. This slope can be obtained using Equation (2) above in accordance with FIG. 8A. The slope calculation then is used in another equation to obtain the thickness $\Delta Z_{i+1}$ of the next layer. The particular equation used to calculate this thickness $\Delta Z_{i+1}$ of the next layer depends upon additional considerations of GEOMETRY. For example, if the GEOMETRY involves the use of a flat end mill, Equation (3) above is used to obtain the thickness of the next layer. Similarly, if the GEOMETRY involves a spherical end mill, one of equations (4) and (5) is used to obtain the thickness of the next layer. If $S \leq r$ and $p$ is $\leq 2r$, then equation (4) is used. Otherwise, one of Equations (5a) or (5b) is used. The adaptive lamina generation program of the present invention uses the common slice $Z_{i+1}$ between the last layer $\Delta Z_{i+1}$ and the next layer $\Delta Z_{i+2}$ and again calculates the minimum slope at that new slice $Z_{i+2}$ location, and repeats the calculation process to obtain the thickness $\Delta Z_{i+2}$ of the next layer. This continues until the thickness of the last layer has been calculated.

As noted above, in both the closed and open loop methods, the desired geometrical error tolerance is selected based upon the user's knowledge of the complexity of the shape of the desired object. In some embodiments of the adaptive lamina generation method of the present invention, a single desired geometrical error tolerance is used over the entire process for every selection of the next layer thickness. However, based upon the user's knowledge of the complexity of the shape of the process being controlled in the layer-by-layer manner, different desired geometrical error parameters $\Re_{CTRL}$ may be chosen in accordance with the adaptive lamina generation method of the present invention, to govern the selection of the next layer thickness over different intervals of the profile in question. Moreover, the geometrical error can be an error expressed as a linear distance such as $\Re$ shown in FIGS. 9B, 10A, 10B, and 11 for example. However, other forms of expressing the error between the profile of the desired object and the profile of the model of such object, also can be chosen. For example, the geometrical error can be expressed as an area of a cross section, such as the cross-hatched areas shown in FIGS. 9B, 10A, 10B, and 11. Similarly, the geometrical error can be expressed as the volume of a section.

Referring to FIG. 12 for example, in a process according to the present invention, a computer controlled milling machine 40 is performing a manufacturing process wherein a rotating mill 41 is removing material from a workpiece 42 to produce a desired perimeter on an object, which can be considered to have been designed with the aid of a conventional CAD software package. After each complete machine path of the mill 41 around the workpiece 42, the mill 41 is indexed incrementally by machine 40 under the control of its controller 43. In accordance with the present invention, a workstation 44 such as a personal computer can be programmed with the requisite equations and routines to perform the closed loop method and open loop method shown schematically in respective FIGS. 6 and 7. The desired profile of the object to be modeled, can be generated or used from any software package such as Autocad Release 11 ®; Autocad Release 12 ®; Aries ®; Proengineer ®; Intergraph ®; etc. A program calculating the geometrical error from the relevant equations and carrying out the open and/or closed loop method can be run satisfactorily on a microprocessor such as the Sun Microsystem Work Station IPX ®, the Sparcstation 2 ®, DECstation ®, IBM RISC ® workstation, or any workstation or personal computer with comparable memory and processing power. Such program will provide information to the process machine's controller 43. As schematically shown in FIG. 12 for example, this information is provided in accordance with a model 45 (schematically represented on a CRT display 46) generated by the adaptive lamina generation process of the present invention. Controller 43 uses this information for controlling the successive cutting paths performed by milling machine 40 as it indexes mill 41 an incremental amount $\Delta Z$ (See FIGS. 4, 9A, 9B for example) along the longitudinal Z axis of mill 41 for each cutting path around workpiece 42.

Similarly, FIG. 13 schematically illustrates a process involving a scanning machine 50 operating with respect to a desired object 52. A workstation 54 including a microprocessor preprogrammed in accordance with the adaptive lamina generation method of the present invention, provides information to the controller 53 of scanning machine 50. This information is provided in accordance with a layered model 55 (schematically represented on a CRT display 56) generated in accordance with the adaptive lamina method of the present invention. Controller 53 uses this information to control the operation of scanning machine 50 as it scans the desired object 52. As schematically shown in FIG. 13, controller 53 can be preprogrammed to control the next vertical increment $\Delta Z_{i+1}$ of displacement of the scanning field 59 projecting from scanning machine 50 in carrying out its scanning process with respect to the desired object 52.

Moreover, as schematically shown in FIGS. 12 and 13 for example, the adaptive lamina generation program of the present invention can be configured so that the entire model 45 or 55 can be displayed on the CRT 46 or 56 to the operator before the model is provided to the machine 40 or 50. In this way, the operator can observe the model 46 or 56 and change the inputs of $\mathcal{R}_{CTRL}$ and/or $\Delta Z_{MAX}$ and/or $\Delta Z_{MIN}$, if the model is deemed unacceptable for the task.

The adaptive lamina generation method of the present invention permits a microprocessor to be programmed to automatically compute each successive layer thickness as a function of both local geometry and process, without the knowledge of an experienced operator. It optimizes the total number of layers needed to create or represent the object and/or meet a prespecified quality criterion, without having to decrease the layer thickness for the entire model just to satisfy a tolerance for the quality criterion that is desired in a particular region of the model.

```c
/* ************************************************
 *
 *           ADAPTIVE LAMINATED MACHINING
 *                      by
 *               Franck A. Vouzelaud
 *
 *              Experimental program
 *
 * ************************************************ */

/* ----------------------------------------------- *
 * Loop
 * ----------------------------------------------- */
loop_detection(list1, list2)

/* Identify the loops inside a contour */ entity list1[], list2[];

{
    /* variable declaration */
    short l;
    int k, l1, l2, l2_n, n1, n2, n1a, n2a, inter, index, success, keep, ref1;
    int type_inter, j1, j1, j2;
    double distance, l_, angle_r, angle, teta1, teta2;
    vector v1, v2;
    point2d pt, pt_init, pt_inter;
    entity list1a[200];

/* Initialisation of variables */
    l = 1;
    l1 = 0;
    l2_n = 0;

/* for all the contours detect the loops */
    while ( l1 < (int) list1[0].z) {
        n1 = l1+1;
        n2 = l1+list1[l1].d;
        l1 = n2+1;

/* create an intermediate list */
        for (k = n1, n2a = 0; k <= n2; k++, n2a++) {
            entity_copy(list1[k], &list1a[n2a], 1);
            list1a[n2a].ref2 = 0;
        }

/* for each contour while there is at least on entity in the contour */
        while (entity_return(list1a, &list2[l2_n+1], 0, n2a, &index) == 1) {
            list2[l2_n].type = 0;
            l2 = l2_n+2;
            pt_init.x = list2[l2-1].x1;
            pt_init.y = list2[l2-1].y1;
            do {
                l = 2 .;
                type_inter = 0;
                angle_r = 2*pi;
                for (k = 0; k <= n2a; k++) {
                    success = entity_next(list1a, k);
                    if (success != 0) {
                        inter = intersect(list2, list1a, l2-1, k, &pt_inter,
                                                                   &distance);
                        switch (inter) {
                            /* nothing to do if cases 0, 3, 4, 5, 6, 7, 8, 9, 13, 14, 15, 18 */
                            case 1;
                            case 19:
                                if (distance < 1 || ev(distance, l) < l.) {
                                    l = distance;
                                    type_inter = inter;
                                    keep = k;
                                    pt.x = pt_inter.x;
                                    pt.y = pt_inter.y;
                                }
                                break;

case 2:
                            case 10:
                            case 12:
                            case 16:
                                /* angle between v1 and v2 */
                                tg_vector(list2[l2-1], &v1, 2);
                                tg_vector(list1a[k], &v2, 1);
                                angle_v(&teta1, v1);
                                teta1 += pi;
                                angle_v(&teta2, v2);
                                angle = teta2-teta1;
                                if (angle < 0.) angle += 2*pi;
                                if ((ev(l, 1.) < 1. || l > 1.) &&
                                    (angle < angle_r || ev(angle, angle_r) <1.)) {
                                    angle_r = angle;
                                    l = 1.;
                                    type_inter = inter;
                                    keep = k;
                                    pt.x = pt_inter.x;
                                    pt.y = pt_inter.y;
                                }
                                break;

case 11:
                                if ((ev(l, 1.) < 1. || l > 1.) && type_inter != 12) {
                                    l = 1.;
                                    type_inter = inter;
                                    keep = k;
                                    pt.x = pt_inter.x;
                                    pt.y = pt_inter.y;
                                }
                                break;

case 17:
                                l = 0.;
                                type_inter = inter;
                                keep = k;
                                pt.x = pt_inter.x;
                                pt.y = pt_inter.y;
                                break;
```

```
/* take the closest intersection to the origine */

/* end condition */
    if (!(ev(pt_init.x, list2[i2-1].x2) +
         ev(pt_init.y, list2[i2-1].y2) < 100;) && (type_inter == 2 ||
         type_inter == 10 || type_inter == 11 || type_inter == 12 ||
         type_inter == 16))
         type_inter = 0;

/* if one intersection */
    switch (type_inter) {
    case 0:
        break;
    case 1:
        entity_copy(list1a[keep], &list2[i2], 1);
        list2[i2].x1 = pt.x;
        list2[i2].y1 = pt.y;
        list1a[keep].ref1 = 1;
        list1a[keep].flag1 = 0;

list1a[keep].x2 = pt.x;
        list1a[keep].y2 = pt.y;
        list1a[keep].ref2 = 1;
        list1a[keep].flag2 = 0;

if (list1a[index].type == 0) {
            list1a[index].x1 = pt.x;
            list1a[index].y1 = pt.y;
            list1a[index].ref1 = list2[i2-1].ref1;
            list1a[index].flag1 = 0;
            list1a[index].type = list2[i2-1].type;
        }

/* create a new element in the list list1a */
        else
        {
            insert(list1a, list2[i2-1], index, &n2a);
            if (keep > index) keep++;
            index++;
            list1a[index].x1 = pt.x;
            list1a[index].y1 = pt.y;
            list1a[index].flag1 = 0;
        } list2[i2-1].x2 = pt.x;
        list2[i2-1].y2 = pt.y;
        list2[i2-1].ref2 = 1;
        list2[i2-1].flag2 = 0;

i++;
        i2++;
        index = keep;
        break;

case 2:
    case 10:
    case 11:
    case 12:

case 16:
        pt.x = list2[i2-1].x2;
        pt.y = list2[i2-1].y2;
        entity_copy(list1a[keep], &list2[i2], 1);
        list2[i2].x1 = pt.x;
        list2[i2].y1 = pt.y;
        list2[i2].ref1 = list2[i2-1].ref1;
        list2[i2].flag1 = list2[i2-1].flag2;

list2[i2-1].ref2 = 1;

list1a[keep].x2 = pt.x;
        list1a[keep].y2 = pt.y;
        list1a[keep].ref2 = 1;
        list1a[keep].flag2 = list2[i2-1].flag2;

i++;
        i2++;
        index = keep;
        break;

case 17:
        pt.x = list2[i2-1].x1;
        pt.y = list2[i2-1].y1;
        if (list1a[index].type == 0)
            list1a[index].type = list2[i2-1].type;

/* create a new element in the list list1a */
        else
        {
            insert(list1a, list2[i2-1], index, &n2a);
            if (keep > index) keep++;
        }
        entity_copy(list1a[keep], &list2[i2], 1);
        list2[i2-1].x1 = pt.x;
        list2[i2-1].y1 = pt.y;
        list2[i2-1].flag1 = 0;

/* redefinition of the first entity */
        if (i2_n+1 == i2-1) {
            pt_init.x = pt.x;
            pt_init.y = pt.y;
        } list1a[keep].x2 = pt.x;
        list1a[keep].y2 = pt.y;
        list1a[keep].ref2 = 1;
        list1a[keep].flag2 = 0;

i++;
        index = keep;
        break;

case 19:
        pt.x = list1a[keep].x1;
```

```
                pt.y = list1a[keep].y1;
                entity_copy(list1a[keep], &list2[12-1]);
                list2[12].ref1 = 0;
            } list1a[keep].type = 0;

if (list1a[index].type == 0) {
                list1a[index].x1 = pt.x;
                list1a[index].y1 = pt.y;
                list1a[index].ref1 = list2[12-1].ref1;
                list1a[index].flag1 = list2[12-1].flag1;
                list1a[index].type = list2[12-1].type;
            }
            else
/* create a new element in the list list1a*/
            {
                insert(list1a, list2[12-1], index, &n2a);
                if (keep > index) keep++;
                index++;
                list1a[index].x1 = pt.x;
                list1a[index].y1 = pt.y;
                list1a[index].flag1 = list2[12].flag2;
            } list2[12-1].x2 = pt.x;
            list2[12-1].y2 = pt.y;
            list2[12-1].ref2 = 1;
            list2[12-1].flag2 = list2[12].flag1;

j++;
            12++;
            index = keep;
            break;

} while (type_inter != 0);
        list2[12_n].d = 2- (12_n+1);
        list2[12_n].flag1 = direction_loop(list2, 12_n+1, 12-1);
        list2[12_n].flag2 = 0;
        list2[12_n].ref2 = 1;

/* add an index as the contour has been modified */
        j = 12_n;
        j1 = j+1;
        j2 = j+list2[j].d;
        ref1 = 0;
        while (ref1 == 0 && j <= j2) {
            if (list2[j].ref2 != 0)
                ref1 = 1;
            j++;
        }
        list2[12_n].ref1 = ref1;

12_n = 12;
    }
    list2[0].z = (double) 12_n;
}
```

/*------------------------------------------------------------
loop_Removal
------------------------------------------------------------*/
loop_removal(list1, list2, list_ref, t_offset, ind, first)
/* remove undesired loops */
entity list1[], list2[], list_ref[];
double t_offset;
int ind, first;
{
/* declaration of variables*/
    int l1, l2, n, n1, n2, i, i1, i2, remove, inter;
    entity ent;
    point2d pt;

/* initialisation of variables */
    l1 = 0;
    l2 = 0;
    remove = 0;
    ent.type = 3;

if (t_offset > 0)
        ent.r = t_offset;
    else
        ent.r = -t_offset;

while ( l1 < (int) list1[0].z) {
        n1 = l1+1;
        n2 = l1+list1[l1].d;
        l1 = n2+1;

/* remove trivial cases */
        if (check_flag (list1, n1, n2) == 0) {

/* remove 'open chain */
            if (uv(list1[n1].x1, list1[n2].x2) +
                uv(list1[n1].y1, list1[n2].y2) < 1.) {

/* check all contours or conter clockwise contours*/
                inter = 0;
                if (ind == 0 || (ind == 1 && list1[n1-1].ref1 == 0 &&
                                 list1[n1-1].flag1 == -1)) {

/* find the first entity which has not been added to the list if possible */
                    n = 0;
                    i = n1;
                    while (n == 0 && i <= n2) {
                        if (list1[i].ref1 == 0) n = i;
                        i++;
                    }
                    if (n == 0) n = n1;

/* return a point in the middle of the first entity */
                    return_point(list1[n], &pt);

/* create a circle */
                    ent.cx = pt.x;
                    ent.cy = pt.y;
```

```
                                    unt.z = list[n].z;

/*----------------------------------------------------------------*/
/* calculate intersection circle/entity */
            inter = loop_intersection(ent, list_ref, flrst);

/* remove non-trivial cases */
            if (inter == 0 && (ind == 0 || list[nl-1].flagl != 1))) {
                (ind == 1 && (list[nl-1].refl != 1 || list[nl-1].flagl != 1))) {
                    for (i = nl-1; i <= n2; i++, l2++)
                        entity_copy(list[i], &list2[l2], 1);
            }
            else
                remove = 1;
        }
        else
            remove = 1;
    }
    else
        remove = 1;
    }
    list2[0].z = (double) l2;
    return(remove);
}

/*----------------------------------------------------------------*/
/* Entity_Next */
/*----------------------------------------------------------------*/
int entity_next(list, l)
entity list[];
int l;
{
    if (list[l].type != 0)
        return(l);
    else
        return(0);
}

/*----------------------------------------------------------------*/
/* Check_Flag */
/*----------------------------------------------------------------*/
int check_flag(list, n1, n2)
entity list[];
int n1, n2;
{
    int l;
    l = n1;
    while (l <= n2) {
        if (list[l].flagl != 0 || list[l].flag2 != 0)
            return(l);
        l++;
    }
    return(0);
}

/*----------------------------------------------------------------*/
/* Angle_Position */
/*----------------------------------------------------------------*/
int angle_position(ent, a1, a2, pt, d)
entity ent;
double a1, a2, *d;
point2d pt;
{
    int success;
    double a;
    point2d pc;

success = 0;

if (ev(ent.x1, pt.x) + ev(ent.y1, pt.y) < 100.) {
        success = 1;
        *d = 0.;
    }
    if (ev(ent.x2, pt.x) + ev(ent.y2, pt.y) < 100.) {
        success = 2;
        *d = 1.;
    }
    if (success == 0) {
        pc.x = ent.cx;
        pc.y = ent.cy;
        angle(&a, pc, pt);
    }
    if (success == 0 && a > a1 && a < a2) {
        success = 3;
        *d = (a-a1)/(a2-a1);
    }
    if (success == 0 && a+2*pi > a1 && a+2*pi < a2) {
        success = 4;
        *d = (a+2*pi-a1)/(a2-a1);
    }
    if (success == 0 && a-2*pi > a1 && a-2*pi < a2) {
        success = 5;
        *d = (a-2*pi-a1)/(a2-a1);
    }
    if (ent.d == 1 && success >= 3) *d = 1.-(*d);

return(success);
}

/*----------------------------------------------------------------*/
/* Insertion */
/*----------------------------------------------------------------*/
insert(list, ent, index, max)
entity list[], ent;
int index, *max;
{
    int i;
    for (i = *max; i > index; i--)
        entity_copy(list[i], &list[i+1], 1);
    entity_copy(ent, &list[index+1], 1);
    (*max)++;
}
```

```c
/*---------------------------------------------------------------
Intersection entity entity
---------------------------------------------------------------*/
int intersect(list1, list2, l1, l2, pt, l)
entity list1[], list2[];
int l1, l2;
point2d *pt;
double *l;
{
/* declaration of variables */
    entity e1, e2;
    int type1, type2, success, res1, res2, res3, res4;
    vector v1, v2, v3, cross;
    double l1, l2, delta, r1, r2, a1a, a1b, a2a, a2b, temp;
    double teta, l1a, l1b, l2a, l2b, a, b, c;
    point2d p1temp, p2temp;

/* initialisation of variables */
    e1 = list1[i1];
    e2 = list2[i2];
    type1 = e1.type;
    type2 = e2.type;

/*--------------------------------------*/
/*    intersection of two lines         */
/*--------------------------------------*/
    if (type1 == 1 && type2 == 1) {
        v1.x = e1.x2-e1.x1;
        v1.y = e1.y2-e1.y1;
        v1.z = 0.;
        v2.x = e2.x2-e2.x1;
        v2.y = e2.y2-e2.y1;
        v2.z = 0.;
        cross_vector(v1, v2, &cross);

/* 2 parallel lines */
        if (ev(cross.x, 0.)+ev(cross.y, 0.)+ev(cross.z, 0.) < .01) {

/* 2 parallel lines which are not colinear */
            if (ev(cross.x, 0.)+ev(cross.y, 0.)+ev(cross.z, 0.) > 1.)
                success = 0;

/* 2 parallel colinear lines */
            else {

/* v1 is not parallel to X */
                if (ev(v1.x, 0.) > 1.) {
                    l1 = (e2.x1-e1.x1)/v1.x;
                    l2 = (e2.x2-e1.x1)/v1.x;
                }

/* v1 is parallel to X */
                else {
                    l1 = (e2.y1-e1.y1)/v1.y;
                    l2 = (e2.y2-e1.y1)/v1.y;
                }
                *l = l1;

/* e1+ = e2+, e1 and e2 parallel */
                if (ev(l1, 0.)+ev(l2, 1.) < 1.)
                    success = 8;

/* e1+ = e2-, e1 and e2 parallel */
                else if (ev(l1, 1.)+ev(l2, 0.) < 1.)
                    success = 1;

/* e1+ & e2+ one common point, e1 and e2 parallel */
                else if (ev(l1, 1.) < 1. && l2 > 1.)
                    success = 2;

/* e1+ & e2- one common point, e1 and e2 parallel */
                else if (ev(l1, 1.) < 1. && l2 < 0.)
                    success = 3;

/* e2- & e1+ one common point, e1 and e2 parallel */
                else if (ev(l2, 1.) < 1. && l1 > 1.)
                    success = 4;

/* e2+ & e1+ one common point, e1 and e2 parallel */
                else if (ev(l2, 0.) < 1. && l1 < 0.)
                    success = 5;

/* e1+ & e2+ or e2- e2 after or before, no intersection */
                else if ((l1 > 1. && l2 > 1.) || (l1 < 0. && l2 < 0.))
                    success = 0;

/* e1 included in e2, e1 and e2 parallel */
                else if (((l1 > 1. || ev(l1, 1.) < 1.) &&
                          (l2 < 0. || ev(l2, 0.) < 1.)) ||
                         ((l1 < 0. || ev(l1, 0.) < 1.) &&
                          (l2 > 1. || ev(l2, 1.) < 1.)))
                    success = 6;

/* e2 included in e1, e1 and e2 parallel */
                else if ((l1 < 1. || ev(l1, 1.) < 1.) &&
                         (l2 < 1. || ev(l2, 1.) < 1.) &&
                         (l1 > 0. || ev(l1, 0.) < 1.) &&
                         (l2 > 0. || ev(l2, 0.) < 1.))
                    success = 7;

/* e2 and e1 partially superposed */
                else
                    success = 9;
            }
        }

/* 2 non parallel lines */
        else {
            delta = -v1.x*v2.y+v2.x*v1.y;
            l1 = (v2.x*(e2.y1-e1.y1) - v2.y*(e2.x1-e1.x1))/delta;
            l2 = (v1.x*(e2.y1-e1.y1) - v1.y*(e2.x1-e1.x1))/delta;
            *l = l1;
```

```c
/* no intersection */
    if ((l1 < 0. && ev(l1, 0.) >.1.) ||(l1 > 1. && ev(l1, 1.) > 1.)
    || (l2 < 0. && ev(l2, 0.) > 1.) || (l2 > 1. && ev(l2, 1.) > 1.))
        success = 0;

/* one intersection in the middle of both segments*/
    else if (l1 > 0. && ev(l1, 0.) > 1. && l1 < 1. &&
             ev(l1, 1.) > 1. && l2 > 0. && ev(l2, 0.) >.1. &&
             l2 < 1. && ev(l2, 1.) > 1.) {
        success = 1;
        pt->x = e1.x1+l1*v1.x;
        pt->y = e1.y1+l1*v1.y;
    }
/* e1+ & e2+ one common point*/
    else if (ev(l1, 1.) < 1. && ev(l2, 0.) < 1.)
        success = 12;
/* e1+ & e2- one common point */
    else if (ev(l1, 1.) < 1. && ev(l2, 1.) < 1.)
        success = 13;
/* e1- & e2+ one common point */
    else if (ev(l1, 0.) < 1. && ev(l2, 0.) < 1.)
        success = 14;
/* e1- & e2- one common point */
    else if (ev(l1, 0.) < 1. && ev(l2, 1.) < 1.)
        success = 15;
/* e1+ & in e2 */
    else if (ev(l1, 1.) < 1.)
        success = 16;
/* e1- & in e2 */
    else if (ev(l1, 0.) < 1.)
        success = 17;
/* e2+ & in e1 */
    else if (ev(l2, 1.) < 1.)
        success = 18;
/* e2- & in e1 */
    else if (ev(l2, 0.) < 1.)
        success = 19;
}

/*---------------------------------*/
/* intersection of two arcs of circle */
/*---------------------------------*/
if (type1 == 2 && type2 == 2) {
    delta = sqrt(pow(e2.cx-e1.cx, 2.)+pow(e2.cy-e1.cy, 2.));
    r1 = e2.r+e1.r;
    r2 = e2.r-e1.r;
    if (r2 < 0) r2 = -r2;

/* no intersection */
    if ((delta > r1 && ev(delta, r1) > 1.) || (delta < r2 && ev(delta, r2) >
1.)) {
        success = 0;
    }
    else {
/* calculate angles for each point */
/* first arc */
        angle_arc(e1, &a1a, &a1b);
/* second arc */
        angle_arc(e2, &a2a, &a2b);
/* arcs with different centers */
        if (ev(e1.cx, e2.cx) > 20. || ev(e1.cy, e2.cy) > 20.) {
            teta = (pow(e1.r, 2.)-pow(e2.r, 2.)+pow(delta, 2.))/
                   (2*delta*e1.r);
            if (teta > 1.) teta = 1.;
            if (teta < -1.) teta = -1.;
            teta = acos(teta);
            v1.x = (e2.cx-e1.cx)/delta;
            v1.y = (e2.cy-e1.cy)/delta;
            v1.z = 0;
            v2.x = -v1.y;
            v2.y = v1.x;
            v2.z = 0;
            p1temp.x = e1.cx + e1.r*cos(teta)*v1.x + e1.r*sin(teta)*v2.x;
            p2temp.x = e1.cx + e1.r*cos(teta)*v1.x - e1.r*sin(teta)*v2.x;
            p1temp.y = e1.cy + e1.r*cos(teta)*v1.y + e1.r*sin(teta)*v2.y;
            p2temp.y = e1.cy + e1.r*cos(teta)*v1.y - e1.r*sin(teta)*v2.y;
/* intersection with the first arc */
            res1 = angle_position(e1, a1a, a1b, p1temp, &l1a);
            res2 = angle_position(e1, a1a, a1b, p2temp, &l1b);
/* intersection with the second arc */
            res3 = angle_position(e2, a2a, a2b, p1temp, &l2a);
            res4 = angle_position(e2, a2a, a2b, p2temp, &l2b);
/* no intersection */
            if ((res1 == 0 || res3 == 0) && (res2 == 0 || res4 == 0))
                success = 0;
/* loop */
            else if (ev(e1.x1, e2.x2) + ev(e1.y1, e2.y2) < 1. &&
                     ev(e1.x2, e2.x1) + ev(e1.y2, e2.y1) < 1.)
                success = 10;
            else if (ev(e1.x1, e2.x1) + ev(e1.y1, e2.y1) < 1. &&
                     ev(e1.x2, e2.x2) + ev(e1.y2, e2.y2) < 1.)
                success = 11;
/* partial loop */
/* one intersection */
            else {
/* keep only one point */
                l1 = 2.;
                if (res1 != 0 && res3 != 0) {
                    l1 = l1a;
                    l2 = l2a;
                    pt->x = p1temp.x;
                    pt->y = p1temp.y;
```

```c
                         p2temp.x = e2.x2;
                         p2temp.y = e2.y2;
                         res1 = angle_position(e1, a1a, a1b, p1temp, &temp);
                         res2 = angle_position(e1, a1a, a1b, p2temp, &temp);

p1temp.x = e1.x1;
                         p1temp.y = e1.y1;
                         p2temp.x = e1.x2;
                         p2temp.y = e1.y2;
                         res3 = angle_position(e2, a2a, a2b, p1temp, &temp);
                         res4 = angle_position(e2, a2a, a2b, p2temp, &temp);

/* no intersection */
                         if (res1 == 0 && res2 == 0 && res3 == 0 && res4 == 0)
                             success = 0;
/* e1+ = e2+ arc1 = arc2 */
                         else if (res1 == 1 && res2 == 2)
                             success = 8;
/* e1+ = e2- circle */
                         else if (res1 == 2 && res2 == 1 && e1.d == e2.d)
                             success = 10;
                         else if (res1 == 2 && res2 == 1 && e1.d != e2.d)
                             success = 11;
/* e1+ & e2+ on common point */
                         else if (res1 == 2 && res2 == 0 && res3 == 0)
                             success = 2;
/* e2- & e1+ on common point */
                         else if (res1 == 1 && res2 == 0 && res4 == 0)
                             success = 3;
/* e1+ & e2- on common point */
                         else if (res1 == 2 && res2 == 1 && res3 == 0 && res4 == 0)
                             success = 4;
/* e2+ & e1+ on common point */
                         else if (res1 == 1 && res2 == 0 && res4 == 0)
                             success = 5;
/* e1 included in e2 */
                         else if (res3 >= 3 && res3 == res4)
                             success = 6;
/* e2 included in e1 */
                         else if (res1 >= 3 && res1 == res2)
                             success = 7;
/* partial superposition */
                         else success = 9;
                     }
                 }
             }
         }
/*-------------------------------------*/
/*   intersection line with arc of circle   */
/*-------------------------------------*/
```

```c
         if (res2 != 0 && res4 != 0 && (
             l1 > 1 ||
             (l1b < l1 && (res4 != 2 && res2 != 1)) ||
             (l1b > l1 && (res1 == 1 || res3 == 2)))) {
             l1 = l1b;
             l2 = l2b;
             res1 = res2;
             res3 = res4;
             pt->x = p2temp.x;
             pt->y = p2temp.y;
         }
         *l = l1;
     }

/* one intersection in the middle of both segments */
         if (res1 >= 3 && res3 >= 3)
             success = 1;
/* e1+ & e2 one common point */
         else if (res1 == 2 && res3 == 1)
             success = 12;
/* e2- & e1+ one common point */
         else if (res1 == 1 && res3 == 1)
             success = 13;
/* e1+ & e2- one common point */
         else if (res1 == 2 && res3 == 2)
             success = 14;
/* e2+ & e1+ one common point */
         else if (res1 == 1 && res3 == 2)
             success = 15;
/* e1+ & e2 in e2 */
         else if (res1 == 2)
             success = 16;
/* e1- & in e2 */
         else if (res1 == 1)
             success = 17;
/* e2+ & in e1 */
         else if (res3 == 2)
             success = 18;
/* e2- & in e1 */
         else if (res3 == 1)
             success = 19;
     }
/* arcs with same center */
     else {
         if (ev(e1.r, e2.r) > 1.)
             success = 0;
         else {
             p1temp.x = e2.x1;
             p1temp.y = e2.y1;
```

```
if ((type1 == 1 && type2 == 2) || (type1 == 2 && type2 == 1)) {
    l1a = l1b = l2a = l2b = 2.;

/* intersection line arc */
    if (type1 == 1 && type2 == 2) {
        v1.x = e1.x2-e1.x1;
        v1.y = e1.y2-e1.y1;
        v2.x = e1.x1-e2.cx;
        v2.y = e1.y1-e2.cy;

/* distance between center of the arc and line */
        a = -v1.y;
        b = v1.x;
        c = -e1.x1*a-e1.y1*b;
        delta = (a*e2.cx+b*e2.cy+c)/sqrt(a*a+b*b);
        if (delta < 0) delta = -delta;

/* no intersection */
        if (delta > e2.r && ev(delta, e2.r) > 1.) {
            res1 = 0;
            res2 = 0;
        }

/* possible intersection */
        else {
            delta = pow((v1.x*v2.x+v1.y*v2.y), 2.) -
                    (v1.x*v1.x + v1.y*v1.y) *
                    (v2.x*v2.x + v2.y*v2.y - e2.r*e2.r);
            if (ev(delta, e2.r) < 1.) {
                if (ev(e1.x1, e2.x1)+ev(e1.y1, e2.y1) < 1.)
                    l1b = l1a = 0.;
                else if (ev(e1.x2, e2.x1)+ev(e1.y2, e2.y1) < 1.)
                    l1b = l1a = 0.;
                else if (ev(e1.x1, e2.x2)+ev(e1.y1, e2.y2) < 1.)
                    l1b = l1a = 1.;
                else if (ev(e1.x2, e2.x2)+ev(e1.y2, e2.y2) < 1.)
                    l1b = l1a = 1.;
            }
            else {
                delta = pow((v1.x*v2.x+v1.y*v2.y), 2.) - delta;
                if (delta < 0) delta = -delta;
                l1a = (-(v1.x*v2.x + v1.y*v2.y)+sqrt(delta))/
                      (v1.x*v1.x + v1.y*v1.y);
                l1b = (-(v1.x*v2.x + v1.y*v2.y)-sqrt(delta))/
                      (v1.x*v1.x + v1.y*v1.y);
            }
            if (ev(l1a, 0.) < 1.)
                res1 = 1;
                l1a = 0.;
            }
            else if (ev(l1a, 1.) < 1.) {
                res1 = 2;
                l1a = 1.;
            }
            else if (l1a < 1. && l1a > 0.)
                res1 = 3;
            else
                res1 = 0;
        }
        if (ev(l1b, 0.) < 1.) {
            res2 = 1;
            l1b = 0.;
        }
        else if (ev(l1b, 1.) < 1.) {
            res2 = 2;
            l1b = 1.;
        }
        else if (l1b < 1. && l1b > 0.)
            res2 = 3;
        else
            res2 = 0;

/* at least one intersection with the line */
        if (res1 != 0 || res2 != 0) {
            p1temp.x = e1.x1+l1a*v1.x;
            p1temp.y = e1.y1+l1a*v1.y;
            angle_arc(e2, &a2a, &a2b);
            res3 = angle_position(e2, a2a, a2b, p1temp, &l2a);
            p2temp.x = e1.x1+l1b*v1.x;
            p2temp.y = e1.y1+l1b*v1.y;
            res4 = angle_position(e2, a2a, a2b, p2temp, &l2b);
        }
    }

/* intersection arc line */
    if (type1 == 2 && type2 == 1) {
        v2.x = e2.x2-e2.x1;
        v2.y = e2.y2-e2.y1;
        v1.x = e2.x1-e1.cx;
        v1.y = e2.y1-e1.cy;

/* distance between center of the arc and line */
        a = -v2.y;
        b = v2.x;
        c = -e2.x1*a-e2.y1*b;
        delta = (a*e1.cx+b*e1.cy+c)/sqrt(a*a+b*b);
        if (delta < 0) delta = -delta;

/* no intersection */
        if (delta > e1.r && ev(delta, e1.r) > 1.) {
            res1 = 0;
            res2 = 0;
        }

/* possible intersection */
        else {
            if (ev(delta, e1.r) < 1.) {
                l2a = l2b = -(v2.x*v1.x+v2.y*v1.y)/(v2.x*v2.x + v2.y*v2.y);
                if (ev(e2.x1, e1.x1)+ev(e2.y1, e1.y1) < 1.)
                    l2b = l2a = 0.;
                else if (ev(e2.x1, e1.x2)+ev(e2.y1, e1.y2) < 1.)
                    l2b = l2a = 0.;
                else if (ev(e2.x2, e1.x1)+ev(e2.y2, e1.y1) < 1.)
                    l2b = l2a = 1.;
                else if (ev(e2.x2, e1.x2)+ev(e2.y2, e1.y2) < 1.)
                    l2b = l2a = 1.;
            }
            else {
                delta = pow((v2.x*v1.x+v2.y*v1.y), 2.) -
```

```
                                    (v2.x*v2.x + v2.y*v2.y)'
                                    (v1.x*v1.x + v1.y*v1.y - e1.r*e1.r);
        if (delta < 0) delta = -delta;
        l2a = (-(v2.x*v1.x+v2.y*v1.y)+sqrt(delta))/
              (v2.x*v2.x + v2.y*v2.y);
        l2b = (-(v2.x*v1.x+v2.y*v1.y)-sqrt(delta))/
              (v2.x*v2.x + v2.y*v2.y);

if (ev(l2a, 0.) < 1.) {
            res3 = 1;
            l2a = 0.;
        }
        else if (ev(l2a, 1.) < 1.) {
            res3 = 2;
            l2a = 1.;
        }
        else if (l2a < 1. && l2a > 0.)
            res3 = 3;
        else
            res3 = 0;

if (ev(l2b, 0.) < 1.) {
            res4 = 1;
            l2b = 0.;
        }
        else if (ev(l2b, 1.) < 1.) {
            res4 = 2;
            l2b = 1.;
        }
        else if (l2b < 1. && l2b > 0.)
            res4 = 3;
        else
            res4 = 0;

/* at least one intersection with the line */
        if (res3 != 0 || res4 != 0) {
            p1temp.x = a2.x1+l2a*v2.x;
            p1temp.y = a2.y1+l2a*v2.y;
            angle_arc(e1, &a1a, &a1b);
            res1 = angle_position(e1, a1a, a1b, p1temp, &l1a);
            p2temp.x = a2.x1+l2b*v2.x;
            p2temp.y = a2.y1+l2b*v2.y;
            res2 = angle_position(e1, a1a, a1b, p2temp, &l1b);

/* no intersection */
            if ((res1 == 0 || res3 == 0) && (res2 == 0 || res4 == 0))
                success = 0;

/* loop */
            else if (ev(e1.x1, e2.x2) + ev(e1.y1, e2.y2) +
                     ev(e1.x2, e2.x1) + ev(e1.y2, e2.y1) < 1.)
                success = 10;
            else if (ev(e1.x1, e2.x1) + ev(e1.y1, e2.y1) +
                     ev(e1.x2, e2.x2) + ev(e1.y2, e2.y2) < 1.)
                success = 11;
```

```
/* one intersection */
            else {

/* keep only one point */
                l1 = 2.;
                if (res1 != 0 && res3 != 0) {
                    l1 = l1a;
                    l2 = l2a;
                    pt->x = p1temp.x;
                    pt->y = p1temp.y;
                }
                if (res2 != 0 && res4 != 0 && (
                    l1 > 1. ||
                    (l1b < l1 && (res4 != 2 && res2 != 1)) ||
                    (l1b > l1 && (res1 == 1 || res3 == 2)))) {
                    l1 = l1b;
                    l2 = l2b;
                    res1 = res2;
                    res3 = res4;
                    pt->x = p2temp.x;
                    pt->y = p2temp.y;
                }
                *l = l1;

/* one intersection in the middle of both segments */
                if (res1 >= 3 && res3 >= 3)
                    success = 1;

/* e1+ & e2 one common point */
                else if (res1 == 2 && res3 == 1)
                    success = 12;

/* e2- & e1+ one common point */
                else if (res1 == 1 && res3 == 1)
                    success = 13;

/* e1+ & e2- one common point */
                else if (res1 == 2 && res3 == 2)
                    success = 14;

/* e2+ & e1+ one common point */
                else if (res1 == 1 && res3 == 2)
                    success = 15;

/* e1+ in e2 */
                else if (res1 == 2)
                    success = 16;

/* e1- in e2 */
                else if (res1 == 1)
                    success = 17;

/* e2+ in e1 */
                else if (res3 == 2)
                    success = 18;

/* e2- in e1 */
                else if (res3 == 1)
                    success = 19;
            }
        }
```

```c
              return(success);
       }

/*---------------------------------------------------------------
Return_Point
-----------------------------------------------------------------*/
return_point(ent, pt)

entity ent;
point2d *pt;
{
/* declaration of variables */
   double a1, a2, a;

switch(ent.type) {

/* line */
   case 1:
       pt->x = ent.x1 + (ent.x2-ent.x1)/2.;
       pt->y = ent.y1 + (ent.y2-ent.y1)/2.;
       break;

/* arc of circle */
   case 2:
       angle_arc(ent, &a1, &a2);
       a = (a1+a2)/2.;
       pt->x = ent.cx+ent.r*cos(a);
       pt->y = ent.cy+ent.r*sin(a);
       break;
   }
}

/*---------------------------------------------------------------
Loop_Intersection
-----------------------------------------------------------------*/
loop_intersection(ent, list, first)

entity ent, list[];
int first;
{
/* declaration of variables */
   int success, cont, i, l1, l2, j, inter;
   double offset;

/* initialization of variables */
   success = 0;
   cont = 1;
   i = 0;
   offset = ent.r;

while (i < list[0].z && cont == 1 && success == 0){
       l1 = i+1;
       l2 = i+list[i].d;
       i = l2+1;

if (ent.z > list[l1].z && ev (ent.z, list[l1].z) > 1.)
          cont = 0;
       if (ev(ent.z, list[l1].z) < 1.) {
          j = l1;
          while (j <= l2 && cont == 1 && success == 0) {
             if (BALL == 1 && first == 1)
                ent.r = offset*list[j].offset;
             inter = intersection_circle_entity(ent, list[j]);
             if (inter == 1) success = 1;
             j++;
          }
       }
   } return(success);
}

/*---------------------------------------------------------------
Intersection Circle Entity
-----------------------------------------------------------------*/
intersection_circle_entity(e1, e2)

entity e1, e2;
{
/* declaration of variables */
   int res1, res2, success;
   double r1, r2, r3, delta, teta, a1, a2, l, l1, l2, a, b, c;
   point2d p1temp, p2temp;
   vector v1, v2;

switch (e2.type) {

/*---------------------------------------------------------------
// Intersection circle line
-----------------------------------------------------------------*/
   case 1:

/* distance center-line */
       a = -(e2.y2-e2.y1);
       b = (e2.x2-e2.x1);
       c = -e2.x1*a-e2.y1*b;

delta = (a*e1.cx+b*e1.cy+c)/sqrt(a*a+b*b);
       if (delta < 0) delta = -delta;

/* no intersection or tangent entities */
       if ( delta > e1.r || ev(delta, e1.r) < 1.)
           success = 0;

/* possible intersection */
       else {
          v2.x = e2.x2-e2.x1;
          v2.y = e2.y2-e2.y1;
          v1.x = e2.x1-e1.cx;
          v1.y = e2.y1-e1.cy;

delta = pow((v2.x*v1.x+v2.y*v1.y), 2.) - (v2.x*v2.x + v2.y*v2.y) *
                      (v1.x*v1.x + v1.y*v1.y - e1.r*e1.r);

/* only double intersection possible */
          l1 = (-(v2.x*v1.x+v2.y*v1.y)+sqrt(delta))/
                  (v2.x*v2.x + v2.y*v2.y);
          l2 = (-(v2.x*v1.x+v2.y*v1.y)-sqrt(delta))/
                  (v2.x*v2.x + v2.y*v2.y);
```

```
/* If intersection at a vertex it is not considered as a valid intersection */
        if (l1 < 1. && l1 > 0. && ev(l1, 0.) > -1. && ev(l1, 1.) > 1.)
            res1 = 1;
        else
            res1 = 0;

if (l2 < 1. && l2 > 0. && ev(l2, 0.) > -1. && ev(l2, 1.) > 1.)
            res2 = 1;
        else
            res2 = 0;

if (res1 == 0 && res2 == 0)
            success = 0;
        else
            success = 1;

}
    break;

/*----------------------------------*/
/* Intersection circle and arc of circle */
/*----------------------------------*/
case 2:
    delta = sqrt(pow(e2.cx-e1.cx, 2.)+pow(e2.cy-e1.cy, 2.));
    r1 = e2.r+e1.r;
    r2 = e2.r-e1.r;
    r3 = e1.r-e2.r;

/* no interference */
    if ((delta > r1 && ev(delta, r1) > 1.) || (delta < r2 && ev(delta, r2) >
1.) || (ev(delta, r1) < 1. || teta = -1.) teta = -1.;
        success = 0;

/* arc of circle inside the circle */
    else if (delta < r3 || ev(delta, r3) <0.1)
        success = 1;

/* non-tangent circles */
    else {

/* second arc */
        angle_arc(e2, &a1, &a2);

/* arcs with different centers */
        teta = (pow(e1.r, 2.)-pow(e2.r, 2.)+pow(delta, 2.))/
                (2*delta*e1.r);
        if (teta > 1.) teta = 1.;
        if (teta < -1.) teta = -1.;
        teta = acos(teta);
        v1.x = (e2.cx-e1.cx)/delta;
        v1.y = (e2.cy-e1.cy)/delta;
        v1.z = 0;
        v2.x = -v1.y;
        v2.y = v1.x;
        v2.z = 0;
        p1temp.x = e1.cx + e1.r*cos(teta)*v1.x + e1.r*sin(teta)*v2.x;
        p2temp.x = e1.cx + e1.r*cos(teta)*v1.x - e1.r*sin(teta)*v2.x;
        p1temp.y = e1.cy + e1.r*cos(teta)*v1.y + e1.r*sin(teta)*v2.y;
        p2temp.y = e1.cy + e1.r*cos(teta)*v1.y - e1.r*sin(teta)*v2.y;

/* Intersection with the second arc */
        res1 = angle_position(e2, a1, a2, p1temp, &l);
        res2 = angle_position(e2, a1, a2, p2temp, &l);

/* no intersection */
        if (res1 <= 2 && res2 <= 2)
            success = 0;
        else
            success = 1;

}
    break;

}
return(success);
}
```

```
/* *********************************************************
                ADAPTIVE LAMINATED MACHINING
                          by
                  Franck A. Vouzelaud Experimental program
********************************************************* */

/*----------------------------------------------------------
Finish machining
----------------------------------------------------------*/
finish(list, fentity_temp, t_offset, direction)

int direction;
double t_offset;
entity list[];
FILE *fentity_temp;

{
/* variable declaration */
  entity list1[MAX];
  int i, l1, l2, n1;

/* check direction of each contour and give the appropriate direction */
  if (direction == -1) {
    i = 0;
    while (1 < (int) list[0].z) {
      l1 = i+1;
      l2 = l+list[i].d;
      inverse_loop(list,l1,l2);
      list[i].flag1 *= direction;
      i = l2+1;
    }
  }
/*            entity_draw(list, l1, l2); */ first_offset(list, list1, t_offset, 1);

save_list(list1, fentity_temp);
}

/*----------------------------------------------------------
Rough machining
----------------------------------------------------------*/
rough(list, fentity_temp, t_offset, direction)

int direction;
double t_offset;
entity list[];
FILE *fentity_temp;

{
/* variable declaration */
  entity list1[MAX], list_offset[MAX], list_stack[MAX], list_plus[MAX],
         list_ref[MAX], list_plus_init[MAX];
  int i, l1, l2, j, n_plus, n_minus, n1, n;
  short success, ind;
  double surface;

n1 = 0;
  ind = 1;
  surface = pi*pow(t_offset, 2.);

/* check direction of each contour and give the appropriate direction */
  if (direction == -1) {
    i = 0;
    while (1 < (int) list[0].z) {
      l1 = i+1;
      l2 = l+list[i].d;
      inverse_loop(list,l1,l2);
      list[i].flag1 *= direction;
      i = l2+1;
    }
  }
/*            entity_draw(list, l1, l2); */

/* add each clockwise contour to the reference list */
  j = 0;
  i = 0;
  while ( i < (int) list[0].z) {
    if (stock == 1) {
      i = (int) list[0].z;
      list[i].type = 0;
      list[i].d = 4;
      list[i].flag1 = -1;
      list[i].ref1 = 0;
      i++;
      add_contour(list, &i, ptmin, ptmax);
      list[0].z += 5.;
    }
    l1 = i+1;
    l2 = l+list[i].d;
    if (list[i].flag1 == 1) {
      for (i = l1; i <= l2; i++, j++) {
        entity_copy(list[i], &list_ref[j], 1);
      }
      i = l2+1;
    }
    list_ref[0].z = (double) j;
  }

/* add the contour of the stock */
  if (stock == 1) {
    i = (int) list[0].z;
    list[i].type = 0;
    list[i].d = 4;
    list[i].flag1 = -1;
    list[i].ref1 = 0;
    i++;
    add_contour(list, &i, ptmin, ptmax);
    list[0].z += 5.;
  }

/* first offset */
  first_offset(list, list_offset, 1.1*t_offset, 1);

/* copy all the clockwise contours in the output file to be used to link the con
tours together and check intersection
list[x].ref1 is set to 4 to tell that the contour should not be used as a tool p
ath, but only to check intersections
this type of contour is automatically at the begining of each layer */
  i = 0;
  j = 0;
  n_plus = 0;
  while ( i < (int) list_offset[0].z) {
    l1 = i;
```

```c
            i2 = i+list_offset[i].d;
            if (list_offset[i].flag1 == 1) {
                list_offset[i1].ref1 = 4;
                for (i = i1; i <= i2; i++) {
                    fwrite(&list_offset[i], sizeof(entity), 1, fentity_temp);
                }
                list_offset[i1].ref1 = 1;
            }
/* add each clockwise contour to the output list */
            if (reverse == 1) {
                for (i = i1; i <= i2; i++, ni++) {
                    entity_copy(list_offset[i], &list1[n1], 1);
                }
            }
            else {
                for (i = i1; i <= i2; i++, n_plus++) {
                    entity_copy(list_offset[i], &list_plus_init[n_plus], 1);
                }
            }
            i = i2+1;
        }
        list_plus_init[0].z = (double) n_plus;
        n_minus = 0;
        do {
/* add the offseted contours to the stack */
            if (list_offset[0].d != 0) {
                n_plus = 0;
                list_plus[0].z = 0.;
                i = 0;
                while (i < (int) list_offset[0].z) {
                    i1 = i+1;
                    i2 = i+list_offset[i].d;
                    for (j = i1; j <= i2; j++) {
                        entity_copy(list_offset[j], &list_plus[n_plus], 1);
                        n_plus++;
                    }
                    list_plus[0].z = (double) n_plus;
/* clockwise contours are compensated only once */
                    if (list_offset[i1].flag1 == 1) {
                        list_offset[i1].ref1 = 1;
                    }
/* add an index for linking contours */
                    list_offset[i1].ref1 = 1;
/* stop offseting the contour if loop is too small */
                    if (list_offset[i1].x1 < surface) {
                        list_offset[i1].flag2 = 1;
                    }
/* add an index for linking contours */
                    switch (ind) {
                        case 0:
                            list_offset[i1].ref1 = 0;
                            break;
                        case 1:
                            list_offset[i1].ref1 = 2;
```

```c
                    break;
                case 2:
                    list_offset[i1].ref1 = 3;
                    break;
                }
                for (j = i1; j <= i2; j++) {
                    entity_copy(list_offset[j], &list_stack[n_minus], 1);
                    n_minus++;
                }
                list_stack[0].z = (double) n_minus;
            }
/* read the next contour to offset */
            if (list_stack[0].z != 0.) {
                i = (int) list_stack[0].z-1;
                success = 0;
                while (i >= 0 && success == 0) {
/* find the last contour of the list */
                    while (i >= 0 && list_stack[i].type != 0) i--;
/* copy the list in the output list */
                    if (list_stack[i].flag2 == 1 && i >= 0) {
                        i1 = i;
                        i2 = i+list_stack[i].d;
                        for (j = i1; j <= i2; j++) {
                            entity_copy(list_stack[j], &list1[n1], 1);
                            n1++;
                        }
                        n_minus = list_stack[i].d+1;
                        list_stack[0].z = (double) n_minus;
                    }
/* copy the list into the list to be offseted */
                    if (list_stack[i].flag2 == 0 && i >= 0) {
                        success = 1;
                        i1 = i;
                        i2 = i+list_stack[i].d;
                        n = 0;
                        for (j = i1; j <= i2; j++) {
                            entity_copy(list_stack[j], &list1[n], 1);
                            n++;
                        }
                        list[0].z = (double) n;
                        list_stack[i].flag2 = 1;
                    }
                    i--;
                }
/* if there is no more contour to offset, complete the output list with the list
_plus */
                if (success == 0) {
                    if (reverse == -1) {
                        i = 0;
                        while (i < (int) list_plus_init[0].z) {
                            entity_copy(list_plus_init[i], &list1[n1], 1);
```

```c
                n1++;
                i++;
            }
        }
        /* offset the next contour */
        else {
            i = 0;
            while (i < (int) list[0].z) {
                i1 = i+1;
                i2 = i+list[1].d;
                i = i+2+i;
                entity_draw(list, i1, i2);
            }
            ind = other_offset(list, list_offset, list_plus, list_ref, t_offset);
        } while (success == 1);
        list1[0].z = (double) n1;
        save_list(list1, &entity_temp);
    }

/*-------------------------------------------------------------
    First Offset
    -------------------------------------------------------------*/
    first_offset(list, list_out, t_offset, test)
    entity list[], list_out[];
    double t_offset;
    int test;
    {
        /* declaration of variables */
        int i, i1, i2, j, j1, j2, k, l, n, ind;
        entity list_ref[MAX/10], list1[MAX/10], list2[MAX/10], list_int[MAX];

i = 0;
        n = 0;
        /* offset all the contours in the list */
        while (i < (int) list[0].z) {
            i1 = i;
            i2 = i+list[1].d;
            i = i+2+i;

for (k = i1, l = 0; k <= i2; k++, l++) {
                entity_copy(list[k], &list_ref[l], 1);
                entity_copy(list[k], &list1[l], 1);
            }
            list1[0].z = (double) l;
            list_ref[0].z = (double) l;

ind = 0;
            offset_curve(list1, list2, 0, list1[0].d, &ind, t_offset, 1);
            list2[0].z = (double) ind;

j = 0;
            while (j < (int) list2[0].z) {
                j1 = j+1;
                j2 = j+list2[j].d;
                entity_draw(list2, j1-1, j2);
                j = j2+1;
            }
            loop_detection(list2, list1);

j = 0;
            while (j < (int) list2[0].z) {
                j1 = j+1;
                j2 = j+list[j].d;
                entity_draw(list1, j1-1, j2);
                j = j2+1;
            }
            loop_removal(list1, list2, list_ref, t_offset, 0, 1);

j = 0;
            while (j < (int) list2[0].z) {
                entity_copy(list2[j], &list_out[n]);
                j++;
                n++;
            }
            list_out[0].z = (double) n;
            /* find the loops between contours if several contours on the same slice */
            if (list_out[0].d != list_out[0].z-1 && test == 1) {
                i = 0;
                n = 0;
                while (i < (int) list_out[0].z) {
                    if (i == 0 || list_out[i].type != 0) {
                        entity_copy(list_out[i], &list_int[n], 1);
                        n++;
                    }
                    i++;
                }
                list_int[0].d = n-1;
                list_int[0].z = (double) n;
                loop_detection(list1, list_int);

i = 0;
                while (i < (int) list_int[0].z) {
                    i1 = i+1;
                    i2 = i+list_int[1].d;
                    i = i2+1;
                    entity_draw(list_int, i1, i2);
                }
                loop_removal(list_int, list_out, list, t_offset, 0, 1);
            }
            /* copy entities in the ouput list */
            i = 0;
            while (i < (int) list_out[0].z) {
                if (list_out[i].type == 0) {
                    switch(list_out[i].flag) {
                        case 1:
                            list_out[i].ref1 = 1;
```

```c
        break;
    case -1:
        list_out[i].ref1 = 2;
        break;
    }
    i++;
}

/*------------------------------------------------------------------
Other Offset (offset only one contour at a time)
------------------------------------------------------------------*/
other_offset(list, list_out, list_out1, list_ref2, list_ref3, t_offset)
entity list[], list_out[], list_out1[], list_ref2[], list_ref3[];
double t_offset;
{
/* declaration of variables */
int i, i1, i2, j, n, ind, remove;
entity list_ref1[MAX/10], list1[MAX/10];

i1 = 0;
    n = 0;
    remove = 0;
    list_out[0].z = 0.;

/* offset the unique contour in the list */
    i1 = 0;
    i2 = list[0].d;
    for (i = i1; i <= i2; i++)
        entity_copy(list[i], &list_ref1[i], 1);
    ind = 0;
    offset_curve(list, list_ref1, i1, i2, &ind, t_offset, 0);

/*
    i = 0;
    while (i < (int) list[0].z) {
        i1 = i+1;
        i2 = i+list1[i].d;
        i = i2+1;
        entity_draw(list1, i1, i2);
    }
    return(0);
*/
    list1[0].z = (double) ind;
    loop_detection(list1, list);
/*
    i = 0;
    while (i < (int) list[0].z) {
        i1 = i+1;
        i2 = i+list1[i].d;
        i = i2+1;
        entity_draw(list, i1, i2);
    }
*/
    loop_removal(list, list1, list_ref1, list_ref, t_offset, 0, 0);

/* remove clockwise contours */
    i = 0;
    n = 0;
    while (i < (int) list[0].z) {
        i1 = i+1;
        i2 = i+list1[i].d;
        i = i2+1;
        if (list1[i].flag1 == -1) {
            for (j = i1; j <= i2; j++, n++)
                entity_copy(list1[j], &list[n], 1);
        }
    }
    list[0].z = (double) n;

/* find loops between clockwise and counterclockwise contours */
    if (list[0].z > 0 && list_ref2[0].z > 0) {
        i = 0;
        n = 0;
        while (i < (int) list_ref2[0].z) {
            if (i == 0 || list_ref2[i].type != 0) {
                entity_copy(list_ref2[i], &list[n], 1);
                n++;
            }
            i++;
        }
        i = 0;
        while (i < (int) list[0].z) {
            if (list[i].type != 0) {
                entity_copy(list1[i], &list[n], 1);
                n++;
            }
            i++;
        }
        list1[0].z = (double) n;
        list1[0].d = n-1;
        loop_detection(list1, list);
        remove = loop_removal(list1, list, list_ref1, t_offset, 1, 0);
        remove += loop_removal(list1, list_out, list_ref3, t_offset, 1, 0);
        if (remove != 0) remove = 1;

/* copy entities in the output list */
        else {
            i = 0;
            n = 0;
            while (i < (int) list_ref2[0].z) {
                entity_copy(list_ref2[i], &list_out[n], 1);
                n++;
                i++;
            }
            i = 0;
            ind = 0;
            while (i < (int) list[0].z) {
                i1 = i+1;
                i2 = i+list1[i].d;
                if (list1[i].flag1 == -1) ind++;
                if (ind > 1) remove = 2;
                for (i = i1; i <= i2; i++, n++)
                    entity_copy(list1[i], &list_out[n], 1);
```

```
        list_out[0].z = (double) n;
    }
    return(remove);
}
/*----------------------------------------------------------
Add Contour
------------------------------------------------------------*/
add_contour(list, n, pt1, pt2)
entity list[];
ads_point pt1, pt2;
int *n;
{
    list[*n].type = 1;
    list[*n].x1 = pt1[X];
    list[*n].y1 = pt1[Y];
    list[*n].ref1 = 0;
    list[*n].flag1 = 0;
    list[*n].x2 = pt2[X];
    list[*n].y2 = pt2[Y];
    list[*n].ref2 = 0;
    list[*n].flag2 = 0;
    list[*n].z = list[1].z;
    list[*n].d = 1;
    (*n)++;

list[*n].type = 1;
    list[*n].x1 = pt2[X];
    list[*n].y1 = pt2[Y];
    list[*n].ref1 = 0;
    list[*n].flag1 = 0;
    list[*n].x2 = pt2[X];
    list[*n].y2 = pt2[Y];
    list[*n].ref2 = 0;
    list[*n].flag2 = 0;
    list[*n].z = list[1].z;
    list[*n].d = 1;
    (*n)++;

list[*n].type = 1;
    list[*n].x1 = pt1[X];
    list[*n].y1 = pt1[Y];
    list[*n].ref1 = 0;
```

```
    list[*n].flag1 = 0;
    list[*n].x2 = pt1[X];
    list[*n].y2 = pt1[Y];
    list[*n].ref2 = 0;
    list[*n].flag2 = 0;
    list[*n].z = list[1].z;
    list[*n].d = 1;
    (*n)++;
}
/*----------------------------------------------------------
Copy the list in the file with the given specifications
------------------------------------------------------------*/
save_list(list, file)
entity list[];
FILE *file;
{
    /* delcaration of variables */
    int i, l1, l2;
    entity ent;

/* climb machining */
    switch (climb) {
    case 1:
        switch (reverse) {

/* do not reverse the order of contours */
        case -1:
            i = 0;
            while (i < (int) list[0].z) {
                fwrite(&list[i], sizeof(entity), 1, file);
                i++;
            }
            break;

/* reverse the order of contours */
        case 1:
            i = list[0].z-1;
            while (i >= 0) {
                l1 = i+l1list[i].d;
                l2 = l1list[i].d;
                while ( i >= 0 && list[i].type != 0) i--;
                if (list[i].type == 0) {
                    i1 = i+1;
                    l2 = l1list[i].d;
                    for (i = l1; i <= l2; i++) {
                        fwrite(&list[i], sizeof(entity), 1, file);
                    }
                }

/* for clockwise contours */
        if (list[i].flag1 == 1) {
            for (i = l1; i <= l2; i++) {
                fwrite(&list[i], sizeof(entity), 1, file);
            }
        }

/* for counter clockwise contours */
        else {
            for (i = l2; i >= l1; i--) {
                entity_copy(list[i], &ent, -1);
                fwrite(&ent, sizeof(entity), 1, file);
            }
        }
        i = l1-2;
```

```
            }
            break;
        }
        break;

/* conventional machining */
case -1:
    switch (reverse) {

/* do not reverse the order of contours */
    case -1:
        i = 0;
        while (i < (int) list[0].z) {
            l1 = i+1;
            l2 = i+list[i].d;
            fwrite(&list[i], sizeof(entity), 1, file);
            for (i = l2; i >= l1; i--) {
                entity_copy(list[i], &ent, -1);
                fwrite(ent, sizeof(entity), 1, file);
            }
            i = l2+1;
        }
        break;

/* reverse the order of contours */
    case 1:
        i = list[0].z-1;
        while (i >= 0) {
            l1 = i+1;
            while ( i >= 0 && list[i].type != 0) i--;
            if (list[i].type == 0) {
                l1 = i+1;
                l2 = i+list[i].d;
                fwrite(&list[i], sizeof(entity), 1, file);

/* for counter clockwise contours */
                if (list[i].flag1 == -1) {
                    for (i = l1; i <= l2; i++)
                        fwrite(list[i], sizeof(entity), 1, file);
                }

/* for clockwise contours */
                else {
                    for (i = l2; i >= l1; i--) {
                        entity_copy(list[i], &ent, -1);
                        fwrite(ent, sizeof(entity), 1, file);
                    }
                }
                i = l1-2;
            }
            break;
        }
        break;
    }
```

```c
/************************************************************
                  ADAPTIVE LAMINATED MACHINING
                              by
                       Franck A. Vouzelaud Experimental program
*************************************************************/ include "offset.c"
include "utility.c"
include "mach.c"
include "loop.c"

/*-----------------------------------------------------------
Entity_Draw
-----------------------------------------------------------*/
entity_draw(list, l1, l2)
entity list[];
int l1, l2;
{
    int i;
    ads_point pt1, pt2, c;
    ads_real r;

for (i = l1; i <= l2; i++) {
        pt1[X] = list[i].x1;
        pt1[Y] = list[i].y1;
        pt1[Z] = list[i].z;
        pt2[X] = list[i].x2;
        pt2[Y] = list[i].y2;
        pt2[Z] = list[i].z;
        c[X] = list[i].cx;
        c[Y] = list[i].cy;
        c[Z] = list[i].z;
        switch(list[i].type) {
            case 0:
                printf("%i %i flag: %i %.4f\n", i, list[i].d, list[i].flag1, list[i].z);
                break;
            case 1:
            case 4:
                printf("%i %i %.4f %.4f %.4f %.4f %i %i %.4f\n", i, list[i].x1, list[i].y1, list[i].x2, list[i].y2, list[i].flag1, list[i].flag2, list[i].d);
                break;
            case 2:
                r = sqrt(pow(list[i].x1-list[i].cx, 2.)+pow(list[i].y1-list[i].cy, 2.));
                printf("%i %i %.4f %.4f %.4f %.4f %.4f %i %i %.4f\n", i, list[i].type, list[i].x1, list[i].y1, list[i].x2, list[i].y2, list[i].cx, list[i].cy, list[i].flag1, list[i].flag2, list[i].d);
                printf("%i %.4f %.4f %.4f\n", i, list[i].flag1, list[i].ref1, list[i].ref2);
                break;
            case 3:
                printf("%i %i %.4f %.4f %.4f\n", i, list[i].cy, list[i].r, list[i].z);
                break;
        }
    }
}

/*-----------------------------------------------------------
Offset
-----------------------------------------------------------*/
main()
{
    /* variable declaration */
    entity list[MAX];
    int i, direction, mach_type, errout;
    double t_offset, feedrate, cl;
    char filename[80], filenamec[80], ans[1];
    FILE *fentity_in, *fentity_temp1, *fentity_temp2, *fopen(), *ncfile;

pi = 3.141592654;
    stock = 0;
    climb = 1;
    reverse = -1;
    BALL = 0;

/* read data from the file */
    /* name of the file where the data are */
    printf("Enter the name of the file where the data are stored: ");
    scanf("%s", filename);
    fentity_in = fopen(filename,"r");

/* create 1st temporary file to store entities and reduce dimension of lists */
    fentity_temp1 = fopen("temp1.dat", "w");

/* ask type of machining */
    do {
        printf("Finish or rough machining (f/r) ? ");
        scanf("%s", ans);
    } while (strcmp(ans, "f") != 0 && strcmp(ans, "r") != 0);
    if (strcmp(ans, "f") == 0)
        mach_type = 1;
    else
        mach_type = 0;

/* tool type */
    printf("Enter tool radius (in): ");
    scanf("%lf", &t_offset);
    if (mach_type == 1) {
        do {
            printf("Type of tool: ball end mill or flat end mill (b/f) ? ");
            scanf("%s", ans);
        } while (strcmp(ans, "b") != 0 && strcmp(ans, "f") != 0);
        if (strcmp(ans, "b") == 0)
            BALL = 1;
    }

/* ask direction of contours */
    do {
        printf("Do you want a positive or a negative of the part (p/n) ? ");
        scanf("%s", ans);
    } while (strcmp(ans, "n") != 0 && strcmp(ans, "p") != 0);
```

```c
	if (strcmp(ans, "p") == 0)
		direction = 1;
	else
		direction = -1;

/* ask direction of milling */
	do {
		printf("Do you want climb (1) or conventional (o) milling? ");
		scanf("%s", ans);
	} while (strcmp(ans,"l") != 0 && strcmp(ans, "o") != 0);
	if (strcmp(ans, "o") == 0)
		climb = -1;

/* ask order of the loops */
	if (mach_type == 0) {
		do {
			printf("How do you want to order the tool paths?\n");
			printf("- from the inside to the outside (a)\n");
			printf("- from the outside to the inside (b) --> ");
			scanf("%s", ans);
		} while (strcmp(ans,"a") != 0 && strcmp(ans, "b") != 0);
		if (strcmp(ans, "b") == 0)
			reverse = 1;
	}

/* ask to incorporate a stock */
	if (direction == 1 && mach_type == 0) {
		do {
			printf("Do you want to input the dimensions of the stock (y/n) ? ");
			scanf("%s", ans);
		} while (strcmp(ans,"n") != 0 && strcmp(ans, "y") != 0);
		if (strcmp(ans, "y") == 0) {
			stock = 1;
			printf("Enter Xmin and Ymin: ");
			scanf("%lf %lf", &ptmin[X], &ptmin[Y]);
			printf("Enter Xmax and Ymax: ");
			scanf("%lf %lf", &ptmax[X], &ptmax[Y]);
		}
		else
			stock = 0;
	}

/* offset contour layer by layer */
	do {
		errout = read_temp(list, fentity_in); /* read data from the file.*/

/* type of machining */
		if (mach_type == 0)
			rough(list, fentity_temp1, t_offset, direction);
		else
			finish(list, fentity_temp1, t_offset, direction);

} while (errout != 0);

fclose(fentity_in);
	fclose(fentity_temp1);

/* clearance */
	printf("Enter z for clearance plane : ");
	scanf("%lf", &cl);

/* add link between two consecutive contours */
	fentity_temp1 = fopen("temp1.dat", "r");
	fentity_temp2 = fopen("temp2.dat", "w");
	contour_link(fentity_temp1, fentity_temp2, cl);
	fclose(fentity_temp1);
	fclose(fentity_temp2);

/* read the linked list */
	list[0].type = 0;
	i = 1;
	fentity_temp2 = fopen("temp2.dat", "r");
	while ((fread(&list[i], sizeof(entity), 1, fentity_temp2) != 0)
		i++;
	list[0].z = (double) i;
	fclose(fentity_temp2);

/* get user input */
	do {
		printf("Do you want to draw toolpaths (y/n) : ");
		scanf("%s", ans);
	} while (strcmp(ans,"n") != 0 && strcmp(ans, "y") != 0);
	i = list[0].z-1;
	if (strcmp(ans, "y") == 0)
		entity_draw(list,0,1);

/* filename */
	printf("Enter the file name for nc codes: ");
	scanf("%s", filenamenc);

/* feedrate */
	printf("Enter feedrate (in/min) : ");
	scanf("%lf", &feedrate);

ncfile = fopen(filenamenc,"w");
	nc_code(list, ncfile, feedrate);
	fclose(ncfile);
}
```

```
/*******************************************
*                                          *
*      ADAPTIVE LAMINATED MACHINING        *
*              by                          *
*        Franck A. Vouzelaud               *
*                                          *
*        Experimental program              *
*                                          *
*******************************************/ include "offset.c"
include "utility.c"
include "mach.c"
include "loop.c"

/* declaration of local functions */
static int loadfuncs();

int offset();

/* MAIN the main routine */
void main(argc,argv)
  int argc;
  char *argv[];
{
    short scode = RSRSLT;              /* default result code */
    int stat;

ads_init(argc,argv);                /* Initialize the interface */
    for ( ; ; ) {
        if ((stat = ads_link(scode)) < 0) {
            printf("FACTS : bad status from ads_link() = %d\n", stat);
            fflush(stdout);
            exit(1);
        }
        scode = RSRSLT;
        switch(stat) {
        case RQXLOAD :
            scode = loadfuncs() ? RSRSLT : RSERR;
            break;
        case RQSUBR :
            break;
        default :
            break;
        }
    }
}
/*-------------------------------------------------------
Funcload
---------------------------------------------------------*/
static int loadfuncs()
{
    int test;
    if (ads_defun("C:OFFSET1",0) == RTNORM)
        ads_regfunc(offset,0);
    else
        test = 0;
    return test;
}

/*------------------------------------------------------
Offset
--------------------------------------------------------*/
offset()
{
    /* variable declaration */
    entity list[MAX];
    int i, direction, mach_type, errout;
    ads_real t_offset, feedrate, cl;
    char filename[80], filenamenc[80], ans[1], prompt[20];
    FILE *entity_in, *entity_temp1, *entity_temp2, *fopen(), *ncfile;

pi = 3.141592654;
    stock = 0;
    climb = 1;
    reverse = -1;
    BALL = 0;

/* read data from the file */
    /* name of the file where the data are */
    errout = ads_getstring(0,"Enter the name of the file where the data are stored:",filename);
    if (errout != RTNORM) return(errout);
    {entity_in = fopen(filename,"r")};

/* create temporary file to store entities and reduce dimension of lists*/
    {entity_temp1 = fopen("temp1.dat","w")};

/* ask type of machining */
    do {
        errout = ads_getstring(0,"Finish or rough machining (f/r) ? ",ans);
        if (errout != RTNORM) return(errout);
    } while (strcmp(ans,"f") != 0 && strcmp(ans,"r") != 0);
    if (strcmp(ans,"f") == 0)
        mach_type = 1;
    else
        mach_type = 0;

/* type of tool */
    errout = ads_getreal("Enter radius of the tool: ",&t_offset);
    if (errout != RTNORM) return(errout);
    if (mach_type == 1) {
        do {
            errout = ads_getstring(0,"Type of tool: ball end mill or flat end mill ",ans);
            if (errout != RTNORM) return(errout);
        } while (strcmp(ans,"b") != 0 && strcmp(ans,"f") != 0);
        if (strcmp(ans,"b") == 0)
            BALL = 1;
```

```c
    )
    /* ask direction of contours */
    do {
        errout = ads_getstring(0,"Do you want a positive or a negative (p/n) ? ", ans);
        if (errout != RTNORM) return(errout);
    } while (strcmp(ans,"n") != 0 && strcmp(ans,"p") != 0);
    if (strcmp(ans,"p") == 0)
        direction = 1;
    else
        direction = -1;

/* ask direction of milling */
    do {
        errout = ads_getstring(0,"Do you want climb (1) or conventional (o) milling? ", ans);
        if (errout != RTNORM) return(errout);
    } while (strcmp(ans,"l") != 0 && strcmp(ans,"o") != 0);
    if (strcmp(ans,"o") == 0)
        climb = -1;

/* ask order of the loops */
    if (mach_type == 0) {
        do {
            errout = ads_getstring(0,"How do you want to order the tool paths ?\n- from the inside to the outside (a)\n- from the outside to the inside (b) --> ", ans);
            if (errout != RTNORM) return(errout);
        } while (strcmp(ans,"a") != 0 && strcmp(ans,"b") != 0);
        if (strcmp(ans,"b") == 0)
            reverse = 1;
    }

/* ask to incorporate a stock */
    if (direction == 1 && mach_type == 0) {
        do {
            errout = ads_getstring(0,"Do you want to enter the dimensions of a stock (y/n) ? ", ans);
            if (errout != RTNORM) return(errout);
        } while (strcmp(ans,"n") != 0 && strcmp(ans,"y") != 0);
        if (strcmp(ans,"y") == 0) {
            stock = 1;
            strcpy(prompt, "\nEnter Xmin and Ymin: ");
            errout = ads_getpoint(NULL, prompt, ptmin);
            if (errout != RTNORM) return(errout);
            strcpy(prompt, "\nEnter Xmax and Ymax: ");
            ads_getpoint(NULL, prompt, ptmax);
            if (errout != RTNORM) return(errout);
        }
        else
            stock = 0;
    }

/* offset contour layer by layer */
    do {
        errout = read_temp(list, &entity_in); /* read data from the file */

/* type of machining */
        if (mach_type == 0)
```

```c
            rough(list, &entity_temp1, t_offset, direction);
        else
            finish(list, &entity_temp, t_offset, direction);

} while (errout != 0);
        fclose(fentity_in);
        fclose(fentity_temp1);

/* clearance */
        errout = ads_getreal("Enter the altitude of the clearance plane : ",&cl);
        if (errout != RTNORM) return(errout);

/* add link between two consecutive contours */
        fentity_temp1 = fopen("temp1.dat", "r");
        fentity_temp2 = fopen("temp2.dat", "w");
        contour_link(fentity_temp1, fentity_temp2, cl);
        fclose(fentity_temp1);
        fclose(fentity_temp2);

/* read the linked list */
        list[0].type = 0;
        i = 1;
        fentity_temp2 = fopen("temp2.dat", "r");
        while (fread(&list[i], sizeof(entity), 1, fentity_temp2) != 0) {
            i++;
            list[0].z = (double) i;
        }
        fclose(fentity_temp2);

/* get user input */
        do {
            errout = ads_getstring(0,"\nDo you want to draw tool paths (y/n) ? ", ans);
            if (errout != RTNORM) return(errout);
        } while (strcmp(ans,"n") != 0 && strcmp(ans,"y") != 0);
        if (strcmp(ans,"y") == 0)
            entity_draw(list,0,i);

/* filename */
        errout = ads_getstring(0,"Enter the name of a file for machining codes : ", filenamenc);
        if (errout != RTNORM) return(errout);

/* feedrate */
        errout = ads_getreal("Enter feedrate (in/min) : ", &feedrate);
        if (errout != RTNORM) return(errout);

ncfile = fopen(filenamenc,"w");
        nc_code(list, ncfile, feedrate);
        fclose(ncfile);
}

/*--------------------------------------------------------
Entity_Draw
--------------------------------------------------------*/
entity_draw(list, i1, i2)
entity list[];
int i1, i2;
```

```
{
    int i;
    ads_point pt1, pt2, c;
    ads_real r;

for (i = l1; i <= l2; i++) {
        pt1[X] = list[i].x1;
        pt1[Y] = list[i].y1;
        pt1[Z] = list[i].z;
        pt2[X] = list[i].x2;
        pt2[Y] = list[i].y2;
        pt2[Z] = list[i].z;
        c[X] = list[i].cx;
        c[Y] = list[i].cy;
        c[Z] = list[i].z;
        printf("%i %i %f %f %f %f %f\n", i, list[i].type, list[i].x1, list[i].y1
, list[i].x2, list[i].y2, list[i].z);*/ switch(list[i].type) {
/* line */
        case 1:
            ads_command(RTSTR, "line",RT3DPOINT, pt1, RT3DPOINT, pt2, RTSTR, "",
 RTNONE);
            break;
/* arc of circle */
        case 2:
            if (list[i].d == 1)
                ads_command(RTSTR, "arc", RT3DPOINT, pt2, RTSTR, "c", RT3DPOINT,
 c, RT3DPOINT, pt1, RTNONE);
            else
                ads_command(RTSTR, "arc", RT3DPOINT, pt1, RTSTR, "c", RT3DPOINT,
 c, RT3DPOINT, pt2, RTNONE);
            break;
/* circle */
        case 3;
            pt1[X] = list[i].cx;
            pt1[Y] = list[i].cy;
            ads_command(RTSTR, "circle", RT3DPOINT, pt1, RTREAL, list[i].r, RTNO
NE);
            break;
/* line on two different layers */
        case 4:
            pt1[Z] = list[i-1].z;
            ads_command(RTSTR, "line",RT3DPOINT, pt1, RT3DPOINT, pt2, RTSTR, "",
 RTNONE);
            break;
        }
    }
}
```

```c
/* ***************************************************
        ADAPTIVE LAMINATED MACHINING
                    by
            Franck A. Vouzelaud Experimental program
****************************************************/

/*
                    OFFSET.C
*/

/*
Add external funcion to autocad
*/ include <stdio.h>
include <math.h>
include <string.h>
include "/usr/local/acad/ads/adslib.h"
include "/usr/local/acad/ads/adscodes.h"
include "/usr/local/acad/api/apsol.h"
include "/usr/local/acad/api/apfeat.h"
include "/usr/local/acad/api/approto.h"

define MAX 4000

/* type decaration */
typedef struct
{
    double cx, cy, cz;
    double r, sa, ea, ed;
} arc;

typedef struct
{
    double x,y;
} point2d;

typedef struct
{
    double x, y, z;
} vector;

typedef struct
{
    int type;
    double z;
    double x1, y1;
    short ref1, flag1;
    double x2, y2;
    short ref2, flag2;
    double cx, cy;
    double r;
    int d;
    double offset;
} entity;

double pi, ev();
ads_point ptmin, ptmax;
short stock, climb, reverse, BALL;

/*-----------------------------------
Read Temporary File
------------------------------------*/
read_temp(list, file)

/* read a file layer by layer */ entity list[];
FILE *file;
{
    /* delcaration of variables */
    int l, success, errout;
    long offset, offset1;
    double z_layer;

/* while the file is not empty */
    list[0].z = 0.;
    l = 0;
    offset = ftell(file);
    success = 0;

/* read a whole layer */
    while ((success == 0) &&
           (errout = fread(&list[l], sizeof(entity), 1, file) != 0)) {
        /* limit of a contour */
        if (list[l].type == 0)
            offset1 = offset;

/* entity */
        else {
            if (l == 1)               /* first entity */
                z_layer = list[l].z;
            else                       /* other entity */
                if (ev(list[l].z, z_layer) > 1.) {
                    l = l-2;
                    success = 1;
                }
        }
        offset = ftell(file);
        l++;
    }
    list[0].z = (double) l;

/* reposition file pointer at the end of the last contour */
    fseek(file, offset1, 0);
    return(errout);
}

/*-----------------------------------
Offset Curve
------------------------------------*/
offset_curve(list1, list2, l1, l2, n, offset, finish)
```

```c
entity list1[], list2[];
int l1, l2, *n, finish;
double offset;
{
    vector k, vinit, v2a, v1b, v2b, cross1, cross2, v;
    int i, n1, p1, p2, choice;
    point2d ptinit, pt1, pt2, ptinter;
    double offset1, offset2, maga, magb, maginit, a;
    entity l1[1], l2[1];

n1 = *n;
    k.x = 0; k.y = 0; k.z = 1.;

/* printf("\nlayer z = %f\n", list1[l1-1].z); */
    for (i = l1; i <= l2; i++) {
        switch(list1[i].type) {

/* circle */
        case 3:
            list1[i].r += offset*list1[i].offset;
            break;

/* no entity */
        case 0:
            entity_copy(list1[i], &list2[*n], 1);
            tg_vector(list1[i+1], &vinit, 1);
            magnitude(list1[i+1], &maginit);
            tg_vector(list1[i+1], &v2b, 2);
            magb = maginit;
            break;

/* line and arc of circle */
        case 1:
        case 2:

/* take two consecutive entities */
            v2a.x = v2b.x;
            v2a.y = v2b.y;
            v2a.z = v2b.z;
            maga = magb;

/* for the last entity */
            if (i == l2) {
                p1 = l2;
                p2 = l1+1;
                magb = maginit;
                v1b.x = vinit.x;
                v1b.y = vinit.y;
                v1b.z = vinit.z;
            }
            else {
                p1 = i;
                p2 = i+1;
                tg_vector(list1[p2], &v1b, 1);
                tg_vector(list1[p2], &v2b, 2);
                magnitude(list1[p2], &magb);
            }
            ptinit.x = list1[p1].x2;
            ptinit.y = list1[p1].y2;

if (finish == 1 && BALL == 1) {
                offset1 = offset*list1[p1].offset;
                if (ev(offset1, offset*list1[p1].offset) < 1.) offset1 = offset;
                offset2 = offset*list1[p2].offset;
                if (ev(offset2, offset) < 1.) offset2 = offset;
                if (ev(offset1, offset) < 1.) offset1 = offset;
                if (ev(offset2, offset) < 1.) offset2 = offset;
            }
            else {
                offset1 = offset;
                offset2 = offset;
            }
            /* printf("offset = %f\n", offset1); */

/* offset for the second point of the first entity */
            cross_vector(k, v2a, &cross1);
            list1[p1].x2 = pt1.x = list1[p1].x2 + offset1*cross1.x;
            list1[p1].y2 = pt1.y = list1[p1].y2 + offset1*cross1.y;

/* offset for the first point of the second entity */
            cross_vector(k, v1b, &cross2);
            list1[p2].x1 = pt2.x = list1[p2].x1 + offset2*cross2.x;
            list1[p2].y1 = pt2.y = list1[p2].y1 + offset2*cross2.y;

/* for an arc of circle */
            if (list1[p1].type == 2) {
                list1[p1].r += offset*((double) list1[p1]).d;
                if (list1[p1].r < 0) list1[p1].r = -list1[p1].r;
            }

/* copy the first entity into the second list */
            entity_copy(list1[p1], &list2[*n], 1);
            list2[*n].offset = 1.;
            (*n)++;

/* calculate the type of intersection */
            choice = intersection(pt1, v2a, pt2, v1b, &ptinter, maga+magb,
                                  offset1, offset2);
            /* printf("choice = %f\n", choice); */

/* add one entity if necessary */
            switch(choice) {
            case -2:
            case 0:
                list2[*n-1].x2 = ptinter.x;
                list2[*n-1].y2 = ptinter.y;
                list1[p1].x2 = ptinter.x;
                list1[p1].y2 = ptinter.y;
                list1[p2].x1 = list1[p2].x1;
                list1[p2].y1 = list1[p2].y1;
                break;

/* modify the entities for parallel vectors and very close points */
            case -1:
                if (list1[p1].type == -1) {
                    list2[*n-1].x2 = list1[p2].x1;
                    list2[*n-1].y2 = list1[p2].y1;
                    list1[p1].x2 = list1[p2].x1;
                    list1[p1].y2 = list1[p2].y1;
                }
                else
```

```
                    list2[*n].ref2 = 0;
                    list2[*n].flag2 = 0;
                    (*n)++;
                    break;
            /* add a line to be removed */
            case 3:
                    list1[p1].flag2 = 1;
                    list2[*n-1].flag2 = 1;
                    if (list1[p1].type == 1) {
                            list2[*n-1].x2 = ptinter.x;
                            list2[*n-1].y2 = ptinter.y;
                    }
                    if (list1[p1].type == 2) {
                            list2[*n].type = 1;
                            list2[*n].offset = 1;
                            list2[*n].x1 = list2[*n-1].x2;
                            list2[*n].y1 = list2[*n-1].y2;
                            list2[*n].ref1 = 1;
                            list2[*n].flag1 = 1;
                            list2[*n].x2 = ptinter.x;
                            list2[*n].y2 = ptinter.y;
                            list2[*n].ref2 = 0;
                            list2[*n].flag2 = 1;
                            (*n)++;
                    }
                    list1[p2].flag1 = 1;
                    if (list1[p2].type == 1) {
                            list1[p2].x1 = ptinter.x;
                            list1[p2].y1 = ptinter.y;
                    }
                    if (list1[p2].type == 2) {
                            list2[*n].type = 1;
                            list2[*n].offset = 1;
                            list2[*n].x1 = ptinter.x;
                            list2[*n].y1 = ptinter.y;
                            list2[*n].ref1 = 1;
                            list2[*n].flag1 = 1;
                            list2[*n].x2 = list2[*n-1].x2;
                            list2[*n].y2 = list2[*n-1].y2;
                            list2[*n].ref2 = 0;
                            list2[*n].flag2 = 1;
                            (*n)++;
                    }
                    break;

/* add a circle */
            case 4:
                    ptinter.x = (pt1.x+pt2.x)/2.;
                    ptinter.y = (pt1.y+pt2.y)/2.;
                    v.x = pt2.x-pt1.x;
                    v.y = pt2.y-pt1.y;

l1[0].type = l2[0].type = 1;
                    l1[0].z = l2[0].z = 0.;
                    if (offset1 > offset2) {
                            l1[0].x1 = ptinit.x-10.*v2a.y;
                            l1[0].y1 = ptinit.y+10.*v2a.x;
                            l1[0].x2 = ptinit.x+10.*v2a.y;
                            l1[0].y2 = ptinit.y-10.*v2a.x;
```

```
                            list1[p2].x1 = list2[*n-1].x2;
                            list1[p2].y1 = list2[*n-1].y2;
                    }
                    break;

/* add a line to be removed */
    case 1:
            list2[*n].type = 1;
            list2[*n].offset = 1;
            list2[*n].d = 1;
            list2[*n].z = list1[p1].z;
            list2[*n].x1 = pt1.x;
            list2[*n].y1 = pt1.y;
            list2[*n].ref1 = 1;
            list2[*n].flag1 = 1;
            list2[*n].x2 = pt2.x;
            list2[*n].y2 = pt2.y;
            list2[*n].ref2 = 0;
            list2[*n].flag2 = 1;
            (*n)++;
            break;

/* add an arc of circle */
    case 2:
            list2[*n].type = 2;
            list2[*n].offset = 1;
            if (offset1 > 0)
                    list2[*n].d = 1;
            else
                    list2[*n].d = -1;
            list2[*n].z = list1[p1].z;
            list2[*n].x1 = pt1.x;
            list2[*n].y1 = pt1.y;
            list2[*n].ref1 = 1;
            list2[*n].flag1 = 0;
            list2[*n].x2 = pt2.x;
            list2[*n].y2 = pt2.y;
            list2[*n].ref2 = 0;
            list2[*n].flag2 = 0;
            list2[*n].cx = ptinit.x;
            list2[*n].cy = ptinit.y;
            if (offset1 < 0)
                    list2[*n].r = -offset1;
            else
                    list2[*n].r = offset1;
            (*n)++;
            break;

/* add a line */
    case 20:
            list2[*n].type = 1;
            list2[*n].offset = 1;
            list2[*n].d = 1;
            list2[*n].z = list1[p1].z;
            list2[*n].x1 = pt1.x;
            list2[*n].y1 = pt1.y;
            list2[*n].ref1 = 1;
            list2[*n].flag1 = 0;
            list2[*n].x2 = pt2.x;
            list2[*n].y2 = pt2.y;
```

```
            }
            else (
                 l1[0].x1 = ptinit.x-10.*v1b.y;
                 l1[0].y1 = ptinit.y+10.*v1b.x;
                 l1[0].x2 = ptinit.x+10.*v1b.y;
                 l1[0].y2 = ptinit.y-10.*v1b.x;

l2[0].x1 = ptinter.x-10.*v.y;
                 l2[0].y1 = ptinter.y+10.*v.x;
                 l2[0].x2 = ptinter.x+10.*v.y;
                 l2[0].y2 = ptinter.y-10.*v.x;

intersect(l1, l2, 0, 0, &ptinter, &a);

/* create a arc of circle */
                 list2[*n].type = 2;
                 list2[*n].offset = 1.;
                 if (offset2 > 0.)
                      list2[*n].d = 1;
                 else
                      list2[*n].d = -1;
                 list2[*n].z = list1[p1].z;
                 list2[*n].x1 = pt1.x;
                 list2[*n].y1 = pt1.y;
                 list2[*n].ref1 = 1;
                 list2[*n].flag1 = 0;
                 list2[*n].x2 = pt2.x;
                 list2[*n].y2 = pt2.y;
                 list2[*n].ref2 = 0;
                 list2[*n].flag2 = 0;
                 list2[*n].r = sqrt(pow(pt1.x-ptinter.x, 2.) +
                                    pow(pt1.y-ptinter.y, 2.));
                 list2[*n].cx = ptinter.x;
                 list2[*n].cy = ptinter.y;
                 (*n)++;

break;
/* add a circle and a line to be removed */
           case 5;
                 if (offset1 < offset2) {

/* create a line */
                       list2[*n].type = 1;
                       list2[*n].offset = 1.;
                       list2[*n].d = 1;
                       list2[*n].z = list1[p1].z;
                       list2[*n].x1 = pt1.x;
                       list2[*n].y1 = pt1.y;
                       list2[*n].ref1 = 1;
                       list2[p1].flag2 = 1;
                       v.x = ptinit.x-pt2.x;
                       v.y = ptinit.y-pt2.y;
                       list2[*n].x2 = ptinit.x + v.x;
                       list2[*n].y2 = ptinit.y + v.y;
                       list2[*n].ref2 = 0;
                       list2[*n].flag2 = 1;
                       (*n)++;
```

```
/* create a arc of circle */
                       list2[*n].type = 2;
                       list2[*n].offset = 1.;
                       if (offset2 > 0.)
                            list2[*n].d = 1;
                       else
                            list2[*n].d = -1;
                       list2[*n].z = list1[p1].z;
                       list2[*n].x1 = ptinit.x+v.x;
                       list2[*n].y1 = ptinit.y+v.y;
                       list2[*n].ref1 = 1;
                       list2[*n].flag1 = 1;
                       list2[*n].x2 = pt2.x;
                       list2[*n].y2 = pt2.y;
                       list2[*n].ref2 = 0;
                       list2[*n].r = offset2;
                       list2[*n].cx = ptinit.x;
                       list2[*n].cy = ptinit.y;
                       (*n)++;
                 }
                 else ( /* create a arc of circle */
                       list2[*n].type = 2;
                       list2[*n].offset = 1.;
                       if (offset1 > 0)
                            list2[*n].d = 1;
                       else
                            list2[*n].d = -1;
                       list2[*n].z = list1[p1].z;
                       list2[*n].x1 = pt1.x;
                       list2[*n].y1 = pt1.y;
                       list2[*n].ref1 = 1;
                       list2[*n].flag1 = 0;
                       v.x = ptinit.x-pt1.x;
                       v.y = ptinit.y-pt1.y;
                       list2[*n].x2 = ptinit.x+v.x;
                       list2[*n].y2 = ptinit.y+v.y;
                       list2[*n].ref2 = 0;
                       list2[*n].flag2 = 1;
                       list2[*n].r = offset1;
                       list2[*n].cx = ptinit.x;
                       list2[*n].cy = ptinit.y;
                       (*n)++;

/* create a line */
                       list2[*n].type = 1;
                       list2[*n].offset = 1.;
                       list2[*n].z = list1[p1].z;
                       list2[*n].x1 = ptinit.x+v.x;
                       list2[*n].y1 = ptinit.y+v.y;
                       list2[*n].ref1 = 1;
                       list2[p2].flag1 = 1;
                       list2[*n].x2 = pt2.x;
                       list2[*n].y2 = pt2.y;
                       list2[*n].ref2 = 0;
                       list2[p2].flag1 = 1;
                       (*n)++;
```

```c
            break;
        }

/* for the last entity of the loop resave the first entity */
        if (i == l2)
            entity_copy(&list1[p2], &list2[n1+1], 1);

break;
    }

/* save the number of entities in the new contour */
    list2[n1].d = (*n)-n1;
}

/* elimination of entities if length = 0 */
i = n1+1;
l2 = n1+list2[n1].d;
while (i <= l2) {
    switch(list2[i].type) {
    case 1:
        if (ev(list2[i].x1, list2[i].x2) + ev(list2[i].y1, list2[i].y2) < 1.)
        {
            removal(list2, i, &l2);
            list2[n1].d--;
            (*n)--;
        }
        break;
    case 2:
        if (ev(list2[i].r, 0.) < 10.) {
            removal(list2, i, &l2);
            list2[n1].d--;
            (*n)--;
        }
        break;
    }
    i++;
}

/* if zero entity in the output list */
if (list2[n1].d == 0) *n = n1;
}

/*--------------------------------------------
Removal
----------------------------------------------*/
removal(list, index, max)
entity list[];
int index, *max;
{
    int i;
    i = index;
    while (i < *max) {
        entity_copy(&list[i+1], &list[i], 1);
        i++;
    }
    (*max)--;
}

/*--------------------------------------------
Magnitude
----------------------------------------------*/
magnitude(e, m)
entity e;
double *m;
{
    switch (e.type) {
    case 1:
        *m = sqrt(pow(e.x2-e.x1, 2.) + pow(e.y2-e.y1, 2.));
        break;
    case 2:
        *m = 2*pi*e.r;
        break;
    }
}

/*--------------------------------------------
Tangent Vector
----------------------------------------------*/
tg_vector(ent, v, n)
entity ent;
vector *v;
int n;
{
    double mag, x, d;

switch(ent.type) {
    case 1: /* line */
        mag = sqrt(pow((ent.x2-ent.x1), 2.)+pow((ent.y2-ent.y1), 2.));
        v->z = 0.;
        v->x = (ent.x2-ent.x1)/mag;
        v->y = (ent.y2-ent.y1)/mag;
        break;

case 2: /* arc */
        v->z = 0.;
        if (n == 1) {
            v->x = ent.x1-ent.cx;
            v->y = ent.y1-ent.cy;
        }
        if (n == 2) {
            v->x = ent.x2-ent.cx;
            v->y = ent.y2-ent.cy;
        }
        mag = ent.r;

/* rotation of pi/2 */
        d = ent.d;
        x = v->x;
        v->x = v->y*d/mag;
        v->y = -x*d/mag;
        break;
    }
}

/*--------------------------------------------
Intersection
```

```
/*--------------------------------------------------------------
intersection(pt1, v1, pt2, v2, ptinter, mag, off1, off2)
vector v1, v2;
point2d pt1, pt2, *ptinter;
double mag, off1, off2;
{
    double delta, l1, l2;

/* same points */
    if ((ev(pt1.x, pt2.x)+ev(pt1.y, pt2.y)) < 20./mag) {
        ptinter->x = pt2.x;
        ptinter->y = pt2.y;
        return(-2);
    }
    /* different offsets */
    if ( ev(off1, off2) > 1.) {
        delta = -v1.x*v2.y+v2.x*v1.y;
        if(ev(delta, 0.) < 50./mag && (ev(pt1.x, pt2.x) +
                                       ev(pt1.y, pt2.y))<100./mag)
            return(-1);
        if(ev(delta, 0.) < 1./mag)
            return(5);
    }
    /* angle between v1 and v2 less than 180 */
    if (delta < 0.) {
        l1 = (v2.x*(pt2.y-pt1.y) - v2.y*(pt2.x-pt1.x))/delta;
        l2 = (v1.x*(pt2.y-pt1.y) - v1.y*(pt2.x-pt1.x))/delta;
        ptinter->x = pt1.x+l1*v1.x;
        ptinter->y = pt1.y+l1*v1.y;
        if(l1 < 0 && l2 > 0 ) return(5);
        return(4);
    }
    /* angle between v1 and v2 more than 180 */
    else
        return(4);
    /* same offsets */
    else {
        delta = -v1.x*v2.y+v2.x*v1.y;
        if(ev(delta, 0.) < 50./mag && (ev(pt1.x, pt2.x) +
                                       ev(pt1.y, pt2.y))<100./mag)
            return(-1);
        if(ev(delta, 0.) < .01/mag)
            return(0);
        l1 = (v2.x*(pt2.y-pt1.y) - v2.y*(pt2.x-pt1.x))/delta;
        l2 = (v1.x*(pt2.y-pt1.y) - v1.y*(pt2.x-pt1.x))/delta;
        ptinter->x = pt1.x+l1*v1.x;
        ptinter->y = pt1.y+l1*v1.y;
        if(l1 < 0 && l2 > 0 ) return(1);
        if(l1 > 0 && l2 < 0 ) {
            if((ev(pt1.x, pt2.x) + ev(pt1.y, pt2.y))<100./mag)
                return(20);
            else
                return(2);
        }
        if(l1*l2 > 0 ) return(3);
```

```
/*--------------------------------------------------------------
Contour Link
--------------------------------------------------------------*/
contour_link(file1, file2, c1)
FILE *file1, *file2;
double c1;
{
    /* declaration of variables */
    entity list[MAX], list1[MAX], list_ref[MAX], list_ref_temp[MAX];
    entity ent1a, ent2a, ent1b, ent2b;
    int errout, i, success, first_contour, l, l1, l2, flag1a, flag1b, reflag;
    int ref1b, index, num, four, ref_temp;
    ads_point pt1, pt2, pt1;

first_contour = 1;

/* while the file1 is not empty */
    list_ref[0].z = 0.;
    do {
        errout = read_temp(list1, file1);

/* separate the references which are used to check intersection from the tool pa
ths */
        l = 0;
        four = 0;
        ref_temp = 0;
        l = 0;
        while (l < (int) list1[0].z) {
            l1 = l+list1[l1].df;
            l1 = 1;
            l2 = l+list1[l1].df;
            if (list1[l1].ref == 4 || list1[l1].ref == 2 ||
                (list1[l1].ref == 1 && four == 0)) {
                (list1[l1].ref == 4) four = 1;
                for (i = l1; i <= l2; i++, ref_temp++)
                    entity_copy(list1[i], &list_ref_temp[ref_temp], 1);
                if (list1[l1].ref != 4) {
                    for (i = l1; i <= l2; i++, l++)
                        entity_copy(list1[i], &list[l], 1);
                }
            }
            l = l2+1;
        }
        list_ref_temp[0].z = (double) ref_temp;
        list[0].z = (double) l;

/* link the contours */
        l = 0;
        num = 0;
        while (l < (int) list[0].z) {

/* recopy the first contour in file2 */
            if (first_contour == 1) {
                first_contour = 0;
```

```
            l1 = l;
            l2 = l+list[l].d;
            ref1a = list[l].ref1;
            flag1a = list[l].flag1;
            l = l2+1;
            for (i = l1+1; i <= l2; i++) {
                fwrite(&list[i], sizeof(entity), 1, file2);
                pt1[X] = list[l1+1].x1;
                pt1[Y] = list[l1+1].y1;
                pt1[Z] = list[l1+1].z;
                ent1a = list[l1+1];
                ent2a = list[l2];
                pt[Z] = c1;
            create_reference(list_ref_temp, list_ref);
            num = 1;

/* recopy other contours in the same file */
        else {
            ref1b = list[l].ref1;
            flag1b = list[l].flag1;
            l1 = l+1;
            l2 = l+list[l].d;
            l = l2+1;

/* search for the nearest vertex in the next contour */
            seek_point(pt1, list, l1, l2, pt2, &index);
            ent1b = list[index];
            if (index == l1)
                ent2b = list[l2];
            else
                ent2b = list[index-1];

/* find the intersection between the segment (PT1 PT2) with all the elements in
   the reference list */
/* It the intersection exist pt2 is the intersection point and index is the refe
   rence of the intersecting element */
            add_link(pt1, pt2, pt1, ent1a, ent2a, ent1b, ref1a, ref1b, flag1a,
                    list_ref, list_ref_temp, &num, file2);

/* add the contour to the file with the proper order */
            i = 1;
            while (i <= l2-l1+1) {
                if (index > l2)
                    index = l1;
                fwrite(&list[index], sizeof(entity), 1, file2);
                index++;
                i++;
            }
            pt1[X] = pt2[X];
            pt1[Y] = pt2[Y];
            pt1[Z] = pt2[Z];
            ent1a = ent1b;
            ent2a = ent2b;
            ref1a = ref1b;
            flag1a = flag1b;
        }
    } while (errout != 0);
}
```

```
/*----------------------------------------------------------
Create Reference
----------------------------------------------------------*/
create_reference(list1, list2)
entity list1[], list2[];
{
    int i, i1, i2, j;

i = 0; j = 1;
    list2[0].type = 0;

while (i < (int) list1[0].z) {
        if (list1[i].type == 0 && (list1[i].ref1 == 1 || list1[i].ref1 == 2
            || list1[i].ref1 == 4)) {
            i1 = i+1;
            i2 = i+list1[i].d;
            for (i = i1; i <= i2; i++, j++)
                entity_copy(list1[i], &list2[j], 1);
        }
        else
            i += (list1[i].d+1);

list2[0].z = (double) j;
        list2[0].d = j-1;
    }
}

/*----------------------------------------------------------
Add Line
----------------------------------------------------------*/
add_line(file, pt1, pt2)
FILE *file;
ads_point pt1, pt2;
{
    entity ent;

if (ev(pt1[X], pt2[X]) + ev(pt1[Y], pt2[Y]) > 1.) {
        ent.type = 1;
        ent.x1 = pt1[X];
        ent.y1 = pt1[Y];
        ent.ref1 = 0;
        ent.flag1 = 0;
        ent.x2 = pt2[X];
        ent.y2 = pt2[Y];
        ent.ref2 = 0;
        ent.flag2 = 0;
        ent.z = pt1[Z];
        ent.d = 1;
        fwrite(&ent, sizeof(entity), 1, file);
    }

/* two points on different layers new altitude */
    if (ev(pt1[Z], pt2[Z]) > 1.) {
        ent.type = 4;
        ent.x1 = pt2[X];
        ent.y1 = pt2[Y];
        ent.ref1 = 0;
        ent.flag1 = 0;
```

```c
            ent.x2 = pt2[X];
            ent.y2 = pt2[Y];
            ent.ref2 = 0;
            ent.flag2 = 0;
            ent.z = pt2[Z];
            ent.d = 1;
            fwrite(&ent, sizeof(entity), 1, file);
        }

/*----------------------------------------------------------
Seek Point
----------------------------------------------------------*/
seek_point(pt1, list, l1, l2, pt2, index)
ads_point pt1, pt2;
entity list[];
int l1, l2, *index;
{
    int i;
    double distance, temp;

distance = 1000.;
    for (i = l1; i <= l2; i++) {
        temp = pow(pt1[X]-list[i].x1,2.) + pow(pt1[Y]-list[i].y1,2.) + pow(pt1[Z]
]-list[i].z, 2.);
        if ( temp < distance) {
            distance = temp;
            *index = i;
        }
    }
    pt2[X] = list[*index].x1;
    pt2[Y] = list[*index].y1;
    pt2[Z] = list[*index].z;
}

/*----------------------------------------------------------
Add link
----------------------------------------------------------*/
add_link(pt1, pt2, pt1, ent1, ent2, refla, reflb, flag, list_ref, list_ref_temp,
 cas, file)
ads_point pt1, pt2, pt1;
entity list_ref[], list_ref_temp[], ent1, ent2;
int refla, reflb, flag, *cas;
FILE *file;
{
    int inter, reference;
    entity ent, circle[2];
    vector v1, v2;
    double d;

ent.x1 = pt1[X];
    ent.y1 = pt1[Y];
    ent.x2 = pt2[X];
    ent.y2 = pt2[Y];
    ent.type = 1;
    inter = 0;
    if (ev(pt1[X], pt2[X]) + ev(pt1[Y], pt2[Y]) < 1.)
        reference = 0;
    else
        if (reverse == -1)
            reference = refla;
        else
            reference = reflb;

switch (reference) {
    case 0:
        if (reverse == 1)
            inter = intersec_1_contour(ent, list_ref, 1);
        break;

/* clockwise or counterclockwise contour */
    case 1:
    case 2:

/* create an arc of circle */
        circle[0].type = 0;
        circle[0].z = 2.;
        circle[1].type = 2.;
        circle[1].cx = pt1[X];
        circle[1].cy = pt1[Y];
        circle[1].z = pt1[Z];

tg_vector(ent1, &v1, 1);
        tg_vector(ent2, &v2, 2);
        v2.x = -v2.x;
        v2.y = -v2.y;
        d = sqrt(pow(pt2[X]-pt1[X], 2.) + pow(pt2[Y]-pt1[Y], 2.));

circle[1].r = d/2;
        circle[1].x1 = circle[1].cx+ (v1.x*d)/2;
        circle[1].y1 = circle[1].cy+ (v1.y*d)/2;
        circle[1].x2 = circle[1].cx+ (v2.x*d)/2;
        circle[1].y2 = circle[1].cy+ (v2.y*d)/2;

circle[1].d = 1;

/* see routine 'save_list' in mach.c for the condition */
        if ((flag == -1 && reverse == 1 && climb == 1) ||
            (climb == -1 && reverse == -1) ||
            (climb == -1 && reverse == 1 && (flag == 1))
            circle[1].d = -1;

/* circle */
        if (ev(v1.x, v2.x) + ev(v1.y, v2.y) < 1.)
            inter = 1;
        else
            inter = intersec_1_contour(ent, circle, 0);
        if (inter == 0)
            inter = intersec_1_contour(ent, list_ref, 1);
        break;

/* counter clockwise contour inside an other contour */
    case 3:
        inter = intersec_1_contour(ent, list_ref, 1);
        break;
```

```
        /* update reference list with the new layer */
        if (*cas == 0) {
            create_reference(list_ref_temp, list_ref);
            *cas = 1;
        }
        if (inter == 1) {
            pt1[X] = pt[X];
            pt1[Y] = pt[Y];
            add_line(file, pt1, pt1);
            add_line(file, pt1, pt2);
        }
        else
            add_line(file, pt1, pt2);
    }
}

/*---------------------------------------
  Intersection Line Contour
  ---------------------------------------*/
intersec_l_contour(ent, list, index)
entity ent, list[];
int index;
{
    int success, k, l;
    entity l11;
    point2d pt;
    double d;

l = 1;
    success = 0;
    entity_copy(ent, &l[0], 1);
    while (l < (int) list[0].z && success == 0) {
        k = intersect(l, list, 0, l, &pt, &d);
        if (((k == -1 || k == 18 || k == 19) && index != 1) ||
            (k == 1 && index == 0)) {
            success = 1;
        }
        l++;
    }
    return(success);
}

/*---------------------------------------
  NC_code
  ---------------------------------------*/
nc_code(list, ncfile, feedrate)
FILE *ncfile;
float feedrate;
entity list[];
{
    int i, comp, fast, first;
    ads_point pt_org;
    double z_layer, z_layer_last, z_layer_current;

comp = 0;
```

```
    first = 1;
    i = 1;
    while (i < (int) list[0].z) {
        if (comp == 0) {
            pt_org[X] = list[i].x1;
            pt_org[Y] = list[i].y1;
            pt_org[Z] = list[i].z + 1.;
            fprintf(ncfile, "N%i G00 T01 F %.2f X %.4f Y %.4f Z %.4f\n", comp, f
eedrate, pt_org[X], pt_org[Y], pt_org[Z]);
            comp++;
            fprintf(ncfile, "N%i G90 Z %.4f M03\n", comp, list[i].z + 0.1);
            comp++;
            fprintf(ncfile, "N%i G01 Z %.4f\n", comp, list[i].z);
            fast = 0;
            z_layer = z_layer_last = z_layer_current = list[i].z;
            comp++;
        }
        switch(list[i].type) {
            case 1: /* line */
                if (fast == 0)
                    fprintf(ncfile, "N%i G01 X %.4f Y %.4f\n", comp, list[i].x2, lis
t[i].y2);
                else {
                    d = sqrt(pow(list[i].x2-list[i].x1, 2.) +
                             pow(list[i].y2-list[i].y1, 2.));
                    if (d > .5) {
                        x_int = (-list[i].x2+list[i].x1)/d*0.1 + list[i].x2;
                        y_int = (-list[i].y2+list[i].y1)/d*0.1 + list[i].y2;
                        fprintf(ncfile, "N%i G00 X %.4f Y %.4f\n", comp, x_int, y_in
t);
                        comp++;
                    }
                    fprintf(ncfile, "N%i G01 X %.4f Y %.4f\n", comp, list[i].x2, lis
t[i].y2);
                    comp++;
                }
                break;
            case 2: /* arc */
                if (list[i].d == 1)
                    fprintf(ncfile, "N%i G02 X %.4f Y %.4f I %.4f J %.4f\n", comp,
list[i].x2, list[i].y2, list[i].cx, list[i].cy);
                else
                    fprintf(ncfile, "N%i G03 X %.4f Y %.4f I %.4f J %.4f\n", comp,
list[i].x2, list[i].y2, list[i].cx, list[i].cy);
                comp++;
                break;

/* vertical line connecting two different layers */
            case 4:
                if (first == 1) {
                    z_layer_last = list[i].z-0.05;
                    first = 0;
                }
                if (list[i].z < z_layer_current && ev(list[i], z_layer_current)> 1.)
                {
                    z_layer_last = z_layer_current;
```

```
                    z_layer_current = list[i].z;

}
            switch (fast) {
            case 0:
                if (list[i].z < z_layer || ev(list[i].z, z_layer) < 1.)
                    fprintf(ncfile, "N%i G01 Z %.4f\n", comp, list[i].z);
                else {
                    fprintf(ncfile, "N%i G00 Z %.4f\n", comp, list[i].z);
                    fast = 1;
                }
                comp++;
                z_layer = list[i].z;
                break;

case 1:
                if (z_layer-list[i].z > .5) {
                    if (z_layer_last-list[i].z < 0.15)
                        fprintf(ncfile, "N%i G00 Z %.4f\n", comp, list[i].z+0.1);
                    else
                        fprintf(ncfile, "N%i G00 Z %.4f\n", comp,
                                z_layer_last+.05);
                    comp++;
                    fprintf(ncfile, "N%i G01 Z %.4f\n", comp, list[i].z);
                    comp++;
                    fast = 0;
                    z_layer = list[i].z;
                    break;
                }
                break;
            }
            i++;
    }
    fprintf(ncfile, "N%i G01 Z %.4f\n", comp, list[i-1].z + 0.1);
    comp++;
    fprintf(ncfile, "N%i G00 Z %.4f\n", comp, pt_org[Z]);
    comp++;
    fprintf(ncfile, "N%i G00 X %.4f Y %.4f M02\n", comp, pt_org[X], pt_org[Y]);
    comp++;
```

```c
/*************************************************
*                                                *
*         ADAPTIVE LAMINATED MACHINING           *
*                    by                          *
*             Franck A. Vouzelaud                *
*             Experimental program               *
*                                                *
**************************************************/
/*                   SLICE.C                     */

/*------------------------------------------------
Add external function to autocad
--------------------------------------------------*/ include "offset.c"
include "utility.c"
include "loop.c"
include "mach.c"

define MAX_Z 20

/* type declaration */
typedef struct
{
    double z;
    int action;
} flatz;

/* declaration of local functions */
static int loadfuncs();

int slice();

/* difference between i-j */
static int intcompare(i,j)
int *i, *j;
{
    return(*j - *i);
}

/* declaration of variable */
ap_solid sol;
ads_real STEP, OFFSET, OFFSET_MINI, ROUGHNESS, R;
entity LIST_V[MAX], LIST[MAX];
int DIRECTION, SLICE_CONTROL, WINDOW;
ads_point ptmin, ptmax;

/* MAIN the main routine */
void main(argc,argv)
    int argc;
    char *argv[];
{
    short scode = RSRSLT;        /* default result code */
    int stat;

ads_init(argc,argv);         /* Initialize the interface */ for ( ; ; ) {
        if ((stat = ads_link(scode)) < 0) {
            printf("FACTS : bad status from ads_link() = %d\n", stat);
            fflush(stdout);
            exit(1);
        } scode = RSRSLT;
        switch(stat) { case RQXLOAD :
            scode = loadfuncs() ? RSRSLT : RSERR;
            break;

case RQSUBR :
            break;

default :
            break;
        }
    }
}
/*-----------------------------------------------
Funcload
------------------------------------------------*/
static int loadfuncs()
{
    int test;
    if (ads_defun("C:SLICE",0) == RTNORM) {
        ads_regfunc(slice,0);
    }
    else
        test = 0;
    return test;
}

/*------------------------------------------------
Quicksort: sort in decreasing order
------------------------------------------------*/
void quicksort(zz, l, u)
flatz zz[];
int l, u;
/* l = first element
   u = last element */
{
    int i, j;
    flatz temp;
    void partition();

if (u-l <= 0)
        ;
    else if (u-l == 1) {
        if (zz[u].z > zz[l].z) {
```

```c
/* swap a[l] and a[u] */
        temp.z = zz[l].z;
        temp.action = zz[l].action;
        zz[l].z = zz[u].z;
        zz[l].action = zz[u].action;
        zz[u].z = temp.z;
        zz[u].action = temp.action;
    }
    else {
        partition(zz, l, u, &i, &j);
        quicksort(zz, l, j);
        quicksort(zz, i, u);
    }
} void partition(zz, l, u, ri, rj)
flatz zz[];
int l, u;
int *ri, *rj;
{
    double r;
    flatz temp;
    int i, j;

r = zz[(l+u)/2].z;   /* middle element */
    i = l; j = u;
    while (i <= j) {
        while(zz[i].z > r)
            i++;
        while(zz[j].z < r)
            j--;
        if( i <= j) {
            temp.z = zz[i].z;
            temp.action = zz[i].action;
            zz[i].z = zz[j].z;
            zz[i].action = zz[j].action;
            zz[j].z = temp.z;
            zz[j].action = temp.action;
            i++;
            j--;
        }
    }
    *ri = i;
    *rj = j;
}

/*--------------------------------------------------------------
Check Flat: remove undesired flat surfaces
--------------------------------------------------------------*/
check_flat(zz, n, zmin1, zmax1)
flatz zz[];
double zmin1, zmax1;
int *n;
{
    int i, i1, i2, j;
    double z;

i = 0;
    i1 = 0;
    i2 = 0;
    z = -200.;

for (i = 0; i < *n; i++) {
        if ((zz[i].z > zmax1 && ev(zz[i].z, zmax1) > 1.) ||
            (zz[i].z < zmin1 && ev(zz[i].z, zmin1) > 1.))
            zz[i].action = 2;
        else {
            if (ev(zz[i].z, zmin1) < 1. && zz[i].action == 0)
                i1++;
            if (ev(zz[i].z, zmax1) < 1. && zz[i].action != 0)
                i2++;
            if (ev(zz[i].z, z) < 1. && ev(zz[i].z, zmin1) > 1. &&
                                        ev(zz[i].z, zmax1) > 1.)
                zz[i].action = 2;
        }
        z = zz[i].z;
    } for (i = 0; i < *n; i++) {
        if (ev(zz[i].z, zmin1) < 1. && i1 >= 1 && zz[i].action == 0) {
            zz[i].action = 2;
            i1--;
        }
        if (ev(zz[i].z, zmin1) < 1. && i2 >= 1 && zz[i].action == 0) {
            zz[i].action = 2;
            i2--;
        }
        if (ev(zz[i].z, z) < 1. && i2 > 1 && zz[i].action != 0) {
            zz[i].action = 2;
            i2--;
        }
    } i = 0;
    do {
        if (zz[i].action == 2) {
            for(j = i; j < *n-1; j++) {
                zz[j].z = zz[j+1].z;
                zz[j].action = zz[j+1].action;
            }
            (*n)--;
            i--;
        }
        i++;
    } while (i < *n);
}

/*--------------------------------------------------------------
Type Contour
--------------------------------------------------------------*/
type_contour(list, i1, i2, index)
entity list[];
int i1, i2, index;
{
    int i, i1, i2, j;
```

```c
ads_point pt, pt0;
point2d pt1, pt2, ptc;
double mag, l, tetal, teta2, teta;
vector cross;
AP_pt_class class;
int l;

l = 0.005;
pt0[Z] = list[il].z;
i = il;
switch (list[i].type) {
case 1:
    cross.x = -(list[i].y2 - list[i].y1);
    cross.y =  (list[i].x2 - list[i].x1);
    pt0[X] = (list[i].x1+list[i].x2)/2.;
    pt0[Y] = (list[i].y1+list[i].y2)/2.;
    break;

case 2:
    ptc.x = list[i].cx;
    ptc.y = list[i].cy;
    pt1.x = list[i].x1;
    pt1.y = list[i].y1;
    pt2.x = list[i].x2;
    pt2.y = list[i].y2;
    angle(&teta1, ptc, pt1);
    angle(&teta2, ptc, pt2);
    if (list[i].d == 1 && teta2 > teta1)
        teta1 += 2.*pi;
    if (list[i].d == -1 && teta2 < teta1)
        teta2 += 2.*pi;
    teta = (teta1+teta2)/2.;
    pt0[X] = list[i].cx+list[i].r*cos(teta);
    pt0[Y] = list[i].cy+list[i].r*sin(teta);
    cross.x = list[i].d*(pt0[X] - list[i].cx);
    cross.y = list[i].d*(pt0[Y] - list[i].cy);
    cross.z = 0.;
    break;
} mag = sqrt(pow(cross.x, 2.)+pow(cross.y, 2.));
cross.x = cross.x/mag;
cross.y = cross.y/mag;
pt[X] = pt0[X]+cross.x*l;
pt[Y] = pt0[Y]+cross.y*l;
pt[Z] = pt0[Z];

/* for vertical surface the point must be rotated */
if (index == 1) {
    teta = list[i1-1].offset;
    inv_rotate(pt, teta);
} ap_pt_class(sol, pt, &class);

if (class == AP_PT_ONSOLID) {
    pt[X] = pt0[X]-cross.x*l;
    pt[Y] = pt0[Y]-cross.y*l;
    pt[Z] = pt0[Z];
    if (index == 1) {
        teta = list[i1-1].offset;

inv_rotate(pt, teta);
    }
    ap_pt_class(sol, pt, &class);
    printf("x = %.4f, y = %.4f\n", pt[X], pt[Y]);
    printf("class 1 = %1\n", class);
    switch (class) {
    case AP_PT_INSOLID:
        return(1);
        break;
    case AP_PT_OFFSOLID:
    case AP_PT_ONSOLID:
        return(-1);
        break;
    }
}
else {
    printf("x = %.4f, y = %.4f\n", pt[X], pt[Y]);
    printf("class 2 = %1\n", class);
    switch (class) {
    case AP_PT_OFFSOLID:
        return(1);
        break;
    case AP_PT_INSOLID:
    case AP_PT_ONSOLID:
        return(-1);
        break;
    }
}
}

/*----------------------------------------
Surface
----------------------------------------*/
int surface(zz,j)
data zz[];
int *j;
{
    int i, k, rt, test;
    ads_point normal, ref, pt, ptsur;
    ap_FaceList *fl, *head;
    ap_Param p;
    double cross[3];

/* variable initialisation */
    ref[X] = 0.;
    ref[Y] = 0.;
    ref[Z] = 1.;

/* get the surfaces */
    ap_all_faces(sol, &fl);
    head = fl;
    *j = 0;
    for (i = 0; fl != NULL; i++, fl = fl->l_facenext) {
        rt = fl->l_face.ap_face_type;
        switch (rt) {
        case AP_PLANAR :
```

```c
          normal[X] = f1->l_face.ap_outnorm[X];
          normal[Y] = f1->l_face.ap_outnorm[Y];
          normal[Z] = f1->l_face.ap_outnorm[Z];
          cross[X] = ref[Y]*normal[Z]-ref[Z]*normal[Y];
          cross[Y] = ref[Z]*normal[X]-ref[X]*normal[Z];
          cross[Z] = ref[X]*normal[Y]-ref[Y]*normal[X];
          if (ev(cross[X], 0.)+ev(cross[Y], 0.)+ev(cross[Z], 0.) < 100.) {
              p.param1 = 0.;
              p.param2 = 0.;
              ap_surfparm2pt(sol,f1->l_face_id,p,ptsur);
              test = 0;
              k = 0;
              while ((test == 0) && (k < *j)) {
                  if (ev(zz[k].z, ptsur[2]) < 1.)
                      test = 1;
                  k++;
              }
              if (test == 0) {
                  zz[*j].z = ptsur[2];
                  zz[*j].action = (int) normal[2];
                  (*j)++;
              }
          }
          break;
      }
      ap_free_face_list(head);
  }
  /*------------------------------------------
   slice Horizontal
  ------------------------------------------*/
  slice_h(pt, action, n_slice, slice_id, file_entity)
  ads_point pt;
  int *n_slice, action;
  ads_name slice_id[];
  FILE *file_entity;
  {
      if (action != 0) {
          ads_command(RTSTR,"UCS",RTSTR,"Origin",RT3DPOINT,pt,RTNONE);
          if (ap_section(sol,slice_id[*n_slice]) == AP_NORMAL) {
              ads_command(RTSTR,"UCS",RTSTR,"X",RTSHORT,180,RTNONE);
              save_entity_h(slice_id[*n_slice], file_entity);
              *n_slice += 1;
          }
          /* if the intersection failed try the other one */
          else {
              ads_command(RTSTR,"UCS",RTSTR,"X",RTSHORT,180,RTNONE);
              action = 2;
          }
      }
      /* for all the double intersections */
      if (action == 0 || action == 2) {
          if (ap_section(sol,slice_id[*n_slice]) == AP_NORMAL) {
              save_entity_h(slice_id[*n_slice], file_entity);
              *n_slice += 1;
          }
      }
      /* UCS = WCS */
      ads_command(RTSTR,"UCS",RTSTR,"World",RTNONE);
  }
  /*------------------------------------------
   slice Vertical
  ------------------------------------------*/
  slice_v(pt, teta, slice_id)
  ads_point pt;
  ads_real teta;
  ads_name slice_id;
  {
      teta *= 180./pi;
      ads_command(RTSTR,"UCS",RTSTR,"Origin",RT3DPOINT,pt,RTNONE);
      ads_command(RTSTR,"UCS",RTSTR,"Z",RTREAL,teta,RTNONE);
      ads_command(RTSTR,"UCS",RTSTR,"X",RTSHORT,90,RTNONE);
      ap_section(sol, slice_id) == AP_NORMAL;
      /* UCS = WCS */
      ads_command(RTSTR,"UCS",RTSTR,"World",RTNONE);
  }
  /*------------------------------------------
   Results
  ------------------------------------------*/
  int results(b1, out, type, entity_id)
  struct resbuf *b1;
  double *out[];
  short *type;
  ads_name entity_id;
  {
      int i;
      char ename[10];
      struct resbuf *rb;
      *type = 0;
      out[0] = 1.;
      for (rb = b1; rb != NULL; rb = rb->rbnext) {
          if (rb->restype == 0) {
              strcpy(ename, rb->resval.rstring);
              if (strcmp(ename, "LINE") == 0) *type = 1;
              if (strcmp(ename, "ARC") == 0) *type = 2;
              if (strcmp(ename, "CIRCLE") == 0) *type = 3;
              /* a vertex is considered as a part of polyline */
              if (strcmp(ename, "VERTEX") == 0) *type = 1;
              if (strcmp(ename, "SEQEND") == 0) *type = -1;
```

```c
     }
     else if ((rb->restype == 10) && (strcmp(ename,"LINE") == 0)) {
         out[0] = rb->resval.rpoint[X];
         out[1] = rb->resval.rpoint[Y];
         out[2] = rb->resval.rpoint[Z];
     }
     else if ((rb->restype == 11) && (strcmp(ename,"LINE") == 0)) {
         out[3] = rb->resval.rpoint[X];
         out[4] = rb->resval.rpoint[Y];
         out[5] = rb->resval.rpoint[Z];
     }
     else if ((rb->restype == 10) && (strcmp(ename,"CIRCLE") == 0)) {
         out[0] = rb->resval.rpoint[X];
         out[1] = rb->resval.rpoint[Y];
         out[2] = rb->resval.rpoint[Z];
     }
     else if ((rb->restype == 40) && (strcmp(ename,"CIRCLE") == 0)) {
         out[3] = rb->resval.rreal;
     }
     else if ((rb->restype == 10) && (strcmp(ename,"ARC") == 0)) {
         out[0] = rb->resval.rpoint[X];
         out[1] = rb->resval.rpoint[Y];
         out[2] = rb->resval.rpoint[Z];
     }
     else if ((rb->restype == 40) && (strcmp(ename,"ARC") == 0)) {
         out[3] = rb->resval.rreal;
     }
     else if ((rb->restype == 50) && (strcmp(ename,"ARC") == 0)) {
         out[4] = rb->resval.rreal;
     }
     else if ((rb->restype == 51) && (strcmp(ename,"ARC") == 0)) {
         out[5] = rb->resval.rreal;
     }
     else if (rb->restype == 210) {
         out[6] = rb->resval.rpoint[X];
         out[7] = rb->resval.rpoint[Y];
         out[8] = rb->resval.rpoint[Z];
     }
     else if ((rb->restype == 10) && (strcmp(ename,"VERTEX") == 0)) {
         out[0] = out[3];
         out[1] = out[4];
         out[2] = out[5];
         out[3] = rb->resval.rpoint[X];
         out[4] = rb->resval.rpoint[Y];
         out[5] = rb->resval.rpoint[Z];
     }
    }
    ads_relrb(b1);

*type = 0;
/* decompose a polyline into segments of line */
    if (strcmp(ename,"POLYLINE") == 0) {
        if (ads_entnext(entity_id,entity_id) == RTNORM) {
            b1 = ads_entget(entity_id);
            results(b1, out, type, entity_id);
        }
        *type = 0;
        if (ads_entnext(entity_id,entity_id) == RTNORM) {
            b1 = ads_entget(entity_id);
            results(b1, out, type, entity_id);
        }
    }
}

/*---------------------------------------------------------
   Results Horizontal
 ---------------------------------------------------------*/
int results_h(out, type, list, n)
double out[];
short type;
entity list[];
int *n;
{
    arc a;
    short l;

/* copy the entity in the list */
    switch(type) {

/* end polyline */
    case -1:
        break;

case 1:
        list[*n].type = 1;
        list[*n].offset = 1.;
        list[*n].x1 = out[0];
        list[*n].y1 = out[1];
        list[*n].refl = 0;
        list[*n].flag1 = 0;
        list[*n].z = out[2];
        list[*n].x2 = out[3];
        list[*n].y2 = out[4];
        list[*n].ref2 = 0;
        list[*n].flag2 = 0;
        list[*n].d = 1;
        (*n)++;
        break;

case 2:
        list[*n].type = 2;
        list[*n].offset = 1.;
        a.cx = out[0];
        a.cy = out[1];
        a.cz = out[2];
        a.r = out[3];
        for (l = -4; l <= 5; l++) {
            if (ev(out[1],0.) < 200.) out[1] = 0.;
            if (ev(out[1],pi/2.) < 200.) out[1] = pi/2.;
            if (ev(out[1],pi) < 200.) out[1] = pi;
            if (ev(out[1],3./2.*pi) < 200.) out[1] = 3./2.*pi;
            if (ev(out[1],2.*pi) < 200.) out[1] = 2.*pi;
        }
        a.sa = out[4];
        a.ea = out[5];
        a.ed = out[8];
        list[*n].z = a.ed*a.cz;
        list[*n].r = a.r;
        list[*n].cx = a.cx*a.ed;
        list[*n].cy = a.cy;
```

```c
            if (a.ed > 0.)
                list[*n].d = -1;
            else
                list[*n].d = 1;
            list[*n].x1 = a.ed*(a.cx+a.r*cos(a.sa));
            list[*n].y1 = a.cy+a.r*sin(a.sa);
            list[*n].flag1 = 0;
            list[*n].ref1 = 0;
            list[*n].x2 = a.ed*(a.cx+a.r*cos(a.ea));
            list[*n].y2 = a.cy+a.r*sin(a.ea);
            list[*n].ref2 = 0;
            list[*n].flag2 = 0;
            (*n)++;
            break;
        case 3: /* a circle is transformed into 2 arcs */
            /* first arc */
            list[*n].type = 2;
            list[*n].offset = 1;
            list[*n].cx = out[0]+out[8];
            list[*n].cy = out[1];
            list[*n].z = out[2];
            list[*n].r = out[3];
            list[*n].z = out[8];
            list[*n].d = 1;
            list[*n].x1 = list[*n].cx+list[*n].r;
            list[*n].y1 = list[*n].cy;
            list[*n].ref1 = 0;
            list[*n].flag1 = 0;
            list[*n].x2 = list[*n].cx-list[*n].r;
            list[*n].y2 = list[*n].cy;
            list[*n].ref2 = 0;
            list[*n].flag2 = 0;
            (*n)++;
            /* second arc */
            list[*n].type = 2;
            list[*n].offset = 1;
            list[*n].cx = out[0]*out[8];
            list[*n].cy = out[1];
            list[*n].z = out[2];
            list[*n].r = out[3];
            list[*n].z = out[8];
            list[*n].d = -1;
            list[*n].x1 = list[*n].cx-list[*n].r;
            list[*n].y1 = list[*n].cy;
            list[*n].flag1 = 0;
            list[*n].ref1 = 0;
            list[*n].x2 = list[*n].cx+list[*n].r;
            list[*n].y2 = list[*n].cy;
            list[*n].ref2 = 0;
            list[*n].flag2 = 0;
            (*n)++;
            break;
        default:
            printf("Entity not supported by the program: type = %1\n", type);
            break;
    }
}

/*-----------------------------------------------------------
Find Block
-----------------------------------------------------------*/
int find_block(slice_id, entity_id)
ads_name slice_id, entity_id;
{
    long test;
    ads_name block_name[10];
    struct resbuf *b1, *rb;
    ads_point pt;

/* search the name of the block */
    b1 = ads_entget(slice_id);
    for (rb = b1; rb != NULL; rb = rb->rbnext) {
        if (rb->restype == 2)
            strcpy(block_name,rb->resval.rstring);
    }
    ads_relrb(b1);

/* search for the rigth layer */
    /* get the first block */
    if ((b1 = ads_tblnext("BLOCK",1)) != NULL) {
        test = 0;
        for (rb = b1; rb != NULL; rb = rb->rbnext) {
            if ((rb->restype==2) && (strcmp(rb->resval.rstring,block_name) ==0))
                test = 1;
            if ((rb->restype == -2) && test == 1) {
                entity_id[0] = rb->resval.rname[0];
                entity_id[1] = rb->resval.rname[1];
            }
        }
        ads_relrb(b1);
    }

/* put the other blocks */
    while(test == 0 && ((b1 = ads_tblnext("BLOCK",0)) != NULL)) {
        for (rb = b1; rb != NULL; rb = rb->rbnext) {
            if ((rb->restype==2) && (strcmp(rb->resval.rstring,block_name) ==0))
                test = 1;
            if ((rb->restype == -2) && test == 1) {
                entity_id[0] = rb->resval.rname[0];
                entity_id[1] = rb->resval.rname[1];
            }
        }
        ads_relrb(b1);
    }
    return(test);
}

/*-----------------------------------------------------------
Save Entity Horizontal
-----------------------------------------------------------*/
int save_entity_h(slice_id, file)
ads_name slice_id;
FILE *file;
{
```

```c
    int n, i, l1, l2, k;
    short type;
    double out[9];
    ads_name entity_id;
    struct resbuf *b;
    entity list1[MAX];

n = 0;
    if ( find_block(slice_id, entity_id) == 1) {
        list1[n].type = 0;
        n++;
        b = ads_entget(entity_id);
        results(b, out, &type, entity_id);
        results_h(out, type, list1, &n);
        if (WINDOW == 1) check_window(list1, &n);
    }
    while (ads_entnext(entity_id,entity_id) == RTNORM) {
        b = ads_entget(entity_id);
        results(b, out, &type, entity_id);
        results_h(out, type, list1, &n);
        if (WINDOW == 1) check_window(list1, &n);
    }
    list1[0].z = (double) n;
    list1[0].d = n-1;
    sort_entity(list1, LIST);

/*          */
    i = 0;
    while (i < (int) LIST[0].z) {
        l1 = i;
        l2 = i+LIST[i].d;
        i = l2+1;
        entity_draw(LIST, l1, l2);
    }

/*          */
    /* check direction of each contour */
    i = 0;
    while (i < (int) LIST[0].z) {
        l1 = i;
        l2 = i+LIST[i].d;

/* find the direction and compare to the type of loop internal or external */
    /*     entity_draw(LIST, l1, l2); */
        if ((k = type_contour(LIST, l1, l2, 0)) == -1)
            inverse_loop(LIST, l1, l2);
        /* printf("\n %i \n", k); */
        LIST[i].flag1 = direction_loop(LIST, l1, l2);

i = l2+1;
    }

/*          */
    i = 0;
    while (i < (int) LIST[0].z) {
        l1 = i;
        l2 = i+LIST[i].d;
        i = l2+1;
        entity_draw(LIST, l1, l2);
    }
```

```c
    /* find the offset for ball end mill */
    list_offset(file);
}

/*--------------------------------
   Check Window
---------------------------------*/
check_window(list, n)
entity list[];
int *n;
/* verify if the last entity is inside the window otherwise it removes it */
{
    int i;
    i = (*n)-1;
    if ((list[i].x1 < ptmin[X] || list[i].x1 > ptmax[X] ||
         list[i].y1 < ptmin[Y] || list[i].y1 > ptmax[Y] ||
         list[i].x2 < ptmin[X] || list[i].x2 > ptmax[X] ||
         list[i].y2 < ptmin[Y] || list[i].y2 > ptmax[Y])
        (*n)--;
}

/*--------------------------------
   Save Entity Vertical
---------------------------------*/
int save_entity_v(slice_id, list, teta)
ads_name slice_id;
entity list[];
double teta;
{
    int n, i, l1, l2, k;
    short type;
    double out[9];
    ads_name entity_id;
    struct resbuf *b;
    entity list1[MAX], list2[MAX], ent;
    ads_point pt;

/* the first element of list is in the list */
    /* it contains the references of the vertical plane */
    /* x1, y1 point of the plane */
    /* x2, y2 normal to the plane */
    entity_copy(list[0], &ent, 1);

n = 0;
    if ( find_block(slice_id, entity_id) == 1) {
        list1[n].type = 0;
        n++;
        b = ads_entget(entity_id);
        results(b, out, &type, entity_id);
        pt[X] = out[3];
        pt[Y] = out[4];
        pt[Z] = out[5];
        if (type == 1)
            rotate(out, teta, type);
```

```
        else
            out[8] = 1.;
        results_h(out, type, list1, &n);
        out[3] = pt[X];
        out[4] = pt[Y];
        out[5] = pt[Z];
    } while (ads_entnext(entity_id,entity_id) == RTNORM) {
        b = ads_entget(entity_id);
        results(b, out, &type, entity_id);
        pt[X] = out[3];
        pt[Y] = out[4];
        pt[Z] = out[5];
        if (type == 1)
            rotate(out, teta, type);
        else
            out[8] = 1.;
        results_h(out, type, list1, &n);
        out[3] = pt[X];
        out[4] = pt[Y];
        out[5] = pt[Z];
    }
    list1[0].z = (double) n;
    list1[0].d = n-1;
    sort_entity(list1, list2);

/* find the direction of each contour */
    i = 0;
    while (i < (int) list2[0].z) {
        l1 = i+1;
        l2 = i+list2[i].d;

/* add the references of the vertical plane to the list */
        ent.z = list2[l1].z;
        ent.d = list2[l1].d;
        entity_copy(ent, &list2[l1], 1);

/* find the direction and compare to the type of loop internal or external */
        if ((k = type_contour(list2, l1, l2, 1)) == -1*DIRECTION)
            inverse_loop(list2, l1, l2);
        printf("\n %i \n", k);
        list2[l1].flag1 = direction_loop(list2, l1, l2);
        i = l2+1;
    }

/* offset the vertical contours */
    first_offset(list2, list, OFFSET);

/* add the references of the vertical plane to the list */
/* the reference is lost when the contour is offseted */
    i = 0;
    while (i < (int) list[0].z) {
        l2 = i+1;
        l2 = i+list[i].d;
        ent.z = list[l1].z;
        ent.d = list[l1].d;
        entity_copy(ent, &list[l1], 1);
        i += list[l1].d+1;
        entity_draw(list, l1, l2);     */
/*
}

/*-----------------------------------------------------------------
 Rotate
-----------------------------------------------------------------*/
rotate(a, teta, type)
double a[], teta;
int type;
{
    ads_point pt;

switch (type) {

/* segment of line */
    case 1;
/* second point */
        pt[X] = cos(teta)*a[3]+sin(teta)*a[4];
        pt[Y] = a[5];
        pt[Z] = sin(teta)*a[3]-cos(teta)*a[4];
        a[3] = pt[X];
        a[4] = pt[Y];
        a[5] = pt[Z];

/* arc of circle */
    case 2;
        a[6] = a[7] = 0;
        a[8] = 1.;

/* point */
    case 0:
/* first point of a segment or center of a circle */
        pt[X] = cos(teta)*a[0]+sin(teta)*a[1];
        pt[Y] = a[2];
        pt[Z] = sin(teta)*a[0]-cos(teta)*a[1];
        a[0] = pt[X];
        a[1] = pt[Y];
        a[2] = pt[Z];
        break;
    }
}

/*-----------------------------------------------------------------
 Inverse of the Rotation
-----------------------------------------------------------------*/
inv_rotate(pt, teta)
ads_point pt;
double teta;
{
    ads_point pt_int;

pt_int[X] = cos(teta)*pt[X]+sin(teta)*pt[Z];
    pt_int[Y] = sin(teta)*pt[X]-cos(teta)*pt[Z];
    pt_int[Z] = pt[Y];
    pt[X] = pt_int[X];
    pt[Y] = pt_int[Y];
    pt[Z] = pt_int[Z];
}
```

```c
/*---------------------------------------------------------------
Evaluation of Slice Thickness
-----------------------------------------------------------------*/
eval_step(zz, action, z, i, inter, n, n_slice)

flatz zz[];
int *action, *i, inter, n, n_slice;
double *z;
{
    double step, step_th, a0, a1;
    int j;

/* move to the next range */
    if (ev(zz[*i].z, *z) < 1.)
        (*i)++;

/* last layer */
    if (*i >= n)
        *z = 1.;

else {

/* adaptive laminated machining active */
        if (SLICE_CONTROL == 1) {
            if (n_slice == 0)
                OFFSET_MINI = .01;
            slice_thickness(ROUGHNESS, OFFSET_MINI, &step_th);
            if (step_th < 0.001)
                step_th = 0.001;
            if (step_th > STEP)
                step_th = STEP;
            a0 = (*z)-zz[*i].z-2*step_th;
            a1 = (*z)-zz[*i].z;
            if ( a0 < 0. && ev(a1, 2*step_th) > 1. && ev(al, step_th) > 1.) {
                if(ev(step_th, 0.001) < 1.)
                    step_th = *z-zz[*i].z;
                else {
                    if ((*z)-zz[*i].z-step_th < 0.)
                        step_th = (*z)-zz[*i].z;
                    else
                        step_th = (*z-zz[*i].z)/2.;
                }
            }
            *z -= step_th;
            if (*z < zz[*i].z && ev(*z, zz[*i].z) > 1.)
                *z = zz[*i].z;

if (ev(*z, zz[*i].z) < 1.)
                *action = zz[*i].action;
            else
                *action = 0;
            if (inter == 1 && *action != 0)
                *action = 2;
        }

/* conventional slicing */
        else {

/* get the nearest step to have both intermediate z values */
            j = (zz[*i-1].z-zz[*i].z)/STEP;
            if (j <= 0) j = 1;
            step = (zz[*i].z-zz[*i-1].z)/j;

/* the slice thickness must be less than or equal to STEP */
            if (step > STEP)
                step = (zz[*i].z-zz[*i-1].z)/(j+1);

*z += step;
            if (*z < zz[*i].z && ev(*z, zz[*i].z) > 1.)
                *z = zz[*i].z;

if (ev(*z, zz[*i].z) < 1.)
                *action = zz[*i].action;
            else
                *action = 0;
            if (inter == 1 && *action != 0)
                *action = 2;
        }
    }
}

/*---------------------------------------------------------------
Calculate the optimal slice thickness
-----------------------------------------------------------------*/
slice_thickness(r, y, *z)

double r, y, *z;
{
/* R is the radius of the ball end mill
   r = roughness
   y = x/R is the parameter to calculate the local slope */ double alpha, beta, gamma, test1, test2;

if ( ov(y, 0.) < 1.)
        *z = STEP/10;
    else if (ov(y, 1.) < 1.)
        *z = STEP;
    else {

/* ball end mill */
        if (BALL == 1) {
            beta = asin(sqrt(2.*R*r-pow(r, 2.))/R);
            alpha = asin(2.*y/(1.+pow(y, 2.)));
            *z = 4.*y*sqrt(-pow(r, 2.)+2*R*r)/(1.+pow(y, 2.));
            test1 = pi/2.-alpha-beta;
            test2 = 4.*y*R-(1+pow(y, 2.))*(*z);
            if (test1 < 0. || test2 < 0.) {
                gamma = asin(2.*y/(1.+pow(y, 2.)));
                gamma = alpha-acos(1.-r/R);
                *z = R*tan(alpha)*(1.-sin(gamma));
            }
        }

/* flat end mill */
        else {
            *z = r*(1+y*y)/(1-y*y);
        }
    }
}
```

```c
        }
        printf("optimal step = %f\n", *z);
}

/*--------------------------------------------------------------*/
List Offset
/*--------------------------------------------------------------*/
list_offset(file)
FILE *file;
{
        int i, l1, l2, j, j1, j2, k, n, position, start, output;
        entity list_a[MAX], list_b[MAX], ent, l[1];
        ads_point pt, pt1;
        point2d lpt[2];
        double d0, d1, d, l1;

i = 0;
/* check if for each entity if there is a corresponding vertical intersection to
   calculate the offset for ball end mill */
        while(i < (int) LIST[0].z) {
                l1 = i+1;
                l2 = l1+LIST[i].d;
                printf("\n2 = %f\n", LIST[i].z);
                entity_draw(LIST, l1, l2);  /* */
                for (l = l1; l <= l2; l++) {
                        d0 = 5.*OFFSET;
/* find the first vertical section corresponding to the horizontal entity */
                        if (check_vertical(LIST[l], &position, 0, pt) != -1) {
                                intersection_vertical(LIST[l], list_a, pt);
/* add the new vertical section to the list LIST_V */
                                n = (int) LIST_V[0].z;
                                position = n;
                                j = 0;
                                while (j < (int) list_a[0].z) {
                                        entity_copy(list_a[j], &LIST_V[n], 1);
                                        n++;
                                        j++;
                                }
                                LIST_V[0].z = (double) n;
                        }
/* for each horizontal entity calculates the offset for a ball end mill */
                        do {
/* create the segment of line at z+OFFSET */
                                pt1[X] = pt[X];
                                pt1[Y] = pt[Y];
                                pt1[Z] = pt[Z]+OFFSET;
                                printf("before X = %f, Y = %f Z = %f\n", pt1[X],pt1[Y],pt1[Z]);
                                rotate(pt1, LIST_V[position].offset, 0);
                                printf("after X = %f, Y = %f Z = %f\n", pt1[X],pt1[Y],pt1[Z]);
/* create an horizontal line (y = const. z = const.) */
                                ent.type = 1;
                                ent.y1 = ent.y2 = pt1[Y];
                                ent.z = pt1[Z];
                                ent.x1 = pt1[X]+1.*OFFSET;
                                ent.x2 = pt1[X]-1.*OFFSET;
                                entity_copy(ent, &l[0], 0);
                                entity_draw(l, 0, 0);
                                entity_draw(l, 0, 0);
/* calculates the intersection between ent and each entity in LIST_V */
                                j1 = position+1;
                                j2 = position+LIST_V[position].d;
                                d1 = 5.*OFFSET;
                                for (j = j1; j <= j2; j++) {
                                        output = intersect2(ent, LIST_V[j], lpt);
                                        entity_draw(LIST_V, j, j);
                                        printf("output = %f\n", output);  /* */
                                        k = 0;
                                        while (k < output) {
                                                d = sqrt(pow(pt1[X]-lpt[k].x,2.)) +
                                                        sqrt(pow(OFFSET, 2.) +
                                                                pow(pt1[X]-lpt[k].x,2.));
                                                printf("d = %f, l1 = %f\n", d, l1);
                                                if ((l1/1.415 < OFFSET && (l1>OFFSET || ev(OFFSET,l1)<1.)
                                                        && ((d1 > OFFSET && ev(d), OFFSET) > 1.) ||
                                                        (d < d1))) {
                                                        d1 = d;
                                                }
                                                k++;
                                        }
                                }
                                if ((d0 > OFFSET && ev(d0, OFFSET) > 1.) ||
                                        (d1 < OFFSET || ev(OFFSET, d1) < 1.)) {
                                        d0 = d1;
                                        start = position+LIST_V[position].d+1;
                                }
                        } while (check_vertical(LIST[l], &position, start, pt) == 1);
                        printf("offset = %f\n", d0/OFFSET);
                        LIST[l].offset = d0/OFFSET;
                        if (LIST[l].offset > 1.)
                                LIST[l].offset = 1.;
                        if (LIST[l].offset < OFFSET_MINI)
                                OFFSET_MINI = LIST[l].offset;
                }
        }
        save_temp(LIST, file);
}

/*--------------------------------------------------------------*/
Intersection Vertical
/*--------------------------------------------------------------*/
intersection_vertical(ent, list, pt)
entity ent, list[];
ads_point pt;
{
        point2d pt1, pt2;
        ads_real teta;
        double mag, a1, a2;
```

```
          ads_name slice_id;

list[0].type = 0;

switch(ent.type) {
          case 1:
               list[0].x1 = pt1.x = pt[X] = (ent.x1+ent.x2)/2.;
               list[0].y1 = pt1.y = pt[Y] = (ent.y1+ent.y2)/2.;
               pt[Z] = ent.z;

/* normal vector to the plane */
               list[0].x2 = ent.x2-ent.x1;
               list[0].y2 = ent.y2-ent.y1;

mag = sqrt(pow(list[0].x2, 2.)+pow(list[0].y2, 2.));
               list[0].x2 /= mag;
               list[0].y2 /= mag;

pt2.x = pt1.x+list[0].y2;
               pt2.y = pt1.y-list[0].x2;
               angle(&teta, pt1, pt2);
               break;

case 2:
               angle_arc(ent, &a1, &a2);
               teta = (a1+a2)/2.;
               pt[X] = list[0].x1 = ent.cx+ent.r*cos(teta);
               pt[Y] = list[0].y1 = ent.cy+ent.r*sin(teta);
               pt[Z] = ent.z;

/* normal vector to the plane */
               list[0].x2 = cos(teta+pi/2.);
               list[0].y2 = sin(teta+pi/2.);
               break;
          }
          list[0].offset = teta;
          list[0].z = 1.;
          list[0].d = 0.;
          slice_v(pt, teta, slice_id);
          save_entity_v(slice_id, list, teta);
          ads_entdel(slice_id);
     }

/*-------------------------------------------------
Check Vertical
---------------------------------------------------*/
check_vertical(ent, pos, first, pt_inter)
     entity ent;
     int *pos, first;
(
     int i, success;
     double d;
     entity l1[1], l2[1];
     vector v1, v2, cross;
     point2d pt;

success = 0;
     i = first;
```

```
          entity_copy(ent, &l1[0], 1);

switch(ent.type) {

/* for segment of line */
          case 1:
               while (i< (int) LIST_V[0].z && success == 0) {

/* verify if the segment of line is perpendicular to the plane */
                    v1.x = ent.x2-ent.x1;
                    v1.y = ent.y2-ent.y1;
                    v1.z = 0.;
                    v2.x = LIST_V[i].x2;
                    v2.y = LIST_V[i].y2;
                    v2.z = 0.;
                    cross_vector(v1, v2, &cross);
     /*            printf("\n i = %f", i);
                  printf("\nx1 = %f y1 = %f", v1.x, v1.y);
                  printf("\nx2 = %f y2 = %f", v2.x, v2.y);
                  printf("\ncross.x = %f cross.z = %f", cross.z,*cross.y,*cro
ss.z);
     */
     /* find the inersection between the plane and the segment of line */
                    if(ev(cross.x, 0.)+ev(cross.y, 0.)+ev(cross.z,0.) < 1.) (
                         l2[0].type = 1;
                         l2[0].x1 = LIST_V[i].x1+100.*LIST_V[i].y2;
                         l2[0].y1 = LIST_V[i].y1-100.*LIST_V[i].x2;
                         l2[0].x2 = LIST_V[i].x1-100.*LIST_V[i].y2;
                         l2[0].y2 = LIST_V[i].y1+100.*LIST_V[i].x2;
                         if (intersect(l1, l2, 0, 0, &pt, &d) == 1) (
                              pt_inter[X] = pt.x;
                              pt_inter[Y] = pt.y;
                              pt_inter[Z] = ent.z;
                              success = 1;
                              *pos = i;
                         }
                    }
                    i += LIST_V[i].d+1;
               }
               break;

/* for an arc of circle */
          case 2:

/* verify if the center of the arc is on the plane */
               while (i< (int) LIST_V[i].z && success == 0) (
                    v1.x = -LIST_V[i].y2;
                    v1.y = LIST_V[i].x2;
                    v1.z = 0.;
                    v2.x = LIST_V[i].x1-ent.cx;
                    v2.y = LIST_V[i].y1-ent.cy;
                    v2.z = 0.;
                    cross_vector(v1, v2, &cross);
     /*            printf("\n i = %f", i);
                  printf("\nx1 = %f y1 = %f", v1.x, v1.y);
                  printf("\nx2 = %f y2 = %f", v2.x, v2.y);
                  printf("\ncross.x = %f cross.z = %f", cross.z,*cross.y,*cro
ss.z);
     */
                    if(ev(cross.x, 0.)+ev(cross.y, 0.)+ev(cross.z,0.) < 1.) (
```

```
                    l2[0].type = 1;
                    l2[0].x1 = LIST_V[i].x1+100.*LIST_V[i].y2;
                    l2[0].y1 = LIST_V[i].y1-100.*LIST_V[i].x2;
                    l2[0].x2 = LIST_V[i].x1-100.*LIST_V[i].y2;
                    l2[0].y2 = LIST_V[i].y1+100.*LIST_V[i].x2;
                    if (intersect(l1, l2, 0, 0, &pt, &d) == 1) {
                        pt_inter[X] = pt.x;
                        pt_inter[Y] = pt.y;
                        pt_inter[Z] = ent.z;
                        success = 1;
                        *pos = i;
                    }
                }
                i += LIST_V[i].d+1;
            }
            break;
    }
    return(success);
}

/*-----------------------------------------------------------------
Intersection line entity
-----------------------------------------------------------------*/ int intersect2(e1, e2, pt)
entity e1, e2;
point2d pt[];
{
/* declaration of variables */
    int success, res1, res2, res3, res4;
    vector v1, v2, v3, cross;
    double l1, l2, delta, r1, r2, a1a, a1b, a2a, a2b, temp;
    double l1a, l1b, l2a, l2b, a, b, c;
    point2d p1temp, p2temp;

success = 0;

switch(e2.type) {
/* ---------------------------------- */
/* intersection of two lines          */
/* ---------------------------------- */
    case 1:
        v1.x = e1.x2-e1.x1;
        v1.y = e1.y2-e1.y1;
        v1.z = 0;
        v2.x = e2.x2-e2.x1;
        v2.y = e2.y2-e2.y1;
        v2.z = 0;
        cross_vector(v1, v2, &cross);

/* 2 parallel lines */
        if (ev(cross.x, 0.)+ev(cross.y, 0.) < .01) {
            v3.x = e2.x1-e1.x2;
            v3.y = e2.y1-e1.y2;
            v3.z = 0;
            cross_vector(v1, v3, &cross);

/* 2 parallel colinear lines */
            if (ev(cross.x, 0.)+ev(cross.y, 0.)+ev(cross.z, 0.) < 1.) {
/* v1 is not parallel to X */
                if (ev(v1.x, 0.) >= 0.1) {
                    l1 = (e2.x1-e1.x1)/v1.x;
                    l2 = (e2.x2-e1.x1)/v1.x;
                }
/* v1 is parallel to X */
                else {
                    l1 = (e2.y1-e1.y1)/v1.y;
                    l2 = (e2.y2-e1.y1)/v1.y;
                }
/* e1+ = e2+ or e1+ = e2-, e1 and e2 parallel */
                if ((ev(l1, 0.)+ev(l2, 1.) < -1.) ||
                    (ev(l1, 1.)+ev(l2, 0.) < -1.))
                    success = 0;
/* e1+ & e2+ one common point, e1 and e2 parallel */
                else if (ev(l1, 1.) < 1. && l2 > 1.) {
                    success = 1;
                    pt[0].x = e1.x2;
                    pt[0].y = e1.y2;
                }
/* e2- & e1+ one common point, e1 and e2 parallel */
                else if (ev(l1, 0.) < 1. && l2 < 0.) {
                    success = 1;
                    pt[0].x = e1.x1;
                    pt[0].y = e1.y1;
                }
/* e1+ & e2- one common point, e1 and e2 parallel */
                else if (ev(l2, 1.) < 1. && l1 > 1.) {
                    success = 1;
                    pt[0].x = e1.x2;
                    pt[0].y = e1.y2;
                }
/* e2+ & e1+ one common point, e1 and e2 parallel */
                else if (ev(l2, 0.) < 1. && l1 < 0.) {
                    success = 1;
                    pt[0].x = e1.x1;
                    pt[0].y = e1.y1;
                }
/* e1+ & e2- = e2- e2 after or before , no intersection */
                else success = 0;
            }
/* 2 non parallel lines */
            else {
                delta = -v1.x*v2.y+v2.x*v1.y;
                l1 = (v2.x*(e2.y1-e1.y1) - v2.y*(e2.x1-e1.x1))/delta;
                l2 = (v1.x*(e2.y1-e1.y1) - v1.y*(e2.x1-e1.x1))/delta;
/* no intersection */
                if ((l1 < 0. && ev(l1, 0.) > 1.) || (l1 > 1. && ev(l1, 1.) > 1.)
```

```
                if (l2 < 0. && ev(l2, 0.) > 1.) || (l2 > 1. && ev(l2, 1.) > 1.))
                    success = 0;
                else {
                    success = 1;
                    pt[0].x = el.x1+l1*v1.x;
                    pt[0].y = el.y1+l1*v1.y;
                }
                break;

/*-----------------------------------------*/
/* intersection line with arc of circle    */
/*-----------------------------------------*/
            case 2:
                res1 = res2 = res3 = res4 = 0;
                l1a = l1b = l2a = l2b = 2.;
                v1.x = el.x2-el.x1;
                v1.y = el.y2-el.y1;
                v2.x = el.x1-e2.cx;
                v2.y = el.y1-e2.cy;

/* distance between center of the arc and line */
                a = -v1.y;
                b = v1.x;
                c = -el.x1*a-el.y1*b;
                delta = (a*e2.cx+b*e2.cy+c)/sqrt(a*a+b*b);
                if (delta < 0) delta = -delta;

/* possible intersection */
                if (delta < e2.r || ev(delta, e2.r) < 1.) {
                    if (ev(delta, e2.r) < 1.) {
                        l1a = l1b = -(v1.x*v2.x+v1.y*v2.y)/(v1.x*v1.x+v1.y*v1.y);
                        if (ev(el.x1, e2.x1)+ev(el.y1, e2.y1) < 1.)
                            l1b = l1a = 0.;
                        else if (ev(el.x1, e2.x2)+ev(el.y1, e2.y2) < 1.)
                            l1b = l1a = 0.;
                        else if (ev(el.x2, e2.x1)+ev(el.y2, e2.y1) < 1.)
                            l1b = l1a = 1.;
                        else if (ev(el.x2, e2.x2)+ev(el.y2, e2.y2) < 1.)
                            l1b = l1a = 1.;
                    }
                    else {
                        delta = pow(((v1.x*v2.x+v1.y*v2.y), 2.) -
                                    (v1.x*v1.x + v1.y*v1.y) *
                                    (v2.x*v2.x + v2.y*v2.y - e2.r*e2.r));
                        if (delta < 0) delta = -delta;
                        l1a = (-(v1.x*v2.x+v1.y*v2.y)+sqrt(delta))/
                              (v1.x*v1.x + v1.y*v1.y);
                        l1b = (-(v1.x*v2.x+v1.y*v2.y)-sqrt(delta))/
                              (v1.x*v1.x + v1.y*v1.y);
                    }
                    if (ev(l1a, 0.) < 1.) {
                        res1 = 1;
                        l1a = 0.;
                    }
                    else if (ev(l1a, 1.) < 1.)
                        res1 = 2;
                    else if (l1a < 1. && l1a > 0.)
                        res1 = 3;
                    else
                        res1 = 0;

if (ev(l1b, 0.) < 1.) {
                        res2 = 1;
                        l1b = 0.;
                    }
                    else if (ev(l1b, 1.) < 1.) {
                        res2 = 2;
                        l1b = 1.;
                    }
                    else if (l1b < 1. && l1b > 0.)
                        res2 = 3;
                    else
                        res2 = 0;

/* at least one intersection with the line */
                    if (res1 != 0 || res2 != 0) {
                        p1temp.x = el.x1+l1a*v1.x;
                        p1temp.y = el.y1+l1a*v1.y;
                        angle_arc(e2, &a2a, &a2b);
                        res3 = angle_position(e2, a2a, a2b, p1temp, &12a);
                        p2temp.x = el.x1+l1b*v1.x;
                        p2temp.y = el.y1+l1b*v1.y;
                        res4 = angle_position(e2, a2a, a2b, p2temp, &12b);
                    }
                    if (res1 != 0 && res3 != 0) {
                        pt[success].x = p1temp.x;
                        pt[success].y = p1temp.y;
                        success++;
                    }
                    if (res2 != 0 && res4 != 0) {
                        pt[success].x = p2temp.x;
                        pt[success].y = p2temp.y;
                        success++;
                    }
                }
                break;
        }
        return(success);
    }

/*------------------------------------------------------------*/
/* slice                                                      */
/*------------------------------------------------------------*/ int slice()
{
    int i, n, n_slice, inter, code, action;
    flatz zz[20];
    char fname[132], ans[1];
    ads_name sol_id, slice_id[MAX];
    ads_real comp, z;
    ads_point pt;
    ap_Mprop mprop;
```

```c
char filename[80], fullfilename[80], prompt[20];
FILE *file_entity, *fopen();

pi = 3.141592654;
n = 0;
LIST_V[0].z = 0.;
BALL = 0;

ads_command(RTSTR,"UCSICON",RTSTR,"Origin",RTNONE);

/* open file */
   code = ads_getstring(0,"\nEnter the name of a file without its extention for
results:",filename);
   if (code != RTNORM) return(code);

/* get the solid to be sliced */
   while ((code=ads_entsel("select the solid to be sliced : ", sol_id, pt1) ==
RTERROR)
      ads_printf("No solid found. try again...\n");
   if (code != RTNORM) return(code);

/* return the code of the solid */
   ap_name2sol(sol_id, &sol);
   if (sol == NULL) {
      ads_fail("\nUnable to read the solid id");
      return(RTERROR);
   }

/* offset = radius for ball end mill */
   ads_initget(1+2+4, NULL);
   code = ads_getreal("\nEnter the offset for vertical slices : ",&OFFSET);
   if (code != RTNORM) return(code);
   R = OFFSET;

/* orientation of the contours */
   do {
      code = ads_getstring(0,"Do you want a positive or a negative (p/n) ? ",
ans);
      if (code != RTNORM) return(code);
   } while (strcmp(ans,"n") != 0 && strcmp(ans, "p") != 0);
   if (strcmp(ans,"p") == 0)
      DIRECTION = 1;
   else
      DIRECTION = -1;

DIRECTION = 1;
   WINDOW = -1;
   do {
      code = ads_getstring(0,"Do you want a window (y/n) ? ", ans);
      if (code != RTNORM) return(code);
   } while (strcmp(ans,"n") != 0 && strcmp(ans, "y") != 0);
   if (strcmp(ans,"y") == 0) {
      WINDOW = 1;
      strcpy(prompt, "\nEnter Xmin and Ymin: ");
      code = ads_getpoint(NULL, prompt, ptmin);
      if (code != RTNORM) return(code);
      strcpy(prompt, "\nEnter Xmax and Ymax: ");
      code = ads_getpoint(NULL, prompt, ptmax);
      if (code != RTNORM) return(code);
   } do {
      code = ads_getstring(0,"One slice / several slices (o/s) ? ", ans);
      if (code != RTNORM) return(code);
   } while (strcmp(ans,"o") != 0 && strcmp(ans, "s") != 0);

/* ****************************** ONE SLICE ****************************** */
   if (strcmp(ans, "o") == 0) {
      code = ads_getreal("Enter the altitude of the intersection z : ", &z);
      if (code != RTNORM) return(code);
      file_entity = fopen(filename,"w");
      ads_command(RTSTR,"UCS",RTSTR,"World",RTNONE);
      n_slice = 0;
      pt[X] = pt[Y] = 0;
      pt[Z] = z;
      slice_h(pt, 1, &n_slice, slice_id, file_entity);
      fclose(file_entity);
   }

/* ****************************** ONE SLICE ****************************** */
   else {

/* type of slicing */
      do {
         code = ads_getstring(0,"Do you want an adaptive slicing (y/n) ? ",
ans);
         if (code != RTNORM) return(code);
      } while (strcmp(ans, "n") != 0 && strcmp(ans, "y") != 0);
      if (strcmp(ans, "y") == 0) {
         SLICE_CONTROL = 1;
         ads_initget(1+2+4, NULL);
         code = ads_getreal("Enter the maximum slice thickness : ", &STEP);
         if (code != RTNORM) return(code);
         do {
            code = ads_getstring(0,"Type of tool ball end mill/'flat end mll
1 (b/f) ? ", ans);
            if (code != RTNORM) return(code);
         } while (strcmp(ans,"b") != 0 && strcmp(ans, "f") != 0);
         if (strcmp(ans,"b") == 0)
            BALL = 1;
         code = ads_getreal("Enter the roughness in milliunit : ", &ROUGHNESS);
         if (code != RTNORM) return(code);
         ROUGHNESS /= 1000.;
      }
      else {
         SLICE_CONTROL = -1;
         ads_initget(1+2+4, NULL);
         code = ads_getreal("Enter the desired slice thickness : ", &STEP);
         if (code != RTNORM) return(code);
      }

/* get user input */
      do {
         code = ads_getstring(0,"Do you want an automatic scaling (y/n) ? ",
ans);
         if (code != RTNORM) return(code);
      } while (strcmp(ans,"n") != 0 && strcmp(ans, "y") != 0);
```

```c
    if (strcmp(ans, "n") == 0) {
        code = ads_getreal("Input z min of the solid model: ", &mprop.box.z1);
    }
    if (code != RTNORM) return(code);

code = ads_getreal("Input z max of the solid model: ", &mprop.box.z2);
    if (code != RTNORM) return(code);
}

/* get the properties of the solid (z min1 and z max1) */
else {
    code = ap_q_mprop(sol, &mprop);
    if (code == RTERROR) {
        ads_fail("Unable to calculate the properties of the solid\n");
        ads_exit(0);
    }
}

/* get zs of the flat sufaces */
ads_printf("\nWorking...\n");
surface(zz, &n);

/* add zmin and zmax to the zz list */
zz[n].z = mprop.box.z1;
zz[n].action = 0;
n++;
zz[n].z = mprop.box.z2;
zz[n].action = 0;
n++;
quicksort(zz, 0, n-1);
check_flat(zz, &n, mprop.box.z2);
for (i = 0; i < n; i++)
    printf("\n%i: %f %i", i, zz[i].z, zz[i].action);

/* ask for double intersection */
do {
    code = ads_getstring(0, "Do you want a double intersection for flat surfaces (y/n)? ", ans);
    if (code != RTNORM) return(code);
} while (strcmp(ans, "n") != 0 && strcmp(ans, "y") != 0);
if (strcmp(ans, "y") == 0)
    inter = 1;
else
    inter = 0;

/* get intersection */
file_entity = fopen(filename, "w");
n_slice = 0;
comp = zz[0].z;
action = zz[0].action;
i = 0;
ads_command(RTSTR, "UCSICON", RTSTR, "OFF", RTNONE);
ads_command(RTSTR, "UCS", RTSTR, "World", RTNONE);
pt[X] = pt[Y] = 0;
do {
    pt[Z] = comp;
    OFFSET_MIN1 = 1.;
    slice_h(pt, action, &n_slice, slice_id, file_entity);
    eval_step(zz, &action, &comp, &i, inter, n, n_slice);
```

```c
} while (comp > zz[n-1].z || uv(comp, zz[n-1].z) < 1.);
fclose(file_entity);

/* write all the entities to an output file */
ads_command(RTSTR, "UCSICON", RTSTR, "ON", RTNONE);

/* write all the intersections to an output file */
pt[X] = pt[Y] = pt[Z] = 0;
strcat(filename, ".dwg");
code = ads_findfile(filename, fullfilename);
if (code == RTERROR)
    ads_command(RTSTR, "WBLOCK", RTSTR, filename, RTSTR, "", RT3DPOINT, pt);
else
    ads_command(RTSTR, "WBLOCK", RTSTR, filename, RTSTR, "Y", RTSTR, "",
                RT3DPOINT, pt);

for (i = 0; i < n_slice; i++) {
    ads_command(RTENAME, slice_id[i], RTNONE);
}
ads_command(RTSTR, "Single", RTNONE);
printf("number of intersections = %i\n", n_slice);
}

/*---------------------------------
Entity_Draw
---------------------------------*/
entity_draw(list, l1, l2)
entity list[];
int l1, l2;
{
    int i;
    ads_point pt1, pt2, c;
    ads_real r;

for (i = l1; i <= l2; i++) {
        pt1[X] = list[i].x1;
        pt1[Y] = list[i].y1;
        pt1[Z] = list[i].z;
        pt2[X] = list[i].x2;
        pt2[Y] = list[i].y2;
        pt2[Z] = list[i].z;
        c[X] = list[i].cx;
        c[Y] = list[i].cy;
        c[Z] = list[i].z;
        switch (list[i].type) {
            case 0:
                printf("%3i %2i flag1 %1 %.4f\n", i, list[i].d, list[i].flag1, list[i].z);
                break;
            case 1:
            case 4:
                printf("%3i %2i %.4f %.4f %.4f %.4f %.4f\n", i, list[i].type, list
                       [i].x1, list[i].y1, list[i].x2, list[i].y2, list[i].z, list[i].ref1);
                break;
            case 2:
                r = sqrt(pow((list[i].x1-list[i].cx), 2.)+pow((list[i].y1-list[i].cy), 2
                        .));
```

```
                printf("%3l %2l %.4f %.4f %.4f %.4f %.4f %f\n", i, list[i].type, list
t[i].x1, list[i].y1, list[i].x2, list[i].y2, list[i].r, list[i].ret[i];
            break;
        case 3:
                printf("%3l %2l %.4f %.4f %.4f %f\n", i, list[i].type, list[i].cx, l
list[i].cy, list[i].r, list[i].z);
            break;
        }
    }
}

/*-----------------------------------------------------------------
  Entity Draw On AutoCAD
  -----------------------------------------------------------------*/ entity_draw1(list, l1, l2)
entity list[];
int l1, l2;
{
    int i;
    ads_point pt1, pt2, c;
    ads_real r;

for (i = l1; i <= l2; i++) {
        pt1[X] = list[i].x1;
        pt1[Y] = list[i].y1;
        pt1[Z] = list[i].z;
        pt2[X] = list[i].x2;
        pt2[Y] = list[i].y2;
        pt2[Z] = list[i].z;
        c[X]   = list[i].cx;
        c[Y]   = list[i].cy;
        c[Z]   = list[i].z;
/*      printf("%3l %l %f %f %f %f %f %f\n", i, list[i].type, list[i].x1, list[i].y1
,list[i].x2, list[i].y2, list[i].z); */ switch(list[i].type) {

/* line */
        case 1:
            ads_command(RTSTR, "line",RT3DPOINT, pt1, RT3DPOINT, pt2, RTSTR, "",
RTNONE);
            break;

/* arc of circle */
        case 2:
            if (list[i].d == 1)
                ads_command(RTSTR, "arc", RT3DPOINT, pt2, RTSTR, "c", RT3DPOINT,
c, RT3DPOINT, pt1, RTNONE);
            else
                ads_command(RTSTR, "arc", RT3DPOINT, pt1, RTSTR, "c", RT3DPOINT,
c, RT3DPOINT, pt2, RTNONE);
            break;

/* circle */
        case 3:
            pt1[X] = list[i].cx;
            pt1[Y] = list[i].cy;
            ads_command(RTSTR, "circle", RT3DPOINT, pt1, RTREAL, list[i].r, RTNO
NE);
            break;
        /* line on two different layers */
        case 4:
            pt1[Z] = list[i-1].z;
            ads_command(RTSTR, "line",RT3DPOINT, pt1, RT3DPOINT, pt2, RTSTR, "",
RTNONE);
            break;
        }
    }
}
```

```
/* ******************************************************************
                      ADAPTIVE LAMINATED MACHINING
                             by
                       Franck A. Vouzelaud Experimental program
****************************************************************** */

/*-----------------------------------------------------------------
Evaluation
-----------------------------------------------------------------*/
double ev(x, y)

double x, y;

{
    double result;
    result = 100000.*(x-y);
    if (result < 0) result *= -1.;
    return((double) result);
}

/*-----------------------------------------------------------------
Entity_Copy
-----------------------------------------------------------------*/
entity_copy(ent1, ent2, direction)

/* copy ent1 into ent2 with the given direction */ entity *ent1, *ent2;
int direction;
{
    ent2->type = ent1.type;
    ent2->z = ent1.z;
    ent2->r = ent1.r;
    ent2->cx = ent1.cx;
    ent2->cy = ent1.cy;
    ent2->d = ent1.d*direction;
    ent2->offset = ent1.offset;
    if (direction == -1) {
        ent2->x1 = ent1.x2;
        ent2->y1 = ent1.y2;
        ent2->ref1 = ent1.ref2;
        ent2->flag1 = ent1.flag2;
        ent2->x2 = ent1.x1;
        ent2->y2 = ent1.y1;
        ent2->ref2 = ent1.ref1;
        ent2->flag2 = ent1.flag1;
    }
    else {
        ent2->x1 = ent1.x1;
        ent2->y1 = ent1.y1;
        ent2->ref1 = ent1.ref1;
        ent2->flag1 = ent1.flag1;
        ent2->x2 = ent1.x2;
        ent2->y2 = ent1.y2;
        ent2->ref2 = ent1.ref2;
        ent2->flag2 = ent1.flag2;
    }
}

/*-----------------------------------------------------------------
Write Temporary File
-----------------------------------------------------------------*/
save_temp(list, file)

entity list[];
FILE *file;
{
/* delcaration of variables */
    int i;

i = 0;
    while (i < (int) list[0].z) {
        fwrite(&list[i], sizeof(entity), 1, file);
        i++;
    }
}

/*-----------------------------------------------------------------
Sort_Entity
-----------------------------------------------------------------*/
sort_entity(list1, list2)

/* sort entities with a connectivity criterium */ entity list1[], list2[];

{
/* declaration of variables */
    int i, first, last, n2a, n2b, temp;
    point2d s_point, t_point;

/* variable initialization */
    last = list1[0].d;
    first = 1;
    n2a = 0;
    i = 0;

while (i <= last) {
        if (list1[i].type == 0) {
            i++;
        }
        list2[n2a].type = 0;
        n2a++;
    }

/* first entity */
    if (entity_return(list1, &list2[n2a], first, last, &temp) == 1) {
        s_point.x = list2[n2a].x1;
        s_point.y = list2[n2a].y1;
        t_point.x = list2[n2a].x2;
        t_point.y = list2[n2a].y2;
        n2a++;
        n2b = 1;
        i++;
        list2[n2a-n2b-1].d = n2b;
```

```c
/* find the entities composing a contour */
while (n2b != 0) {
    if ( entity_return_trigger(list1, &list2[n2a], t_point, first, last)
        == 1) {
        t_point.x = list2[n2a].x2;
        t_point.y = list2[n2a].y2;
        n2a++;
        n2b++;
        i++;
        if ((ev(t_point.x, s_point.x) + ev(t_point.y, s_point.y)) <200.)
            {
            list2[n2a-n2b-1].d = n2b;
            n2b = 0;
            }
        }
/* close the contour if no entity found with the trigger point */
    else {
        list2[n2a-n2b-1].d = n2b;
        n2b = 0;
        }
    }
list2[0].z = (double) n2a;
}

/*-----------------------------------------------------------
Direction_Loop
-----------------------------------------------------------*/
direction_loop(list, l1, l2)

entity list[];
int l1, l2;
{
double surface, a1, a2, teta1, teta2, dteta, teta,x1, x2, y1, y2;
int i, j, nteta, n1, n2 ;
point2d pt1, pt2, pt;

surface = 0.;
for (i = l1; i <= l2; i++) {
    switch (list[i].type) { case 1: /* line */
        surface += .5*(list[i].y1+list[i].y2)*(list[i].x2-list[i].x1);
        break;

/* an arc is approximated by line segments */
    case 2: /* arc */
        pt.x = list[i].cx;
        pt.y = list[i].cy;
        pt1.x = list[i].x1;
        pt1.y = list[i].y1;
        pt2.x = list[i].x2;
        pt2.y = list[i].y2;
        angle(&teta1, pt, pt1);
        angle(&teta2, pt, pt2);
        if (list[i].d == 1 && teta2 > teta1) /* clockwise direction */
            teta1 += 2.*pi;
        if (list[i].d == -1 && teta2 < teta1) /*counterclockwise direction*/
            teta2 += 2.*pi;
        nteta = (teta2-teta1)/(pi/4.)+1;
        if (nteta < 2) nteta = 2;
        dteta = (double) (teta2-teta1)/nteta;
        for (j = 1, teta = teta1; j <= nteta; j++, teta += dteta) {
            x1 = list[i].cx+list[i].r*cos(teta);
            y1 = list[i].cy+list[i].r*sin(teta);
            x2 = list[i].cx+list[i].r*cos(teta+dteta);
            y2 = list[i].cy+list[i].r*sin(teta+dteta);
            surface += .5*(y1+y2)*(x2-x1);
            }
        break;
        }
    }
if (surface > 0.) {
    list[l1-1].x1 = surface;
    return(1); /* clockwise */
    }
else {
    list[l1-1].x1 = -surface;
    return(-1); /* counterclockwise */
    }
}

/*-----------------------------------------------------------
Inverse_Loop
-----------------------------------------------------------*/
inverse_loop(list, l1, l2)

entity list[];
int l1, l2;
{
int i, max;
entity e;
max = l1+(l2-l1)/2;
for (i = l1; i <= max; i++) {
    entity_copy(list[l2-i+l1], &list[i], 6e, -1);
    entity_copy(list[i], &list[l2-i+l1], -1);
    entity_copy(e, &list[i], 1);
    }
}

/*-----------------------------------------------------------
Entity_Return
-----------------------------------------------------------*/
int entity_return(list, ent, n1, n2, n)

entity list[], *ent;
int n1, n2, *n;
{
int i, success;
i = n1;
success = 0;
while (list[i].type == 0 && i <= n2) i++;
```

```c
if (list[i].type != 0 && list[i].type != -1) {
    *n = i;
    success = 1;
    entity_copy(list[i], ent, 1);
    list[i].type = 0;
}
return(success);
}

/*-----------------------------------------------------------
Entity_Return_Trigger
-----------------------------------------------------------*/
int entity_return_trigger(list, ent, t_point, n1, n2)
entity_list[], *ent;
point2d t_point;
int n1, n2;
{
    int i, direction, success;
    i = n1;
    success = 0;
    while ( i <= n2 && success == 0 && list[i].type != -1) {
        if (list[i].type != 0 && list[i].type != -1) {
            if ((ev(list[i].x1, t_point.x)+ev(list[i].y1, t_point.y)) < 200.) {
                success = 1;
                entity_copy(list[i], ent, 1);
                list[i].type = 0;
                ent->x1 = t_point.x;
                ent->y1 = t_point.y;
            }
            if ((ev(list[i].x2, t_point.x)+ev(list[i].y2, t_point.y)) < 200.) {
                success = 1;
                entity_copy(list[i], ent, -1);
                list[i].type = 0;
                ent->x1 = t_point.x;
                ent->y1 = t_point.y;
            }
        }
        i++;
    }
    return(success);
}

/*-----------------------------------------------------------
Angle = return a positive angle between 0 and 2pi
-----------------------------------------------------------*/
angle(teta, pt1, pt2)
double *teta;
point2d pt1, pt2;
{
    double a1, a2, r, teta1, teta2;

r = sqrt(pow(pt2.x-pt1.x, 2.)+pow(pt2.y-pt1.y, 2.));
    teta1 = (pt2.x-pt1.x)/r;
    if (teta1 > 1.) teta1 = 1.;
    if (teta1 < -1.) teta1 = -1.;
    a1 = acos(teta1);
    teta2 = (pt2.y-pt1.y)/r;
    if (teta2 > 1.) teta2 = 1.;
    if (teta2 < -1.) teta2 = -1.;
    a2 = asin(teta2);
    angle_mod(a1, a2, teta);
}

/*-----------------------------------------------------------
Angle Vector= return a positive angle between 0 and 2pi
the vector shoulg be in th XY plane
-----------------------------------------------------------*/
angle_v(teta, v)
double *teta;
vector v;
{
    double a1, a2, r, teta1, teta2;

r = sqrt(pow(v.x, 2.)+pow(v.y, 2.));
    teta1 = v.x/r;
    if (teta1 > 1.) teta1 = 1.;
    if (teta1 < -1.) teta1 = -1.;
    a1 = acos(teta1);
    teta2 = v.y/r;
    if (teta2 > 1.) teta2 = 1.;
    if (teta2 < -1.) teta2 = -1.;
    a2 = asin(teta2);
    angle_mod(a1, a2, teta);
}

/*-----------------------------------------------------------
Angle Modification : from two angles a1 = acos(x), a2 = asin(y) select the one
between 0 and 2pi
-----------------------------------------------------------*/
angle_mod(a1, a2, teta)
double *teta;
{
    if (a2 >= 0) *teta = a1;
    if (a2 < 0) *teta = 2*pi-a1;
}

/*-----------------------------------------------------------
Cross Vector
-----------------------------------------------------------*/
cross_vector(v1, v2, cross)
vector v1, v2, *cross;
{
    cross->x = v1.y*v2.z - v1.z*v2.y;
    cross->y = v1.z*v2.x - v1.x*v2.z;
    cross->z = v1.x*v2.y - v1.y*v2.x;
}

/*-----------------------------------------------------------
Angle_arc = return two angles of the first point and the last point of an arc w1
```

```
ht a1 < a2;
/*-------------------------------------------*/
angle_arc(ent, a1, a2)

entity ent;
double *a1, *a2;
{
/* declaration of variables */
    point2d p1, p2;
    double a;

p1.x = ent.cx;
    p1.y = ent.cy;
    p2.x = ent.x1;
    p2.y = ent.y1;
    angle(a1, p1, p2);
    p2.x = ent.x2;
    p2.y = ent.y2;
    angle(a2, p1, p2);

/* reverse angle of the first arc if clockwise direction */
    if (ent.d == 1) {
        a = *a1;
        *a1 = *a2;
        *a2 = a;
    }
    if (*a2 < *a1)
        *a2 += 2*pi;
}
```

What is claimed is:

1. A method involving automatic operation of a machine with respect to an object having a desired profile, wherein the operation of the machine is controlled based on a model of the profile of the object, the method comprising:

generating at least a portion of a model of the object, said portion of said model including a plurality of successive layers wherein the cross-section of each layer in a plane of view is defined by the intersection with said plane of view, of a pair of parallel planes and a model profile connecting said parallel planes, and wherein for each layer the distance separating its pair of parallel planes defines the thickness of said layer;

wherein said step of generating at least said portion of said model of said object includes selecting each layer thickness such that the geometrical error between the desired profile of said portion of said object and said model profile of said layer with said layer thickness, remains no greater than a preselected geometrical error;

wherein more than one layer thickness is selected during said step of generating at least said portion of said object; and operating the machine with respect to at least a portion of the object in successive steps with each said step based on a separate one of said layers.

2. A method as in claim 1, wherein each of a plurality of successive layers has a different layer thickness than each other layer thickness in said succession of layers.

3. A method as in claim 2, wherein said preselected geometrical error remains the same for each layer of said succession of layers.

4. A method as in claim 2, wherein said succession of layers is composed of a first succession of layers followed by a second succession of layers and wherein a first preselected geometrical error remains the same for each layer of said first succession of layers and a second preselected geometrical error remains the same for each layer of said second succession of layers.

5. A method as in claim 1, wherein said step of selecting each layer thickness such that the geometrical error between the desired profile of said portion of said object and said model profile of said layer with said layer thickness, remains no greater than said preselected geometrical error, includes:

using an iterative closed loop method of selecting each successive layer thickness corresponding to each successive step of the operation of the machine with respect to the object.

6. A method as in claim 5, wherein said iterative closed loop method includes the steps of:

selecting an upper tolerance for the geometrical error associated with each layer of said at least portion of said model of the object;

selecting a test layer thickness for the thickness of a selected layer within said at least portion of said model of the object;

calculating the geometrical error due to the step effect of said test layer thickness; and choosing the thickness of said selected layer within said at least portion of said model of the object such that said calculated geometrical error is below said upper tolerance.

7. A method as in claim 1, wherein said step of selecting each layer thickness such that the geometrical error between the desired profile of said portion of said object and said model profile of said layer with said layer thickness, remains no greater than said preselected geometrical error, includes:

using a calculation function within the limits of preselected maximum and minimum layer thicknesses to extrapolate the thickness of the next layer from the slice common to both the next layer and the previous layer in an open loop method of selecting each successive layer thickness corresponding to each successive step of the operation of the machine with respect to the object.

8. A method as in claim 1, wherein the machine is operated with respect to the entire object and said preselected geometrical error remains the same for each layer of the model of the object.

9. A method as in claim 1, wherein the machine manufactures parts of a uniform quality.

10. A method as in claim 1, wherein said geometrical error for each said layer is the largest perpendicular distance between said desired profile of said object and said profile of said layer of the model.

* * * * *